US009503273B2

(12) United States Patent
Sato et al.

(10) Patent No.: US 9,503,273 B2
(45) Date of Patent: Nov. 22, 2016

(54) CONTROL DEVICE, CONTROL METHOD, AND PROGRAM

(75) Inventors: Katsuyuki Sato, Tokyo (JP); Yoshimasa Utsumi, Tokyo (JP); Kazuhiro Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 429 days.

(21) Appl. No.: 13/116,400

(22) Filed: May 26, 2011

(65) Prior Publication Data

US 2011/0301722 A1   Dec. 8, 2011

(30) Foreign Application Priority Data

Jun. 2, 2010   (JP) .................................. 2010-126634

(51) Int. Cl.
| | | |
|---|---|---|
| *G05B 11/01* | (2006.01) | |
| *H04L 12/28* | (2006.01) | |
| *G08C 17/02* | (2006.01) | |

(52) U.S. Cl.
CPC ........... *H04L 12/2816* (2013.01); *G08C 17/02* (2013.01); *H04L 12/282* (2013.01); *G08C 2201/40* (2013.01); *G08C 2201/42* (2013.01)

(58) Field of Classification Search
CPC ............... H04L 12/2816; H04L 12/282; G08C 17/02; G08C 2201/40; G08C 2201/42
USPC .................. 700/17, 19; 340/310.11
See application file for complete search history.

(56) References Cited

U.S. PATENT DOCUMENTS

| | | | |
|---|---|---|---|
| 6,792,319 B1* | 9/2004 | Bilger .............................. 700/13 |
| 6,906,617 B1* | 6/2005 | Van der Meulen ........... 340/538 |
| 6,912,429 B1* | 6/2005 | Bilger .............................. 700/19 |
| 7,003,084 B2* | 2/2006 | Yoon et al. .............. 379/102.01 |
| 7,310,087 B2* | 12/2007 | Ha .................................. 345/169 |
| 2005/0055472 A1* | 3/2005 | Krzyzanowski et al. ........ 710/5 |
| 2006/0092038 A1* | 5/2006 | Unger ..................... G08C 17/00 340/4.41 |
| 2006/0181429 A1* | 8/2006 | Garrison ............. H04N 5/4403 340/12.22 |
| 2006/0251059 A1* | 11/2006 | Otsu ..................... H04L 12/282 370/352 |

(Continued)

FOREIGN PATENT DOCUMENTS

| | | |
|---|---|---|
| JP | 2006-345497 A | 12/2006 |
| JP | 2008-139423 A | 6/2008 |

*Primary Examiner* — Mohammad Ali
*Assistant Examiner* — Ziaul Karim
(74) *Attorney, Agent, or Firm* — Chip Law Group

(57) ABSTRACT

A control device, which handles a network system in which electronic devices installed in each of multiple rooms are connected via a communication network and each electronic device can perform communication via the communication network, includes: a control unit to selectively set a first control mode in which operation control according to operation input is performed as to a particular single electronic device, a second control mode in which operation control according to operation input is performed in common as to electronic devices installed in the same room, and a third control mode in which operation control according to operation input is performed in common as to electronic devices connected to the communication network, as an operation control mode according to predetermined operation input, and to generate a control command; and a transmission unit to transmit a control command that the control unit has generated according to the control mode.

19 Claims, 40 Drawing Sheets

(56) References Cited

U.S. PATENT DOCUMENTS

| | | |
|---|---|---|
| 2007/0219981 A1* | 9/2007 | Takaai et al. .................... 707/5 |
| 2008/0079536 A1* | 4/2008 | Palfi ............................. 340/5.42 |
| 2008/0133715 A1 | 6/2008 | Yoneda et al. |
| 2008/0180228 A1* | 7/2008 | Wakefield et al. ...... 340/310.11 |
| 2009/0040016 A1* | 2/2009 | Ikeda ............................. 340/5.1 |
| 2009/0091656 A1* | 4/2009 | Kitaru .......................... 348/554 |

\* cited by examiner

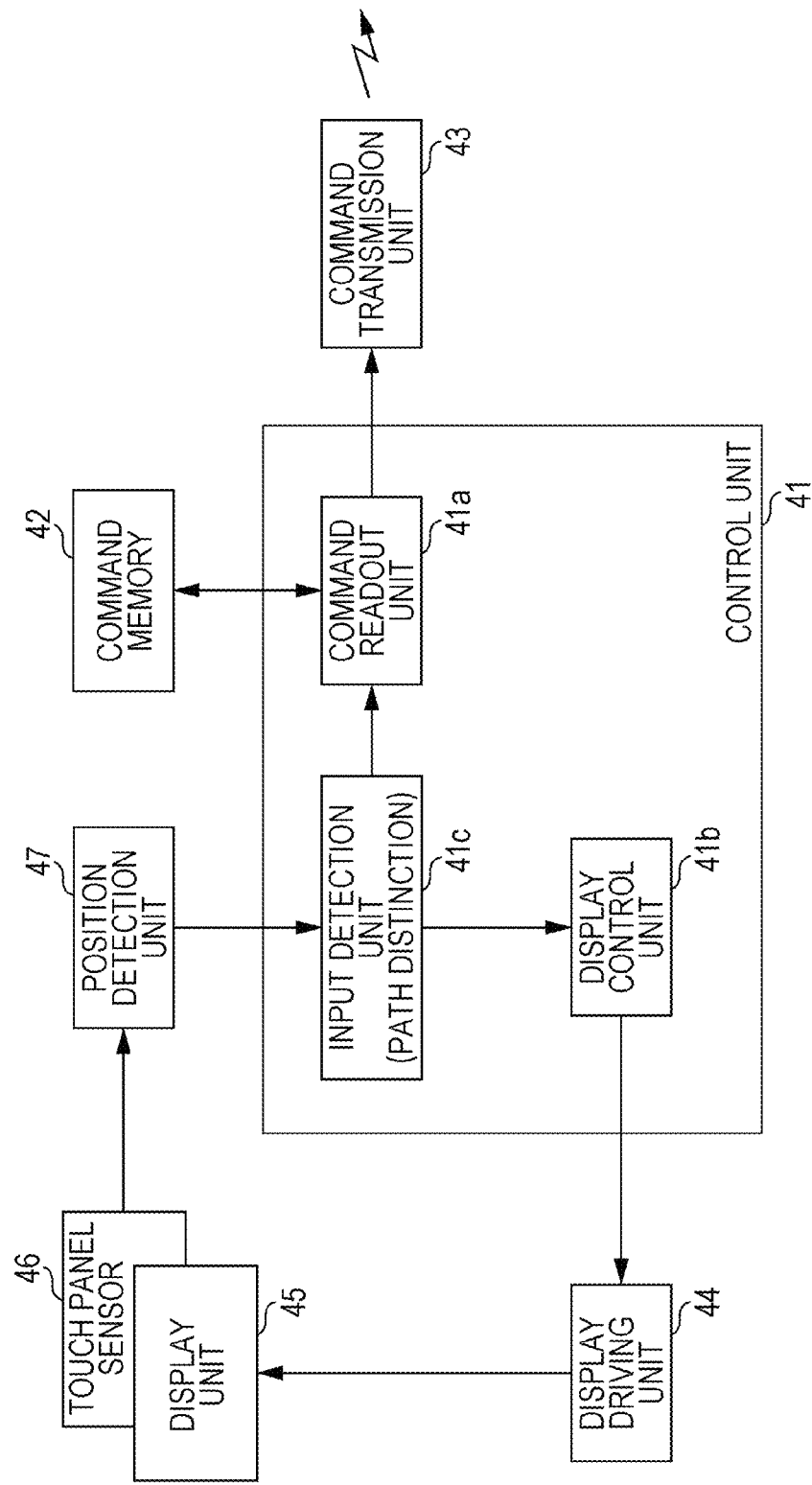

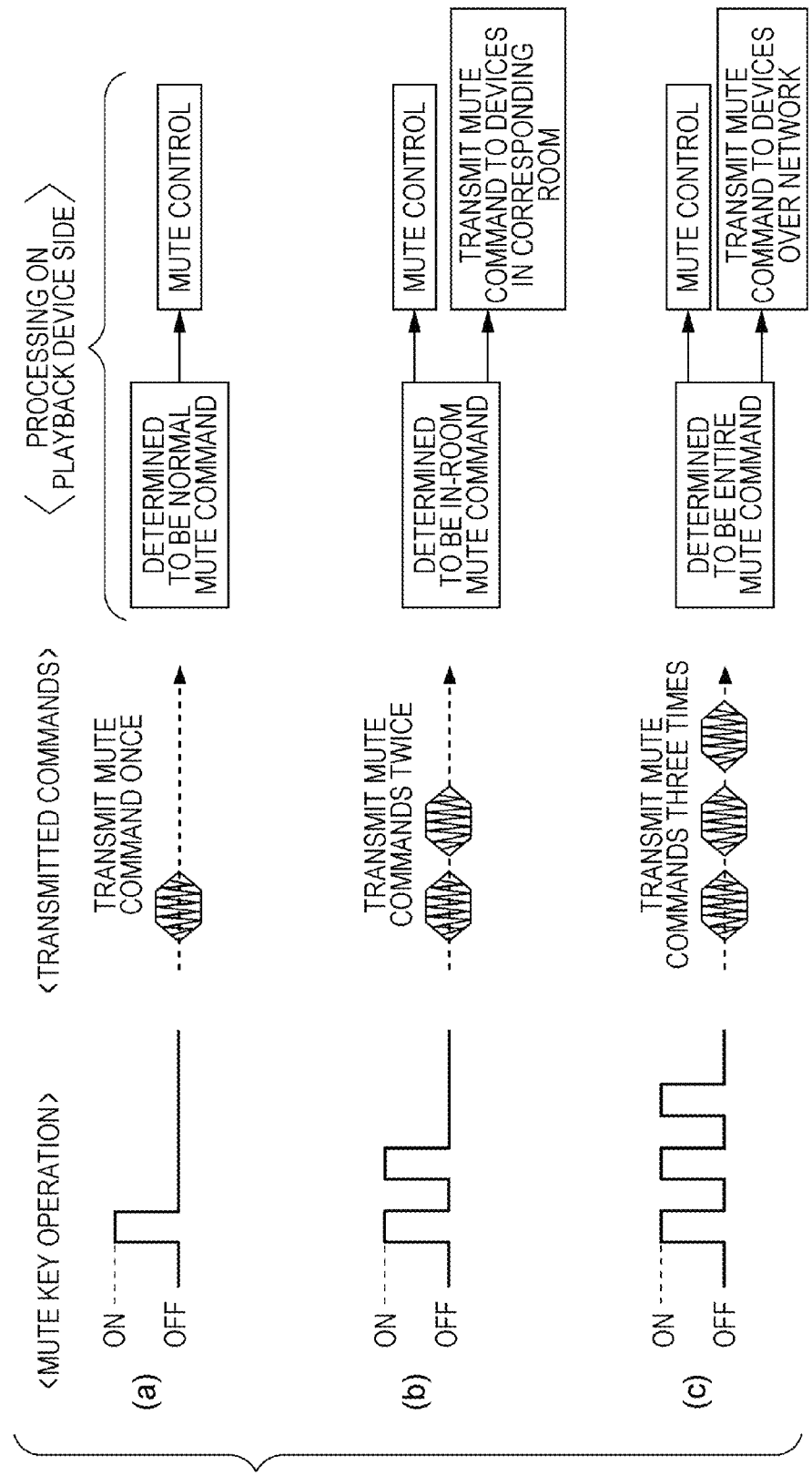

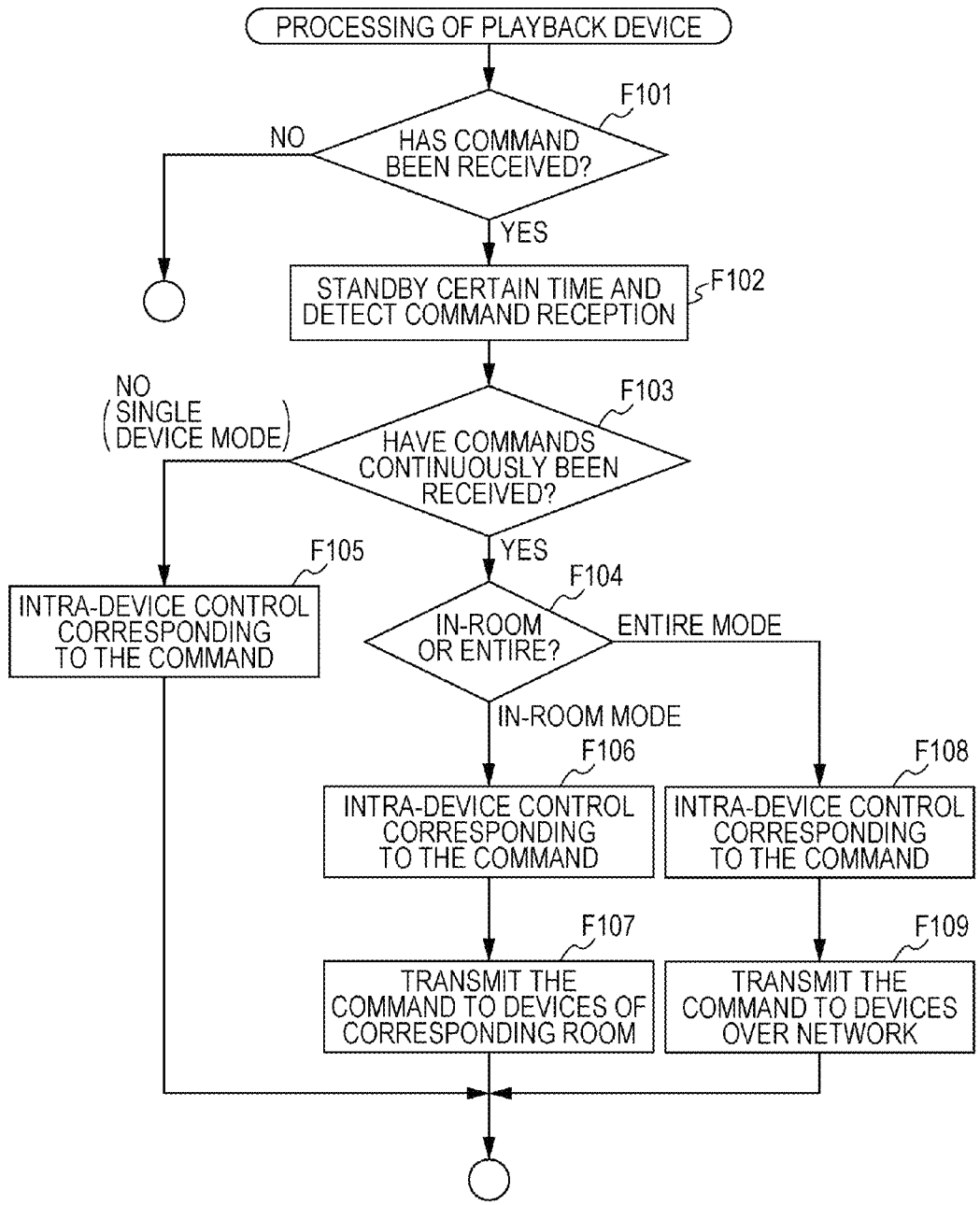

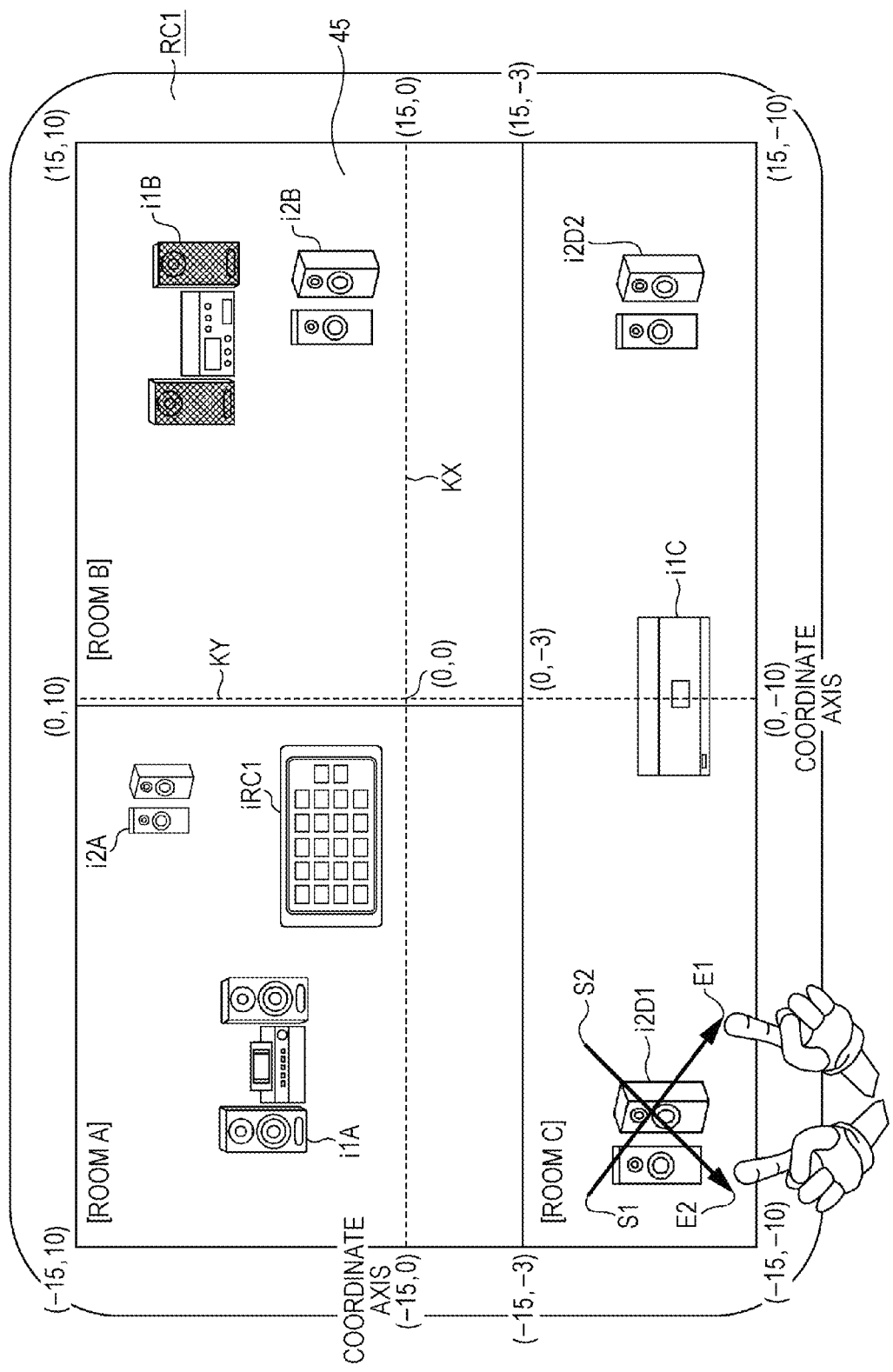

CONTROL DEVICE, CONTROL METHOD, AND PROGRAM

BACKGROUND OF THE INVENTION

1. Field of the Invention

The present invention relates to a control device and a control method in a network system in which electronic devices installed in multiple rooms are connected via a communication network, and to a program for realizing the same.

2. Description of the Related Art

A system has been proposed as a so-called in-home network system wherein electronic devices installed in multiple rooms are connected via a communication network. With this in-home network system, for example, a music/video playback device, or a video/audio output device (device including a television monitor, speaker, etc.) is installed in each room of a house. The respective devices are connected by a predetermined communication network so as to mutually perform network communication. Also, a certain device serves as a content server, and distributes content data to the other respective output devices. Thus, video/audio contents to be distributed from the content server device can be viewed and listened in each room of a home.

A technique relating to operations in a network system has been disclosed in Japanese Unexamined Patent Application Publication No. 2006-345479 and Japanese Unexamined Patent Application Publication No. 2008-139423.

SUMMARY OF THE INVENTION

Now, users may feel inconvenienced with current arrangements for user operations in a network system. For example, let us assume a situation wherein playback of a music content has been performed at a certain playback device serving as a server, the played content data has been distributed to each device in each room, and the synchronous playback output of the music is being performed at each device.

Examples of cases where a user who exists in a certain room attempts to perform operations as to a device include the cases of performing power on/off, playback start, playback stop, change of tune, volume up/down, and mute. In either case, the following three cases can be conceived regarding objects to be controlled by operations.

First, there is a case where a particular single device alone which exists in a room where the user exists is to be taken as an object. Secondly, there is a case where all of devices within a certain room such as a room where the user exists are to be taken as objects. Thirdly, there is a case where all of devices over a network are to be taken as objects.

Let us take a case where mute operations are to be performed as an example. As the first case, let us say that the user intends to mute played audio of a particular device in front of him/her. In this case, the user can perform this by performing mute operations or the like using an operation key provided to the panel of the target device, or a remote controller prepared along with the device thereof. This has no particular problem.

Next, let us say that there are two or more devices, and each of these is synchronously playing and outputting music contents distributed from a server. When the user intends to temporarily stop audio here, this is the above second case.

In this case, the user has to mute each of the devices by individually operating the operation key or remote controller of each of the devices. Even if the number of the devices is two, operations thereof seem troublesome, and if the number of the devices increases, this becomes very troublesome for the user.

Also, there is a case where the user desires to control the entire system in common, as with the third case. For example, in the case of operations, such as playback start, stop, and selection of music, and so forth, operations have to be performed on a device serving as a server. However, in the event that the user thereof is in a room different from a room where the server device is installed, the user has to go all the way to the room where the server device is installed.

Also, volume up/down, and muting are usually operated individually at each device. Accordingly, in order to perform volume up/down or muting as to all of the devices, the user has to go around each room for operations, which is very troublesome.

In the event of distributing and playing music or the like using a network system as described above for example, various cases can be conceived as user operations, but readily and suitably handling of the second and third cases has not been realized heretofore.

Also, such operation control can be performed if a highly advanced network control device is provided, but this may lead to increase in system costs, or may not be suitable to easy user operations. It is desirable to enable operation control in various cases using an inexpensive remote controller or the like normally provided to an electronic device, rather than a high-level operating device, for example.

Therefore, it has been found to be desirable to provide a control device in a network system whereby operations corresponding to various cases can be realized while realizing a user interface that does not lead to significant increase in device costs and also has good usability.

A control device according to an embodiment of the present invention is assumes a control device which handles a network system in which electronic devices installed in each of a plurality of rooms are connected via a communication network, and each electronic device can perform communication via the communication network.

An example of this device is a control device in a network system in which electronic devices installed in each of a plurality of rooms are connected via a communication network, content data is distributed from an electronic device installed in a certain room to an electronic device installed in another room via the communication network, and the content data can be played at the electronic device installed in the other room.

Also, a control device according to an embodiment of the present invention includes: a control unit configured to selectively set a first control mode in which operation control according to operation input is performed as to a particular single electronic device, a second control mode in which operation control according to operation input is performed in common as to electronic devices installed in the same room, and a third control mode in which operation control according to operation input is performed in common as to electronic devices connected to the communication network, as an operation control mode according to predetermined operation input, and to generate a control command; and a transmission unit configured to transmit a control command that the control unit has generated according to the control mode.

Also, the control device may include an integral or separate operating unit, and the control unit determines distinction of an operation mode as to an operator in the operating unit to select the first, second, or third control mode.

The predetermined operation input may be one of a power-on operation, a power-off operation, a volume operation, and a mute operation.

Also, the control unit may determine number of times of operation and/or operation time as to an operator as determination of distinction of an operation mode.

The control unit may take the second control mode as a mode in which operation control according to operation input is performed in common as to an electronic device installed in the same room as a room where the control device itself exists, and generates a control command as to an electronic device which exists in this room.

Also, the control unit may take the second control mode as a mode in which operation control according to operation input is performed in common as to an electronic device installed in a room specified by operation input, and generates a control command as to an electronic device which exists in this room.

Also, the control device may include: a display unit; and an operating unit configured to perform a touch panel operation by a touch panel on the display unit. The control unit causes the display unit to execute display illustrating a room corresponding region corresponding to each room, and an electronic device installed in each room, and further selects the first, second, or third control mode according to a position on the touch panel of a predetermined touch pattern operation serving as a predetermined operation input by a touch panel operation as to the display of the display unit.

The control unit may select the third control mode when determining that the predetermined touch pattern operation has been performed across generally the whole face of the touch panel including at least a plurality of the room corresponding regions on the touch panel, selects the second control mode when determining that the predetermined touch pattern operation has been performed within the one room corresponding region on the touch panel, and also across generally the whole face of the room corresponding region, and selects the first control mode when determining that the predetermined touch pattern operation has been performed on display indicating one electronic device on the touch panel.

The control unit may generate, in the event that the second control mode has been selected, a control command according to the predetermined touch pattern operation as to an electronic device installed in a room corresponding to the room corresponding region where the predetermined touch pattern operation has been performed.

Also, the predetermined touch pattern may be a touch panel operation for drawing a generally x-shaped operation path, a touch panel operation for drawing a general checkmark operation path, a touch panel operation for drawing an ascending/descending curved operation path or a vertically linear operation path while moving in the horizontal direction, a touch panel operation for drawing a generally circular operation path, and so forth.

Also, a control method according to an embodiment of the present invention includes the steps of: selectively setting a first control mode in which operation control according to operation input is performed as to a particular single electronic device, a second control mode in which operation control according to operation input is performed in common as to electronic devices installed in the same room, and a third control mode in which operation control according to operation input is performed in common as to electronic devices connected to the communication network, as an operation control mode according to predetermined operation input, and to generate a control command; and transmitting a control command that the control unit has generated according to the control mode.

A program according to an embodiment of the present invention is a program causing a network control device to execute the respective steps.

According to the above configurations, the user can perform the operations of the above various cases by distinguishing operations using the operating unit such as a remote controller or the like using the number of times of operation, operation time, the position on the panel of a predetermined touch pattern operation, or the like.

The control device according to an embodiment of the present invention is realized by a remote controller alone, or a remote controller and control functions (command determination, generation, and transmission functions) of an electronic device corresponding thereto. This control device determines which control mode of the first, second, and third the command operation is according to the user's operation mode to generate and transmit a control command. The control command transmitted from the control device is consequently transmitted to a particular electronic device alone, or transmitted in common to one or more device within one room, or transmitted in common to each device on the network. Thus, the user can perform individual device control, batch control of devices within a room, and batch control of the entire system from one operating device.

According to the above configurations, the operations of various cases can be performed as to electronic devices over the network without increasing device burden or cost burden on the system by using a common remote controller or the like, with excellent user interface nature. Also, in the event of using an operating unit such as a remote controller or the like having display and touch panel functions, the operations of various cases can be performed with more intuitive operations. Thus, user operations as to the network system can be simplified.

BRIEF DESCRIPTION OF THE DRAWINGS

FIG. 5 is a block diagram of a remote controller with display according to a third embodiment;

FIG. 6 is an explanatory diagram of operations and control processing according to the first embodiment;

FIG. 7 is a flowchart of the processing of a playback device according to the first embodiment;

FIG. 40 is an explanatory diagram of a single device operation in the event that the number of rooms differs, according to the third embodiment;

DESCRIPTION OF THE PREFERRED EMBODIMENTS

Figure 1:
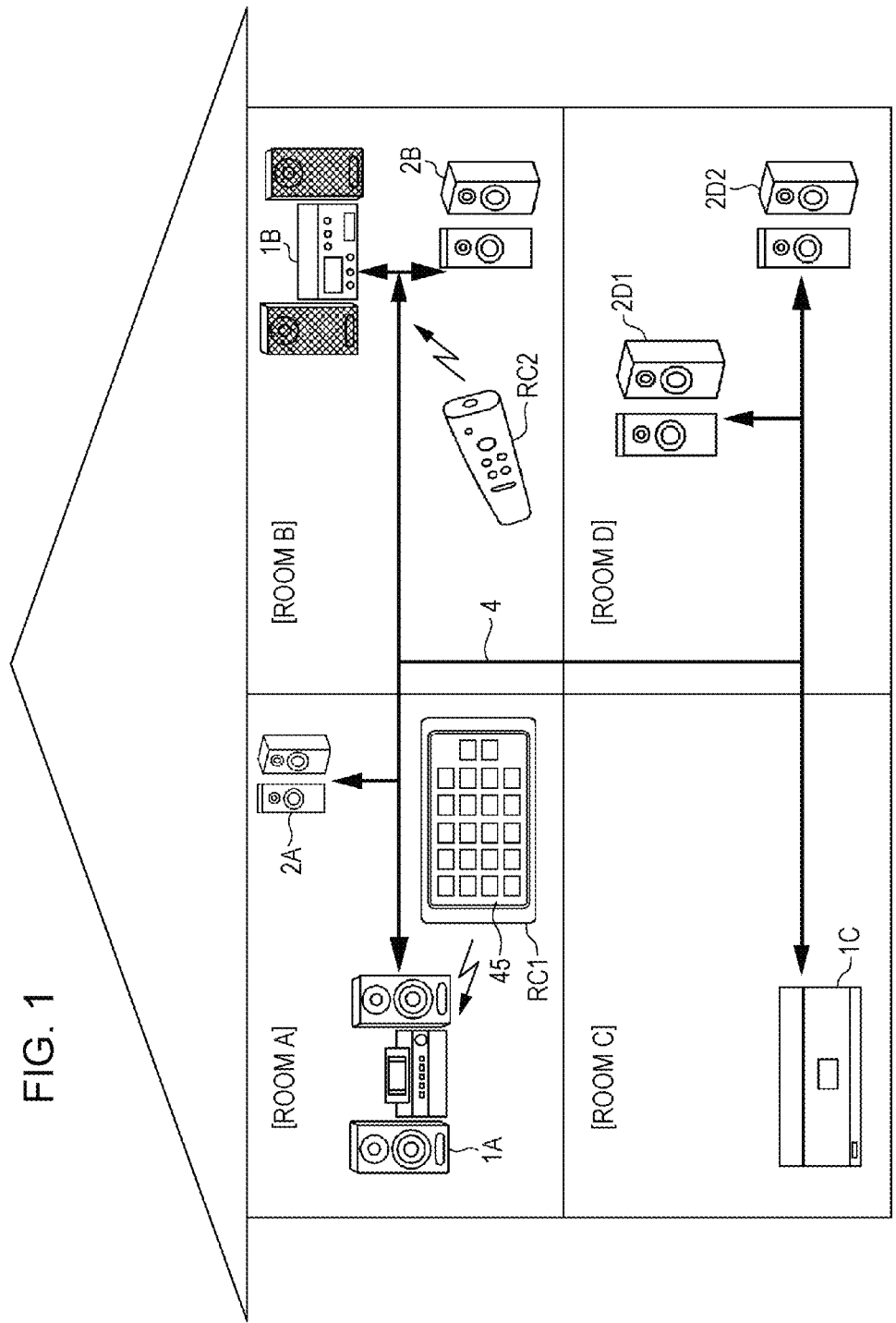
FIG. 1 is an explanatory diagram of a network system according to an embodiment of the present invention.

Hereafter, embodiments of the present invention will be described in the following sequence.
1. System Configuration
2. Device Configuration
  2-1. Playback Device
  2-2. Network Speaker
  2-3. Remote Controller
3. First Embodiment
4. Second Embodiment
5. Modifications of First and Second Embodiments
6. Third Embodiment
  6-1. Display Example of Remote Controller
  6-2. Operation Example I
  6-3. Operation Example II
  6-4. Operation Example III
  6-5. Operation Example IV
  6-6. Application Example with Different Number of Rooms
  6-7. Advantages and Modification of Third Embodiment
7. Modifications and Application to Other Devices
8. Program
1. System Configuration First, the configuration of an in-home network system according to an embodiment will be described with reference to FIG. 1. FIG. 1 illustrates an example wherein with a certain house, an in-home network system is used in the four rooms of A, B, C, and D.

Though referred to as "in-home network system" here, it goes without saying that a place where the system of the present example is used is not restricted to "home". For example, this may also be used for companies, schools, public facilities, and so forth. Also, this is not restricted to "rooms" within the same building; rather, outdoor of the building and inside other buildings, such as in gardens, garages, sheds, and so forth, may be regarded as "room" as used here. That is to say, according to the present example, one electronic device in a certain room distributes the same music content and video content to other electronic devices serving as servers, whereby the contents can be viewed and listened in each "room", but the "room" that is a destination where the same contents are distributed can be taken as a very broad concept. However, it is suitable for this example to be conceived as a system wherein distribution in a somewhat narrow range is performed, rather than distribution over a wide range such that distribution is executed with a public network such as the Internet or the like. Note that, with description of embodiments, description will be made as a system where distribution of music contents is performed.

The in-home network system according to an embodiment is configured so that various types of electronic devices disposed in each room can mutually communicate via a communication network (network) 4.

With the example in FIG. 1, a playback device 1A and a network speaker 2A are disposed in a room A. Also, a remote controller RC1 having a display function and a touch panel function is disposed in the room A. For example, this remote controller RC1 is provided corresponding to the playback device 1A, and is a device for transmitting a control command to the playback device 1A by a wireless system (or may be a cable system) such as by infrared rays or radio waves or the like. The remote controller RC1 is a device corresponding to the playback device 1A, and accordingly, the user usually uses the remote controller RC1 to operate the playback device 1A.

However, the remote controller RC1 is not restricted to being a dedicated operating device as to the playback device 1A, but may be a device whereby a control command can be transmitted to each device via the network 4 as a stand-alone device directly connected to the network 4 by wireless or cable.

Also, in the event of FIG. 1, a playback device 1B, a network speaker 2B, and a remote controller RC2 are disposed in a room B. The remote controller RC2 is configured not having a display function, and an example of this is a remote controller provided corresponding to the playback device 1B. Usually, the user uses the remote controller RC2 to operate the playback device 1B. Also, a playback device 1C is installed in a room C. Further, network speakers 2D1 and 2D2 are installed in a room D.

The playback devices 1A, 1B, and 1C include, for example, a music content playback unit, a speaker unit, and so forth, each of which can individually perform playback of music or the like. The playback devices 1A, 1B, and 1C play content data from a hard disk drive (HDD), flash memory, an interchangeable optical disk player or the like in which multiple optical discs, e.g., CD (Compact Disc), DVD (Digital Versatile Disc), BD (Blu-ray Disc (registered trademark)), or the like are stored, or the like. The playback devices 1A, 1B, and 1C can output the played music content data from a built-in speaker or a connected speaker or the like.

On the other hand, the playback devices 1A, 1B, and 1C can communicate with each device by the network 4, whereby these devices can serve as server devices or client devices. That is to say, the playback devices 1A, 1B, and 1C can distribute played music content data to other devices over the network 4 as server devices. Also, the playback devices 1A, 1B, and 1C can receive music content data to be distributed when another device over the network 4 is a server, as client devices.

Network speakers 2A, 2B, 2D1, and 2D2 are audio output devices having an amplifier and a speaker, and particularly have a network communication function, whereby these are devices which can serve as client devices on the system. For example, in the event that the playback device 1B has become a server on the system, the network speakers 2A, 2B, 2D1, and 2D2 can receive music content distributed from the playback device 1B, and output as music.

The network 4 is made up of a cable or wireless transmission path where in-home communication can be performed, for example. For example, in the event of cable, a lamp line, an RF cable for television, DLNA (Digital Living Network Alliance), HDMI (High Definition Multimedia Interface) or the like can be conceived. Also, in the event of wireless, a wireless LAN (IEEE802.11x (=a, b, g, n, and so forth)), Bluetooth, other communication system using 2.4 GHz band, or the like can be conceived.

With the present embodiment, description will be made assuming a situation for performing system operation wherein in this in-home network system, a certain playback device becomes a server, synchronously distributes music contents as to other client devices (playback devices, network speakers), and simultaneously plays the music contents. This is operation in, what we might call, a party mode in the in-home network.

Also, let us say that each device (playback devices 1A, 1B, and 1C, network speakers 2A, 2B, 2D1, and 2D2) has already recognized which room each of the other devices is installed. For example, the playback device 1A recognizes that the network speaker 2A exists in the same room A, and the playback device 1B and the network speaker 2B are installed in the room B, and so forth. This can be realized by the user setting the room (zone) of each device when installing each device.

Also, what kind of device is disposed in each room has to be registered in the remote controller RC1 with a GUI (Graphical User Interface) that can be operated by the touch panel in which a wireless function is installed.

The control device according to an embodiment of the present invention is a device which generates a control command corresponding to the user's operation in various cases in such an operation situation.

As described above, as a case where the user who exists in a certain room attempts to perform operations as to a device, for example, power on/off, playback start, playback stop, change of music, volume up/down, mute, or the like may be performed. In this case, there are the following objects to be controlled by operations.

First Case: Case where a particular single device alone in a room where the user exists is taken as an object Second Case: Case where all of the devices within a certain room, such as a room where the user exists, are taken as an object Third Case: Case where all of the devices over the network are taken as an object The control device according to an embodiment of the present invention is a device which realizes the user's operation according to each of these cases, and generates a suitable control command. With a later-described first embodiment, an example will be described wherein the control device according to an embodiment of the present invention is realized by a combination of the remote controller RC2 and the playback device 1B. With a later-described second embodiment, an example will be described wherein the control device according to an embodiment of the present invention is realized by the remote controller RC2. With a later-described third embodiment, an example will be described wherein the control device according to an embodiment of the present invention is realized by the remote controller RC1 with display and touch panel functions.

2. Device Configuration 2-1. Playback Device

A configuration example of an electronic device to be connected to the network 4 will be described. First, a configuration example of the playback device 1 (1A, 1B, 1C) will be described in FIG. 2.

The playback device 1 includes a control unit 11, a content storage/playback unit 12, a memory unit 13, a transmission unit 14, a reception unit 15, a playback processing unit 16, an output device 17, a display unit 18, a panel operating unit 19, and a command reception unit 20.

The control unit 11 is configured of a microcomputer including a CPU (Central Processing Unit), ROM (Read Only Memory), RAM (Random Access Memory), and so forth. For example, in addition to a program to be executed by the CPU, various types of setting information for playback operation, network communication operation, and so forth is stored in the ROM within the control unit 11. The RAM serves as a main storage device unit for the CPU.

In the event that the play device 1 performs playback operation in a stand-alone mode, the control device 11 controls the entire playback device so as to execute appropriate operation in each of a case serving as a server device, and a case serving as a client device. For example, the control unit 11 controls playback operation control at the content storage/playback unit 12, transmission unit 14, communication operation by the reception unit 15, and so forth.

The term "memory unit 13" collectively refers to storage such as the RAM, ROM, flash memory, and so forth. This memory unit 13 may be used as a work region for the processing of the control unit 11, or may be used as a program storage region. Also, the memory unit 13 is also used for storing various types of setting information, parameters, and so forth for distribution operation. Also, the memory unit 13 may be used as a transmission buffer of content data played at the content storage/playback unit 12 for distribution at the time of serving as a server device, or may be used as a reception buffer of content data at the time of serving as a client device.

The content storage/playback unit 12 is a device unit which can play various types of content data. The content data is stored in, for example, a hard disk, flash memory, optical disk, or the like. The content storage/playback unit 12 performs playback of the content data from these storage media based on the instruction of the control unit 11. Accordingly, the content storage/playback unit 12 is realized as an HDD, a flash memory player, an optical disk player, an interchangeable optical disk player, or the like.

The transmission unit 14 and the reception unit 15 serve as a communication unit with another device via the network 4. Based on the control of the control unit 11, the transmission unit 14 performs transmission of a control command as to a certain device over the network. Also, in the event that this playback device 1 serves as a server device, the transmission unit 14 performs, based on the control of the control unit 11, predetermined encoding principally regarding the content data played a the content storage/playback unit 12, and performs network transmission, i.e., distribution to each client device.

The reception unit 15 performs reception of a control command transmitted from another device over the network. In the event that the control command has been received, the reception unit 15 decodes the signal thereof, and transmits the reception information content to the control unit 11. Also, in the event that this playback device 1 serves as a client device, the reception unit 15 receives a signal transmitted from the server device, e.g., distributed content data, the other various types of instruction signals, or the like. Subsequently, the reception unit 15 decodes the received signal. At the time of reception of content data by distribution, the reception unit 15 transfers the content data (stream data) received and decoded in accordance with the communication system to the memory unit 13 for buffering based on the control of the control unit 11. In order to perform such processing, the transmission unit 14 and the reception unit 15 perform encoding, decoding, and transmission/reception processing in accordance with the cable or wireless communication system over the network 4.

The playback processing unit 16 performs processing for playing and outputting the content data played at the content storage/playback unit 12, or the content data received by distribution, at the output device 17. For example, the content data received by distribution is buffered in the memory unit 13, but each piece of data making up the buffered content data is transferred to the playback processing unit 16 successively at predetermined timing. The playback processing unit 16 subjects the content data to processing for output, e.g., decoding, error correction, D/A conversion processing, or the like as to the compression processing, and supplies the audio signals and video signals to the output device 17.

Examples of the output device 17 include a monitor display device, and a speaker device. According to this output device 17, video and audio serving as content data are output, and provided for the user's viewing and listening. Note that it goes without saying that the monitor display device or speaker device serving as the output device 17 may be provided integral with a casing serving as the playback device 1, or may be provided as a stand-alone device.

The display unit 18 is, for example, a small-type display panel provided to the casing of the playback device 1, and performs operation status display, menu display, icon display, equalizer display, title display, message display, or the like by the control of the control unit 11. The display unit 18 is made up of a liquid crystal panel, organic EL panel, or the like, for example. Note that these displays may be performed using the monitor display device serving as the output device 17, and in this case, it can also be conceived that the display unit 18 is not provided. Also, it can also be conceived that message audio is output instead of message display or along with message display, but in this case, it can also be conceived that the speaker serving as the output device 17 is used.

The panel operating unit 19 collectively refers to an operator, for example, such as an operating key, jog dial, and so forth provided to the casing of the playback device 1. Note that, with the display unit 18 or the monitor display device serving as the output device 17, in the event that touch panel input is available, the touch panel mechanism thereof serves as one of the panel operating unit 19.

Also, the command reception unit 20 receives the control command from the remote controller RC (RC1, RC2, etc.). The remote controller RC is a device which transmits command information corresponding to the user's operation by radio waves, infrared rays, or by cable, but the control command information transmitted from the remote controller RC thereof is received and demodulated at the command reception unit 20, and transmitted to the control unit 11.

The user can perform various types of operation input by an operator operation of the panel operating unit 19, a touch panel operation as to the menu display and icon display of the display unit 18 (or monitor display device serving as the output device 17), and further an operation using the remote commander RC.

The control unit 11 performs operation control, setting processing, or the like within the playback device 1, or performs signal transmission processing as to another device from the transmission unit 14, according to the user's operation input.

Figure 2:
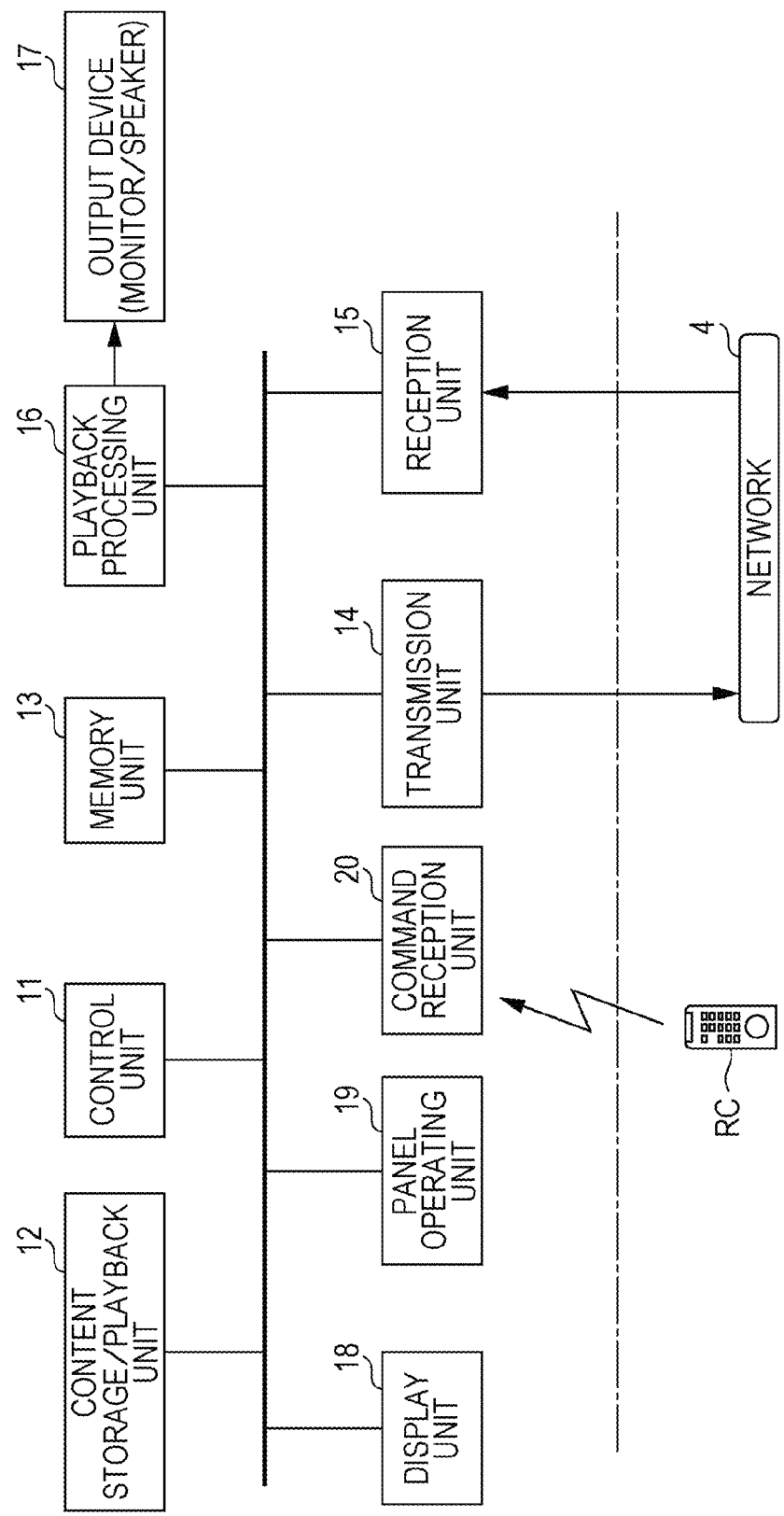
FIG. 2 is a block diagram of a playback device according to an embodiment.

Note that a configuration example as the playback device 1 has been illustrated so far, but each of the playback devices 1A, 1B, and 1C does not necessarily have to have the same configuration as described above, and arrangements may be made wherein another area is added, or the configuration of one portion in FIG. 2 is not included.

2-2. Network Speaker

Next, a configuration example of the network speaker 2 (2A, 2B, 2D1, 2D2) will be described with reference to FIG. 3. The network speaker 2 includes a control unit 21, a playback processing unit 22, a memory unit 23, a transmission unit 24, a reception unit 25, an amplifier unit 26, and a speaker unit 27. Also, the network speaker 2 may include an operating unit 29, and a command reception unit 28.

The control unit 21 is configured of a microcomputer including a CPU, ROM, RAM, and so forth. For example, in addition to a program to be executed by the CPU, various types of setting information for playback operation of distributed contents, communication operation with another device, and so forth are stored in the ROM within the control unit 21. The RAM serves as a main storage device unit for the CPU. This control unit 21 controls the operation of the network speaker 2 so the network speaker 2 can serve as a client device. That is to say, the control unit 21 performs reception control of content data to be distributed and a control command, processing according to a control command, and so forth.

The memory unit 23 collectively refers to a storage unit such as the RAM, ROM, flash memory, and so forth. This memory unit 23 may be used as a work region for the processing of the control unit 21, or may be used as a program storage region. Also, the memory unit 23 is also used for storing various types of setting information, parameters, and so forth for playback operation and communication operation. Further, the memory unit 23 is used as buffer memory of the received content data.

The transmission unit 24 and the reception unit 25 serve as a communication unit with each device via the network 4. The reception unit 25 performs reception of a signal transmitted from the playback device 1, e.g., distributed content data, a control command, and so forth. Subsequently, the reception unit 25 decodes the received signal thereof. At the time of reception of content data by distribution, the reception unit 25 transfers the content data (stream data) received and decoded in accordance with the communication system to the memory unit 23 for buffering based on the control of the control unit 21. Also, in the event that a control command has been received, the reception unit 25 decodes the signal thereof, and transmits the reception information content to the control unit 21.

The transmission unit 24 performs, based on the control of the control unit 21, predetermined encoding regarding a transmission signal as to another device, and performs transmission output as to the network 4. In order to perform such processing, the transmission unit 24 and the reception unit 25 perform encoding, decoding, and transmission/reception processing in accordance with the cable or wireless communication system over the network 4.

The playback processing unit 22 performs processing for playback output at the speaker unit 27 regarding the received content data. For example, the received content data is buffered in the memory unit 23, but each piece of data making up the buffered content data is transferred to the playback processing unit 22 successively at predetermined timing. The playback processing unit 22 subjects the content data to processing for output, e.g., decoding, error correction, D/A conversion processing, or the like as to the compression processing, and supplies the audio signals (e.g., stereo audio signals of L, R channels) to the amplifier unit 26. The amplifier unit 26 amplifies the audio signals as a power amplifier to drive the speaker serving as the speaker unit 27.

Thus, audio such as distributed music content or the like is output from the speaker unit 27, and provided for the user's viewing and listening. Note that the speaker unit 27 may be provided integrally with a casing serving as the network speaker 2, or may be provided as a stand-alone device. In particular, in the event that the speakers of L, R channels are provided as stereo speakers, at least the speaker unit portions usually have a separated configuration.

The network speaker 2 serves only as a client device, but certain operations may also be performed by the user. For example, there may be a case where power on/off control of the network speaker 2 itself, or an operation for performing a distribution request from the network speaker 2 can be performed.

Therefore, the operating unit 29 may be provided as an operator such as an operating key or the like provided to the casing of the network speaker 2. Also, there may also be provided the dedicated remote controller RC, and the command reception unit 28 for receiving the control command from the remote controller RC.

The operating unit 29 and the command reception unit 28 transmit the user's operation information to the control unit 21. The control unit 21 performs appropriate processing according to the operation information, for example, such as power on/off of the network speaker 2 itself, or transmission control of a control command as to another device.

Figure 3:
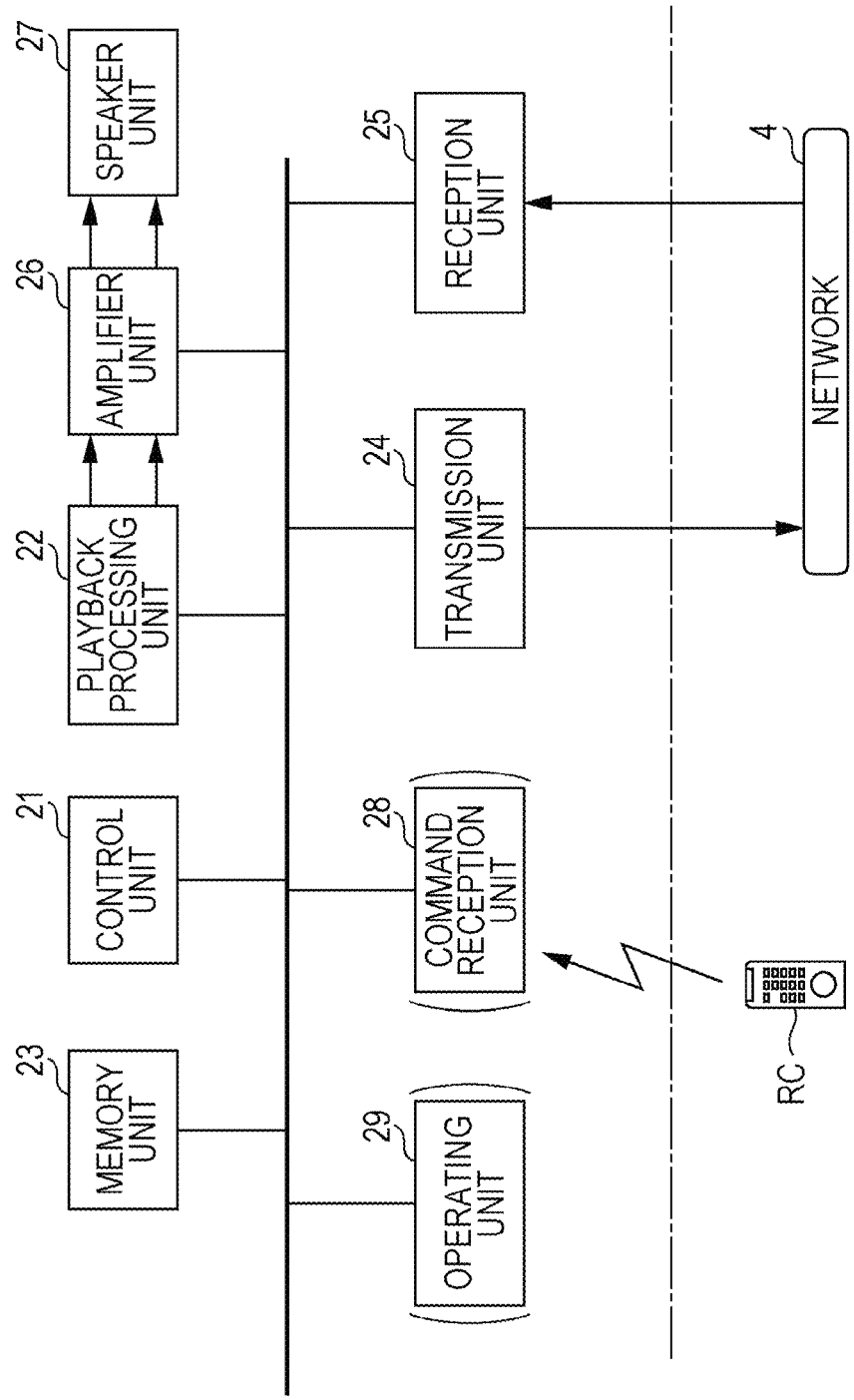
FIG. 3 is a block diagram of a network speaker according to an embodiment.

Though FIG. 3 illustrates a configuration example as the network speaker 2, each of the network speakers 2A, 2B, 2D1, and 2D2 does not necessarily have to have the same configuration as described above, and arrangements may be made wherein another area is added, or the configuration of a portion in FIG. 3 is not provided.

2-3. Remote Controller

Figure 4A:
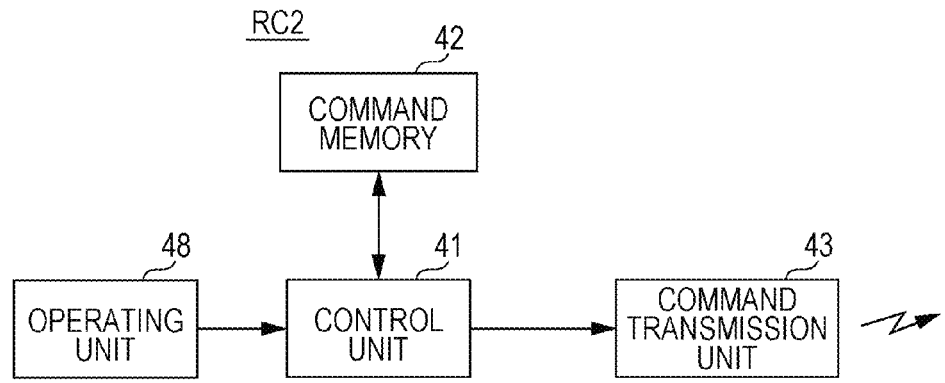
FIG. 4A is a block diagram of a remote controller according to a first embodiment.

Next, a configuration example of the remote controller RC2 will be described with reference to FIGS. 4A and 4B. FIG. 4A is a configuration example serving as the remote controller RC2 according a later-described first embodiment.

The remote controller RC2 includes a control unit 41, command memory 42, a command transmission unit 43, and an operating unit 48. The control unit 41 is configured of a microcomputer.

The operating unit 48 is made up of an operating key disposed on a remote controller casing such as later-described FIG. 9, or an operator such as an operating dial or the like, and an operation detection circuit for propagating the operation information of the operator to the control unit 41.

The command memory 42 is made up of ROM, nonvolatile memory, or the like, and stores various types of command codes. The command transmission unit 43 performs modulation and transmission for transmitting a command code using, for example, infrared rays or radio waves.

With the remote controller RC2, upon the user operating an operating key or the like of the operating unit 48, the control unit 41 detects the key operation thereof, and subsequently reads out a command code corresponding to the operated key thereof from the command memory 42. The control unit 41 supplies the readout command code to the command transmission unit 43, executes predetermined modulation processing, and transmits as infrared ray signals or radio wave signals.

Note that in the event of a remote controller connected to the playback device 1 by cable, the command transmission unit 43 serves as a portion for transmitting the command code by cable. The remote controller RC2 in FIG. 4A has the same configuration as the configuration of a common remote controller.

Figure 4B:
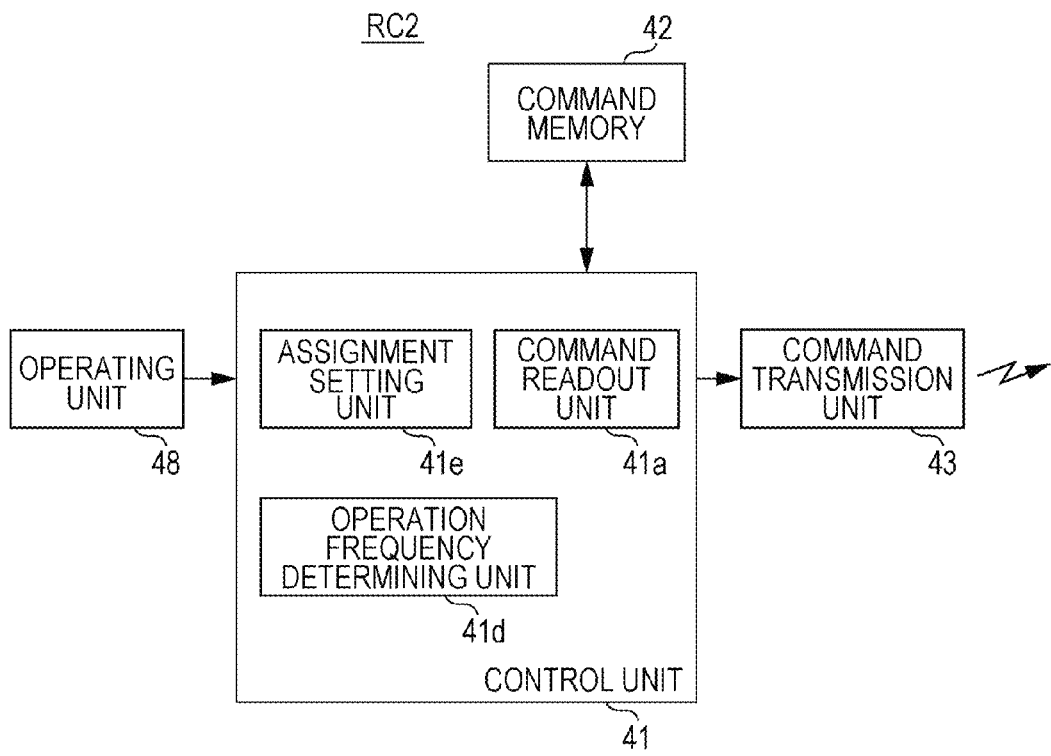
FIG. 4B is a block diagram of a remote controller according to a second embodiment.

Next, FIG. 4B illustrates a configuration example of the remote controller RC2 in the event of the second embodiment. Basically, in the same way as with FIG. 4A, the remote controller RC2 includes the control unit 41, command memory 42, command transmission unit 43, and operating unit 48, but in this case, assignment settings can be performed relating to the operation of the operator. Also, after assignment settings have been performed, readout of the command code corresponding to the user's predetermined operation is performed.

Therefore, a command readout unit 41*a*, an assignment setting unit 41*e*, and an operation number-of-times determining unit 41*d* are formed at the control unit 41 as functional configurations realized by a software program thereof.

The assignment setting unit 41*e* is, when the user performed work for assigning a key operation in a predetermined operation mode to a particular operation as assignment processing, a function for registering assignment thereof. Details thereof will be described later in the second embodiment. An example of this is that a different command code is assigned according to the number of times of operation of a key. The operation number-of-times determining unit 41*d* determines the number of times of operation of one key.

The command readout unit 41*a* is a function for reading out a command code from the command memory 42 according to operations. In the event that operations for assignment setting have been performed, readout of a command code is performed according to the setting thereof.

Next, a configuration example of the remote controller RC1 with display and touch panel functions, which will serve as a control device in the third embodiment, will be described with reference to FIG. 5.

The remote controller RC1 includes the control unit 41, command memory 42, and command transmission unit 43, reads out a command code from the command memory 42 according to the user's operation, and transmits from the command transmission unit 43 as a control command, which is the same as with the remote controller RC2 in FIGS. 4A and 4B.

With the remote controller RC1, the user operations are performed with touch panel operations instead of operating key operations. Therefore, unit a display unit 45 is provided, and a touch panel sensor 46 is formed on the display face of the display unit 45.

The display unit 45 is made up of, for example, a liquid crystal panel or organic EL panel or the like, and the touch panel sensor 46 such as a piezoelectric sensor or electrostatic sensor or the like is provided to the face of the display unit 45 thereof, whereby the touch panel is formed.

With the display unit 45, for example, buttons and icons and so forth for operations are displayed, or the display of each device over the network is performed, which will be described in the third embodiment. The display unit 45 is driven by the display driving unit 44 so as to perform display. The control unit 41 provides display data to the display driving unit 44, whereby the display driving unit 44 provides a display driving signal to the display unit 45 based on the display data to execute predetermined screen display.

The user performs a touch operation according to the display content. The touch panel sensor 46 transmits the information of a touch operation to the position detection unit 47. The position detection unit 47 distinguishes the position (X-Y coordinate position on the display face) of the user's operation (touch operation) thereof, and transmits to the control unit 41 as touch position information.

With the control unit 41, as a functional configuration realized by the software program thereof, a command readout unit 41*a*, a display control unit 41*b*, and an input detection unit 41*c* are formed.

The input detection unit 41*c* recognizes the information of the touch position from the position detection unit 47, and determines the operation content that the user desires by the touch position thereof, or the path of the touch operation.

The command readout unit 41*a* reads out a command code from the command memory 42 according to the operation content determined by the input detection unit 41*c*, and supplies to the command transmission unit 43.

The display control unit 41*b* supplies the display data serving as the display content at the display unit 45 to the display driving unit 44. For example, the display control unit 41*b* generates display data to be executed at the display unit 45, such as operation icon display or device icon display or the like. The display control unit 41*b* may perform display such that the touch position, or the path of the touch operation, detected at the input detection unit 41*c* is indicated on the display screen depending on conditions.

Note that the command transmission unit 43 may be configured, for example, as a network communication unit, whereby the remote controller RC2 can directly transmit a control command to each device over the network, in addition to the configuration for transmitting a control command to the corresponding device such as the playback device 1A or the like.

3. First Embodiment

The first embodiment of the present invention will be described. Description will now be made with reference to the example illustrated in FIG. 1 wherein the control device according to the first embodiment of the present invention is realized by the remote controller RC2 and playback device 1B disposed in the room B. Note that, in this case, the playback device 1B may serve as a server device over the network system, or may serve as a client device.

Let us say that the remote controller RC2 has the configuration illustrated in FIG. 4A. With the present embodiment, the user can perform each operation of the above first, second, and third cases by operations using the remote controller RC2. In this case, the first, second, and third cases are as follows.

First Case: Case where the user of the remote controller RC2 intends to perform some sort of operations with the playback device 1B alone as an object Second Case: Case where the user of the remote controller RC2 intends to perform common operations with the devices within the room B, i.e., the playback device 1B and network speaker 2B as an object Third Case: Case where the user of the remote controller RC2 intends to perform operations with all of the devices over the network (playback devices 1A, 1B, and 1C, network speakers 2A, 2B, 2D1, and 2D2) as an object The user is allowed to execute the operations of each case of these using the regular remote controller RC2. With the first embodiment, each case is differentiated as follows: in the event that the user has pressed one operation key of the remote controller RC2 once (single-press), in the event of having quickly pressed the key twice in a row (double-press), and in the event of having quickly pressed the key three times in a row (triple-press).

Hereafter, description will be made regarding a case where the user performs a mute operation, as an example. In FIG. 6, (a), (b), and (c) each schematically illustrate, regarding the first, second, and third cases, the operation of a mute key provided to the remote controller RC2, transmission commands from the remote controller RC to the playback device 1B, and the processing of the control unit 11 of the playback device 1B.

In FIG. 6, (a) is a case of the first case. The user singly presses the mute key of the remote controller RC2. Note that pulse waveforms illustrated as "mute key operation" in each diagram indicate on/off of the operation key.

The control unit 41 of the remote controller RC2 reads out a command code for mute control from the command memory 42 by detecting the operation of the mute key, and transmits from the command transmission unit 43. As illustrated in the drawing, a mute command is transmitted once.

Note that, in actual practice, with "one-time" transmission, the same command code is often disposed multiple times on a predetermined transmission format and transmitted, but let us say here that transmission corresponding to a single key press is taken as a "one-time" command transmission (even if multiple command codes are included). Upon recognizing that a mute command has been transmitted once, the control unit 11 of the playback device 1B determines this to be operation input equivalent to the first case, i.e., recognizes this as a command with the playback device 1B itself alone as a control object.

Subsequently, in response to this, the control unit 11 transmits a control signal to the playback processing unit 16 to perform a mute instruction, and mutes playback output audio. Note that a control mode corresponding to such a first case will be referred to as "single device mode", for convenience of description.

In FIG. 6, (b) is a case of the second case. The user performs double-press of the mute key of the remote controller RC2. The control unit 41 of the remote controller RC2 reads out a command code for mute control from the command memory 42 each time the operation of the mute key is detected, and transmits from the command transmission unit 43. Accordingly, as illustrated in the drawing, the mute command has been transmitted twice.

Upon recognizing that the mute command has been transmitted twice within a certain time, the control unit 11 of the playback device 1B determines this to be operation input equivalent to the second case, i.e., recognizes this as a command with the devices within the room B as a control object.

Subsequently, in response to this, the control unit 11 transmits a control signal to the playback processing unit 16 to perform a mute instruction, and mutes its own playback output audio. In addition to this, the control unit 11 generates a mute control command as to the network speaker 2B within the same room B, and transmits from the transmission unit 14.

The network speaker 2B receives this mute control command by the reception unit 25. The control unit 21 of the network speaker 2B performs, in response to this mute control command, a mute instruction as to the playback processing unit 22 to mute its own playback output audio. Thus, mute control is performed within the room B. Note that a control mode corresponding to such a second case will be referred to as "in-room mode", for convenience of description.

In FIG. 6, (c) is a case of the third case. The user performs triple-press of the mute key of the remote controller RC2. The control unit 41 of the remote controller RC2 reads out a command code for mute control from the command memory 42 each time the operation of the mute key is detected, and transmits from the command transmission unit 43. Accordingly, as illustrated in the drawing, the mute command has been transmitted three times.

Upon recognizing that the mute command has been transmitted three times within a certain time, the control unit 11 of the playback device 1B determines this to be operation input equivalent to the third case, i.e., recognizes this as a command with all of the devices over the network as a control object.

Subsequently, in response to this, the control unit 11 transmits a control signal to the playback processing unit 16 to perform a mute instruction, and mutes its own playback output audio. In addition to this, the control unit 11 generates a mute control command as to all of the devices over the network, and transmits from the transmission unit 14.

Each of the other devices (playback devices 1A and 1C, network speakers 2A, 2B, 2D1, and 2D2) over the network receives this mute control command by the reception units 15 and 25. The control units 11 and 21 thereof perform, in response to this mute control command, a mute instruction as to the playback processing units 16 and 22 to mute their own playback output audio. Thus, mute control is performed regarding the entire network. Note that a control mode corresponding to such a third case will be referred to as "entire mode", for convenience of description.

Note that all of the devices over the network serving as a control object in this entire mode are, in this case, the playback devices 1A, 1B, and 1C, and the network speakers 2A, 2B, 2D1, and 2D2, but do not include the remote controllers RC1 and RC2. This is because the remote controllers RC1 and RC2 in this case are not devices directly connected to the network 4, and are adamantly ancillary devices of the playback devices 1A and 1B.

However, there may be some devices which are directly connected to the network 4 in a manner such as a network remote controller, and are capable of controlling each device. Such a device may be included in "all devices".

For example, in the event that a network remote controller is a device which receives distribution from a server device, performs audio playback output, and performs music output by a speaker or headphone, this is included in "all devices" as used here. This point is applied to the later-described second and third embodiments.

Also, with regard to command transmission as to all of the devices over the network, a command may individually be transmitted to each device in order, or each device may be allowed to recognize a command by one command transmission if a common command code is set to each device. This point is applied to later-described second and third embodiments.

As described above, with the first embodiment, a control object is determined according to the number of times of pressing of the operation key of the remote controller RC2. The remote controller RC2 itself simply performs only command transmission according to the key operation.

In the event of the present first embodiment, the control device is realized by the remote controller RC2, and the control unit 11 of the playback device 1B. That is to say, the remote controller RC2 is a separate "operating unit" referred to in the Summary of the present invention, the control unit 11 of the playback device 1B is equivalent to "control unit" referred to in the Summary, and the transmission unit 14 is equivalent to "transmission unit" referred to in the Summary. In this case, the control unit 11 performs the processing illustrated in FIG. 7. FIG. 7 illustrates the processing of the control unit 11 at the time of receiving the transmitted command from the remote controller RC2.

Upon receiving the transmitted command from the remote controller RC2 in step F101, the control unit 11 advances the processing to step F102, and performs reception detection of a further transmitted command from the remote controller RC2 while standing by for a certain time. The certain time may be one to three seconds or so, for example.

Upon the certain time having elapsed, the control unit 11 proceeds to step F103, and branches the processing depending on whether or not a command has been consecutively received within the certain time.

If there has not been no command reception of the second henceforth during standby in step F102, the control unit 11 regards this as the single device mode (first case) to proceed to step F105, and perform control within the playback device 1B according to the command content. For example, in the event of a mute command, the control unit 11 instructs the playback processing unit 16 to muting.

On the other hand, if commands have been consecutively received within the certain time, the control unit 11 advances the processing to step F104, and selects a control mode depending on whether two-time reception or three-time reception.

In the event of two-time reception, the control unit 11 regards this as the in-room mode (second case), and proceeds to step F106. Subsequently, the control unit 11 performs control within the playback device 1B according to the command content. For example, in the event of a mute command, the control unit 11 instructs the playback processing unit 16 to muting.

Further, in step F107 the control unit 11 transmits a control command to another device in the room B, i.e., the network speaker 2B. For example, a mute command is transmitted.

Also, in the event of three-time reception, the control unit 11 regards this as the entire mode (third case), and advances the processing from step F104 to step F108. Subsequently, the control unit 11 performs control within the playback device 1B according to the command content. For example, in the event of a mute command, the control unit 11 instructs the playback processing unit 16 to muting.

Further, in step F109, the control unit 11 transmits a control command to all of the devices over the network. For example, a mute command is transmitted.

The control unit 11 performs processing such as described above, whereby the user can readily perform an operation corresponding to the first, second, or third case using the remote controller RC2. Specifically, as the second case, in the event of muting all the devices in the room B, operations do not have to be performed for each device.

Also, when intending to mute all the devices within a house as the third case, botheration such as going to a certain room where a device serving as a server device exists, or making the rounds of each room for muting, can be prevented.

Further, the remote controller RC2 may be an ordinary remote controller having no special function, which prevents increase in device burden on the system.

Also, each case can be distinguished with the number of times of operation of an operating key, and accordingly, the user operations can easily and readily be performed, and also, understanding of user operations is easy. This arrangement is thus excellent as a user interface.

With the above description, a case where mute control is performed has been described as an example, but with regard to operations such as power on/off of a device, playback (distribution) start, playback (distribution) pause, volume up/down, and so forth as well, each control of the single device mode, in-room mode, and entire mode can similarly be applied thereto.

Note that, with the above examples, the control device according to the present embodiment is realized by the control unit 11 of the playback device 1B, and the remote controller RC2, but may be realized by the playback device 1B alone, for example. An example of this is a case where the control unit 11 selects the single device mode, in-room mode, or entire mode according to the number of times of operation of an operating key of the panel operating unit 19 of the playback device 1B, and generates a control command.

Also, there may be an example wherein the playback device 1B transfers a command from the remote controller RC2 to another device (e.g., playback device 1A), and the playback device 1A selects the single device mode, in-room mode, or entire mode, and transmits a control command to a target device.

4. Second Embodiment

The second embodiment will be described. The present second embodiment will be described with reference to an example wherein the control device according to the second embodiment of the present invention is realized by the remote controller RC2 alone disposed in the room B. Let us say that the remote controller RC2 has the configuration illustrated in FIG. 4B.

With the present second embodiment as well, let us say that the user performs each operation of the first, second, and third similar to the above first embodiment, by operations using the remote controller RC2 in the room B. Also, with the present second embodiment as well, each case is properly used in the event that the user has pressed one operation key of the remote controller RC2 once (single-press), in the event of having quickly pressed the key twice in a row (double-press), and in the event of having quickly pressed the key three times in a row (triple-press).

In the event of the second embodiment, the control unit 41 of the remote controller RC2 sets the single device mode, in-room mode, or entire mode according to the user operations, and transmits a different control command according thereto to the playback device 1B. The playback device 1B side performs processing set according to the content of the received control command.

Difference as to the above first embodiment is in that selection setting of the single device mode, in-room mode, and entire mode according to the user's operation mode is not performed on the playback device 1B side but at the remote controller RC2 side. Description will be made regarding a case where the user performs a mute operation, as an example.

Figure 8:
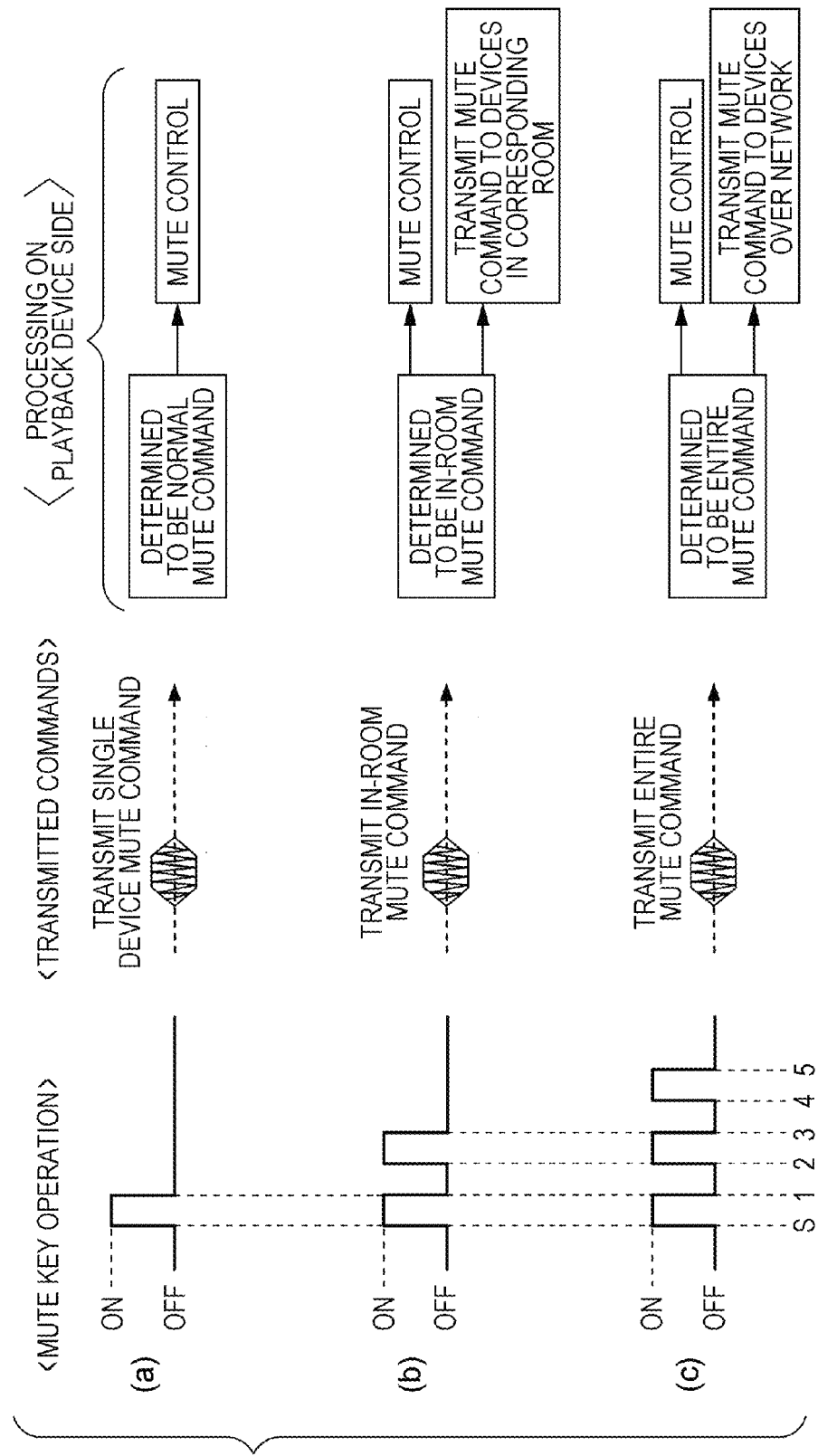
FIG. 8 is an explanatory diagram of operations and control processing according to the second embodiment.

In FIG. 8, (a), (b), and (c) each schematically illustrate, regarding the first, second, and third cases, the operation of the mute key provided to the remote controller RC2, transmission commands from the remote controller RC to the playback device 1B, and the processing of the control unit 11 of the playback device 1B.

In FIG. 8, (a) is a case of the first case. The user singly presses the mute key of the remote controller RC2. As illustrated in FIG. 4B, the control unit 41 of the remote controller RC2 has a function serving as the operation number-of-times determining unit 41d. The operation number-of-times determining unit 41d of the control unit 41 detects how many times the user has pressed an operating key within a certain time.

Upon detecting that the user has performed a single-press operation of the mute key, the control unit 41 regards this as the single device mode, and reads out the command code registered in the command memory 12 corresponding to "mute key single-press" (single device mute command). Subsequently, the control unit 41 transmits the single device mute command from the command transmission unit 43.

The control unit 11 of the playback device 1B which has received this single device mute command recognizes the single device mute command, and performs processing corresponding thereto. Specifically, the control unit 11 transmits a control signal to the playback processing unit 16 to perform a mute instruction, and mutes playback output audio.

In FIG. 8 (b), is a case of the second case. The user performs double-press of the mute key of the remote controller RC2.

The control unit 41 of the remote controller RC2 detects double-press by the operation number-of-times determining unit 41d. Then, the control unit 41 regards this as the in-room mode, and reads out the command code registered in the command memory 12 corresponding to "mute key double-press" (in-room mute command). Subsequently, the control unit 41 transmits the in-room mute command from the command transmission unit 43.

The control unit 11 of the playback device 1B which has received this in-room mute command performs processing according thereto. Specifically, the control unit 11 transmits a control signal to the playback processing unit 16 to perform a mute instruction, and mutes its own playback output audio. In addition to this, the control unit 11 generates a mute control command as to the network speaker 2B in the same room B, and transmits from the transmission unit 14.

The network speaker 2B receives this mute control command by the reception unit 25. The control unit 21 of the network speaker 2B performs, in response to this mute control command, a mute instruction as to the playback processing unit 22 to mute the its playback output audio. Thus, mute control is performed within the room B.

In FIG. 8, (c) is a case of the third case. The user performs triple-press of the mute key of the remote controller RC2.

The control unit 41 of the remote controller RC2 detects triple-press by the operation number-of-times determining unit 41d. Then, the control unit 41 regards this as the entire mode, and reads out the command code registered in the command memory 12 corresponding to "mute key triple-press" (entire mute command). Subsequently, the control unit 41 transmits the entire mute command from the command transmission unit 43.

The control unit 11 of the playback device 1B which has received this entire mute command performs processing according thereto. Specifically, the control unit 11 transmits a control signal to the playback processing unit 16 to perform a mute instruction, and mutes its own playback output audio. In addition to this, the control unit 11 generates a mute control command as to all of the devices over the network, and transmits from the transmission unit 14.

Each of the other devices (playback devices 1A and 1C, network speakers 2A, 2B, 2D1, and 2D2) over the network receives this mute control command by the reception units 15 and 25. The control units 11 and 21 thereof perform, in response to this mute control command, a mute instruction as to the playback processing units 16 and 22 to mute their own playback output audio. Thus, mute control is performed regarding the entire network.

As described above, with the second embodiment, the remote controller RC2 selects a control mode by the number of times of pressing of an operating key, and transmits a control command corresponding to the control mode.

In the event of the present second embodiment, the control device is realized by the remote controller RC2. That is to say, the operating unit 48 of the remote controller RC2 is an integral "operating unit" referred to in the Summary of the present invention, the control unit 41 is equivalent to "control unit" referred to in the Summary, and the command transmission unit 43 is equivalent to "transmission unit" referred to in the Summary.

With the remote controller RC2 according to the second embodiment, a different command code is transmitted according to the single-press, double-press, and triple-press of an operating key.

A command code according to the number of times of operation may be fixedly assigned beforehand, but if the user can assign a command code according to the number of times of operation, operability understandable for the user can be provided. Therefore, it is desirable to perform key settings by the user as follows.

Figure 9:
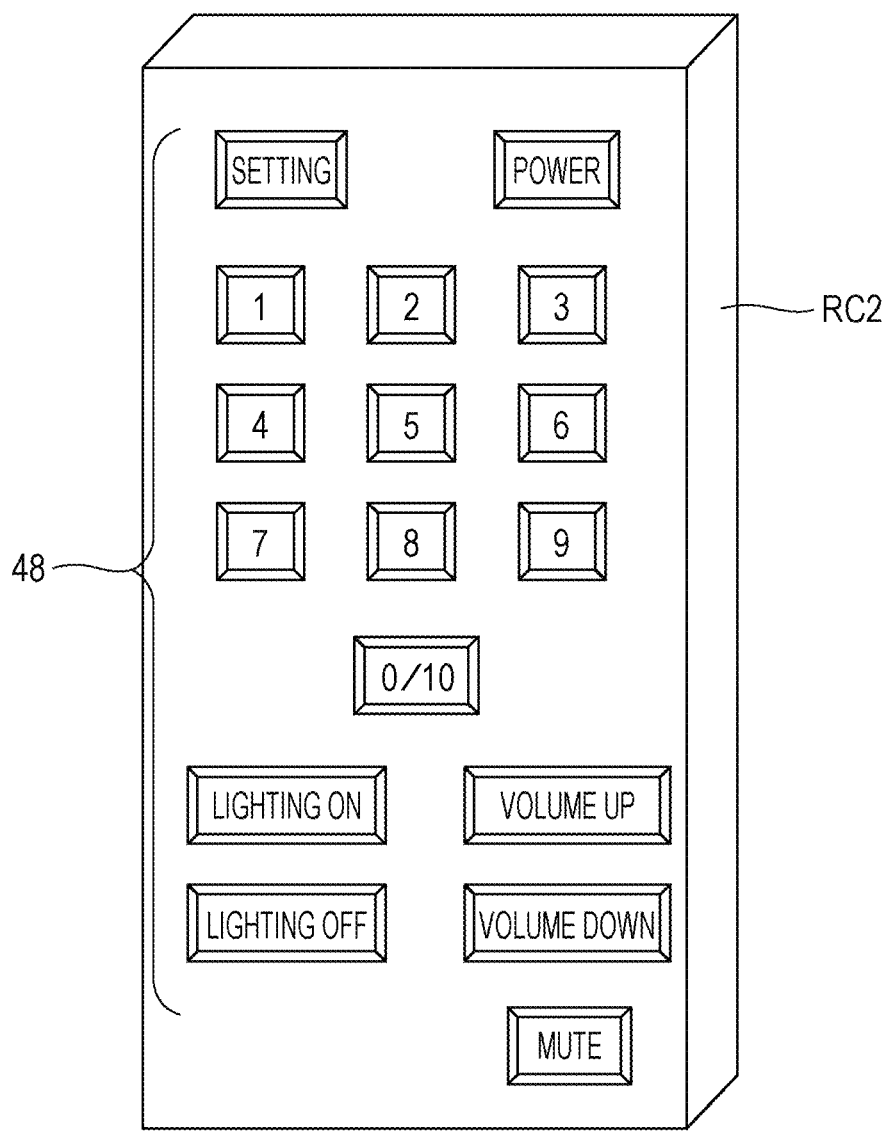
FIG. 9 is an explanatory diagram of the appearance of a remote controller according to the second embodiment.

FIG. 9 illustrates an appearance example of the remote controller RC2. Various types of operating keys are formed on top face of the main frame as the operating key 48. Examples of the operating keys include a power key, numeric keys, a volume up key, a volume down key, and a mute key.

In particular, in the event of the second embodiment, a setting key is prepared as illustrated in the drawing, whereby this key allows the user to perform assignment operations.

For example, upon pressing "setting key"→"2 key"→"1 key", an in-room mode command for controlling the entire room is assigned regarding double-press.

Upon pressing "setting key"→"3 key"→"2 key", an entire mode command for controlling the entire network is assigned regarding triple-press.

As illustrated in FIG. 4B, a function serving as the assignment setting unit 41e is provided to the control unit 41. Upon detecting that a numeric key has been pressed following the setting key, the assignment setting unit 41e performs the command code setting according thereto.

With the above examples, let us say that a numeric key following "setting key" indicates the number of times of pressing, and the next numeric key thereof performs specification of the control mode (in-room mode or entire mode). For example, let us say that the "1 key" is specification for the in-room mode, and the "2 key" is specification for the entire mode.

Command transmission such as shown in FIG. 8 can be performed by the user performs such a setting. Specifically, in the event of single-press, such as the power key, volume up key, volume down key, mute key, or the like, being performed, the control unit 41 transmits a command with the corresponding device alone as an object (single device command) in the same way as with an ordinary remote controller.

On the other hand, in the event that double-press of such an operating key has been performed, the control unit 41 regards this as the in-room mode in accordance with the above setting, and transmits the in-room command.

Also, in the event that triple-press of such an operating key has been performed, the control unit 41 regards this as the entire mode in accordance with the above setting, and transmits the entire command.

As described above, such settings may be fixedly made beforehand, but an arrangement which allows the user to make the settings will allow for a user-friendly setting to be realized.

For example, if the user frequently uses an operation in the entire mode, the user performs a setting operation such as "setting key"→"2 key"→"2 key", whereby the entire mode command for controlling the entire network can be assigned regarding double-press.

For example, if such settings are performed by a function serving as the assignment setting unit 41e, at the time of user operations thereafter, the operation number-of-times determining unit 41*d* determines the number of times of operation of one operating key in a row, and the command readout unit 41*a* reads out the command code according to the control mode selected from the number of times of operation. Subsequently, the command code thereof is transmitted from the command transmission unit 43.

Processing for performing command transmission such as in FIG. 8 of the control unit 41 of the remote controller RC2 will be described with reference to FIG. 10.

Upon detecting a key operation, the control unit 41 advances the processing from step F201 to step F202, and activates an edge detection counter. Subsequently, the control unit 41 stands by for a certain amount of time in step F203.

The edge detection counter is a counter for counting the leading edge and trailing edge of quick single-press of an operating key by the interrupting function of the microcomputer.

The leading edge and trailing edge of quick single-press are the edges of a pulse input to the control unit 41 according to the operation of an operating key of the operating unit 48. The edge detection counter is a counter for counting the number of times of the leading edge and trailing edge of a pulse, such as illustrated as the mute key operation in FIG. 8, for example.

The edge position "S" illustrated in FIG. 8 is an edge when a key operation is detected first in step F201, and the number of edges of subsequent "1", "2", . . . , "5" are counted by the edge detection counter.

The certain time at the time of standing by in step F203 is, for example, 500 msec. Then, according to interruption during this 500 msec., how many edges there have been can be viewed. This time is sufficient if triple quick press can readily be performed, 300 msec. is desirable if quick response is prioritized, and 1000 msec. is desirable if ease of pressing is prioritized. If this time is set too long, the pressing may be erroneously determined to be re-click of single-press, and accordingly, a time setting adapted to the end user is desirable, and may be changed from person to person.

During standing by in step F203, the number of pulse edges is counted. Here, the control unit 41 determines the number of times of operation from the number of counted edges in steps F204, F205, and F206. As can be understood from FIG. 8, if the edge count value is one, this is determined to be single-press, and if three, this is determined to be double-press, and if five, this is determined to be triple-press.

The above steps F202 through F206 are operations performed by the operation number-of-times determining unit 41*d*.

When the edge count is one, the control unit 41 proceeds from step F204 to step F207, and performs command transmission serving as the single device mode. Specifically, the command readout unit 41*a* reads out the command code according to the single-press of the operated key from the command memory 42, and transmits from the command transmission unit 43.

When the edge count is three, the control unit 41 proceeds from step F205 to step F208, and performs command transmission serving as the in-room mode. Specifically, the command readout unit 41*a* reads out the command code according to the double-press of the operated key from the command memory 42, and transmits from the command transmission unit 43.

When the edge count is five, the control unit 41 proceeds from step F206 to step F209, and performs command transmission serving as the entire mode. Specifically, the command readout unit 41*a* reads out the command code according to the triple-press of the operated key from the command memory 42, and transmits from the command transmission unit 43.

Figure 10:
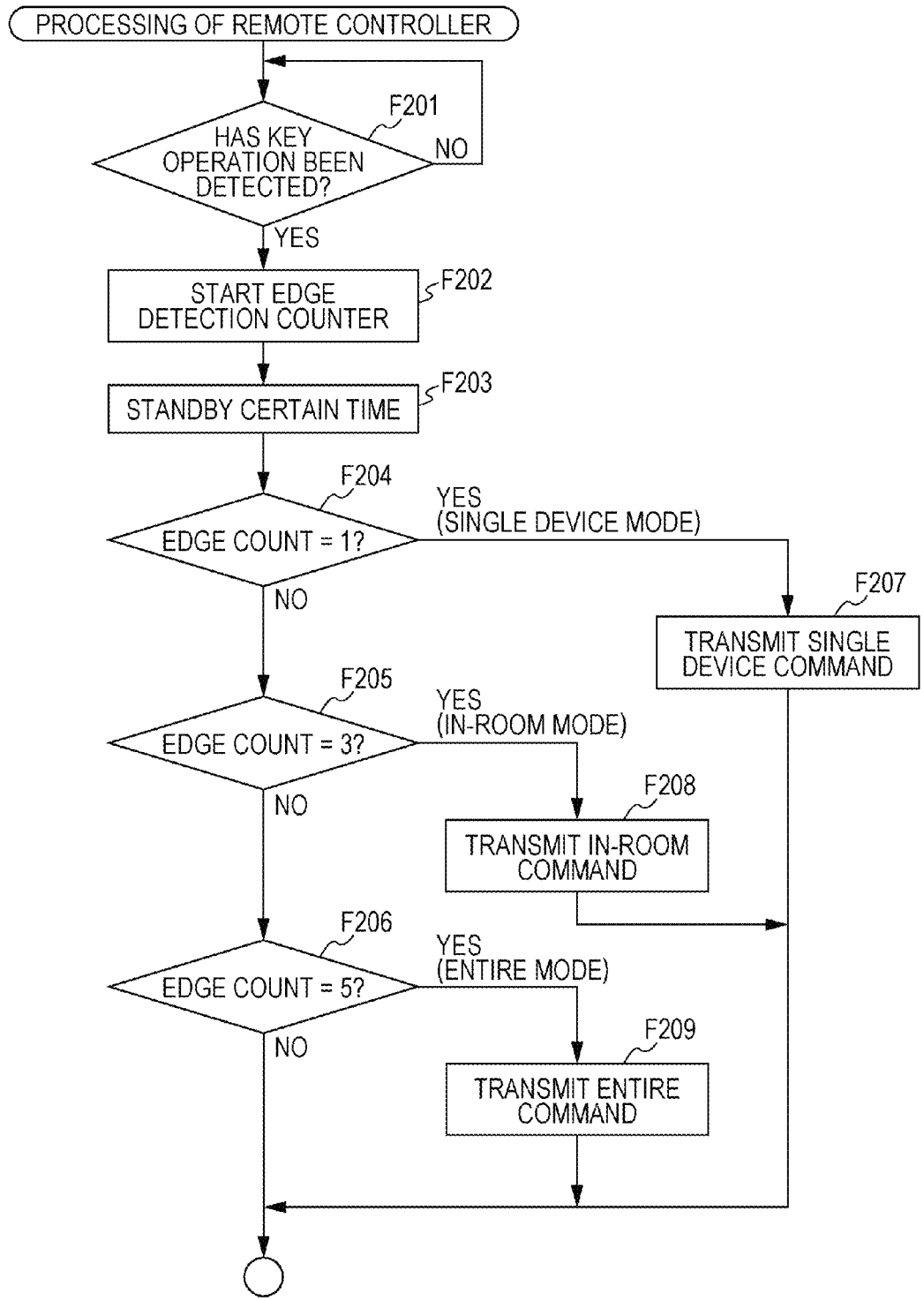
FIG. 10 is a flowchart of the processing of the remote controller according to the second embodiment.

According to the above processing in FIG. 10, the remote controller RC2 can perform control command transmission according to the first, second, or third case.

Figure 11:
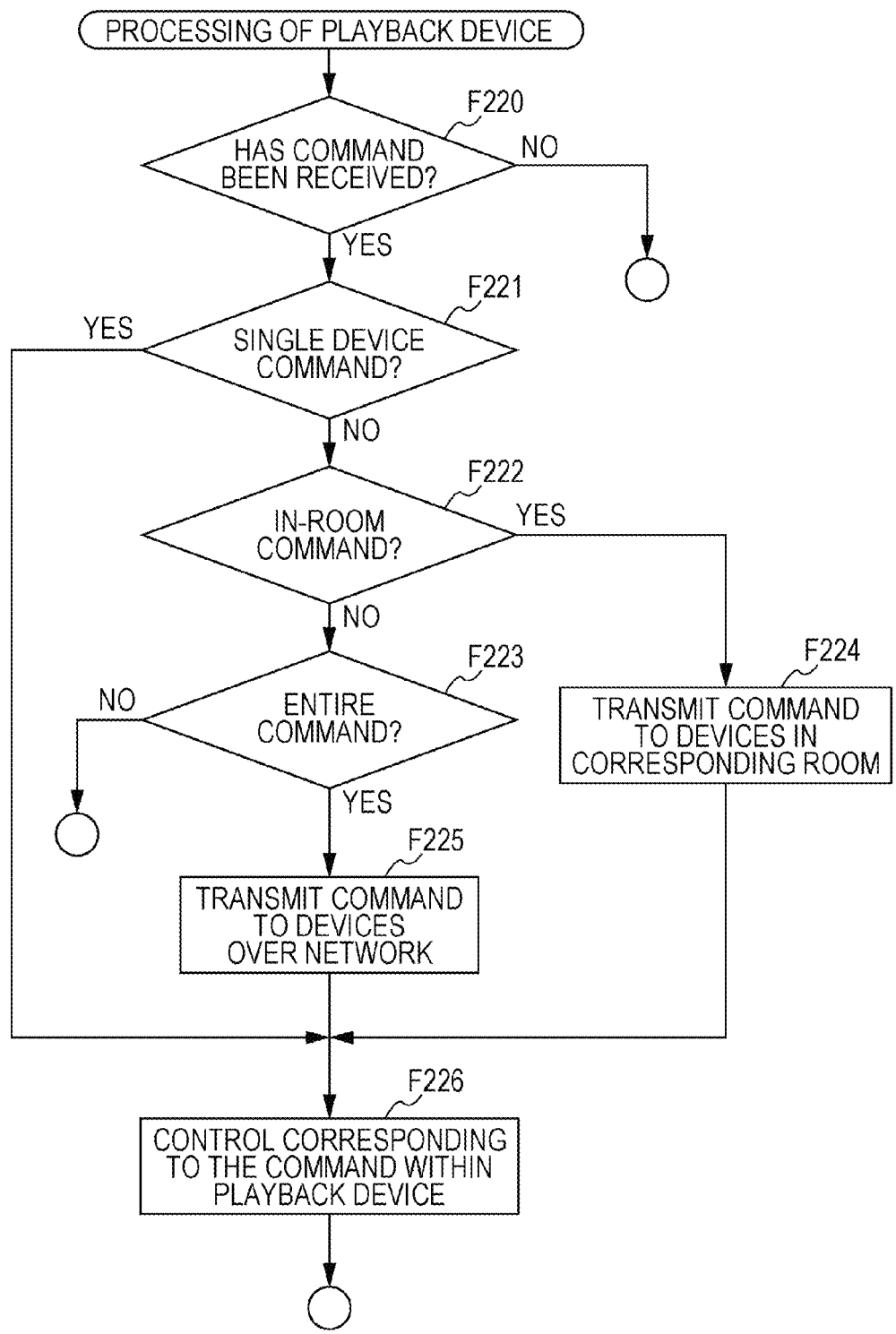
FIG. 11 is a flowchart of the processing of a playback device according to the second embodiment.

It is sufficient for the playback device 1B side to perform the processing in FIG. 11 according to the received control command.

Upon detecting command reception from the remote controller RC2, the control unit 11 of the playback device 1B recognizes the command content, and in the event of the single device command, proceeds from step F221 to step F226. Subsequently, the control unit 11 performs control for executing operation according to the command content regarding the playback device 1B. An example of this is control of such as mute, power on/off, volume up/down, and so forth with the playback device 1B.

On the other hand, if the received command is the in-room command, the control unit 11 proceeds from step F222 to step F224, and performs processing for transmitting the control command of the received command content to a device in the same room, i.e., the network speaker 2B. Along therewith, the control unit 11 performs control within its own playback device 1B in step F226.

Also, if the received command is the entire command, the control unit 11 proceeds from step F223 to step F225, and performs processing for transmitting the control command of the received command content to all of the devices over the network. Along therewith, the control unit 11 performs control within its own playback device 1B in step F226.

In this way, in the event of the single device command, the control unit 11 of the playback device 1B performs self control, and in the event of the in-room command or entire command, transfers the control command to an object device along with self control, whereby control of each case that the user intends is executed.

According to such a second embodiment as well, in the same way as with the first embodiment, the user can readily perform operations according to the first, second, or third case using the remote controller RC2 without increasing the device burden on the system.

Note that, with the above examples, an arrangement has been made wherein the remote controller RC2 transmits the control command of each case to the playback device 1B, and in the event of the in-room mode or entire mode, the playback device 1B transfers the control command to the device to be controlled. However, in the event of an arrangement wherein the remote controller RC2 can directly transmit the control command to each device via the network 4, in the event of the in-room mode or entire mode, the remote controller RC2 may directly transmit the control command to each device in order.

5. Modifications of First and Second Embodiments

With the above first and second embodiments, operations according to the three cases of the number of times of operation of an operating key, i.e., single-press, double-press, and triple-press can be performed, but other than this, various modifications can be conceived. Hereafter, various modifications will be exemplified.

Figure 12A:
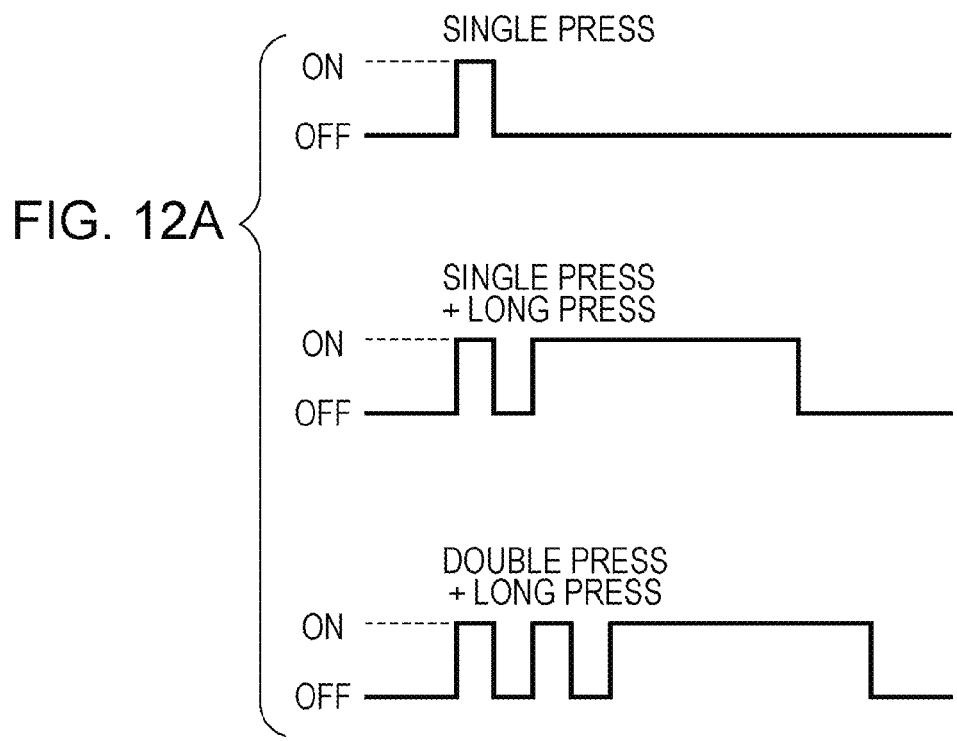
FIGS. 12A and 12B are explanatory diagrams of a modification of the first and second embodiments.

FIG. 12A is an example wherein the number of times of operation and long press of a key are combined as the three types of operation mode. For example, single-press is taken as a normal operation, i.e., an operation in the single device mode.

Next, a long press (e.g., continuously pressing one second or more) operation following single-press is taken as an operation in the in-room mode. Also, an operation of two single-presses in a row, and then a long press, is taken as an operation in the entire mode.

Figure 12B:
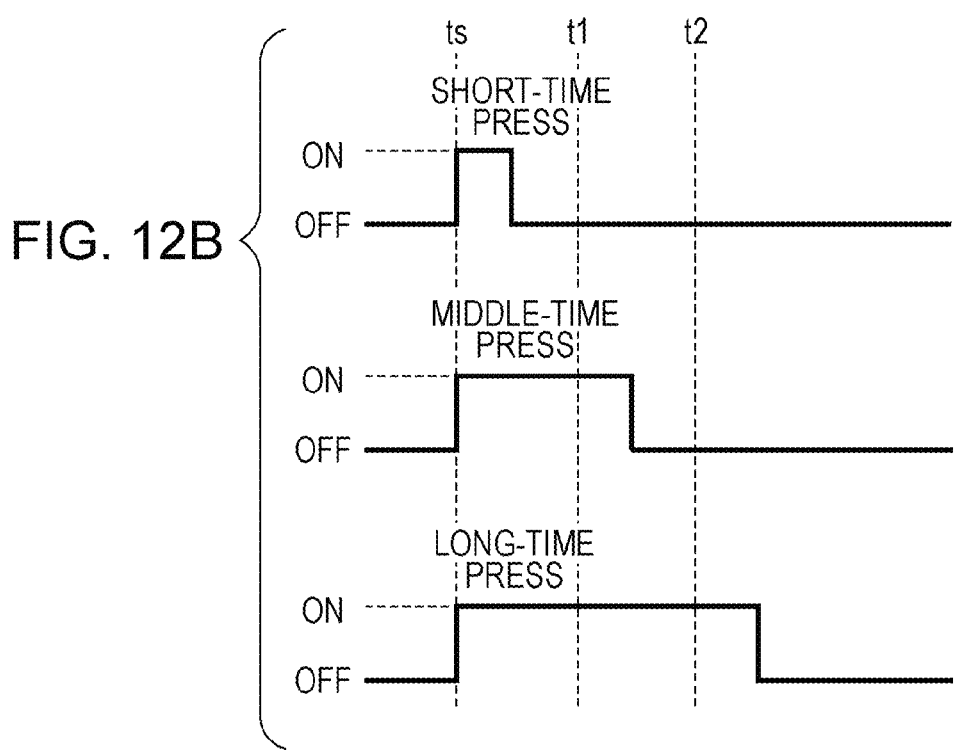

FIG. 12B is an example wherein three types of operation mode are distinguished by the operation time of a key. For example, in the event of short-time press wherein pressure is completed within time t1 from pressure start time point is of an operating key, this is taken as an ordinary operation, i.e., as an operation in the single device mode.

Also, in the event that the pressure time is between the time t1 through t2, this is taken as middle-time press, and this is taken as an operation in the in-room mode. Also, in the event of long-time press wherein the pressure time is equal to or greater than the time t2, this is taken an operation in the entire mode.

As shown in FIGS. 12A and 12B, not only the number of times of operation but also operation time can also be employed as an operation mode for distinguishing the three cases.

In the event of the first embodiment, the control unit 11 of the playback device 1B, and in the event of the second embodiment, it is sufficient for the control unit 41 of the remote controller RC2 to distinguish these operation modes, and to transmit a relevant control command.

Though not illustrated in the drawing, further other examples can be conceived, such as distinguishing by "single-press"/"double-press"/"long press", distinguishing by "single-press"/"single-press+long press"/"long press", and so forth.

It goes without saying that of the three operation modes in FIGS. 12A and 12B, 6, and 8, which is taken as an operation in the single device mode, which is an operation in the in-room mode, and which is an operation in the entire mode, are not restricted to the above examples.

Incidentally, though the examples in FIGS. 6, 8, and 12A and 12B are without problem regarding mute control, power on/off control, volume one-step up/down control, and so forth, the user operations may include an operation for performing a continuous operation.

For example, there may be controlling volume up/down while the volume key is continuously pressed, or controlling fast forward playback or fast rewind playback while a fast forward key or fast rewind key is continuously pressed.

The continuous operation period of an operating key has a meaning as a control period regarding such control, and accordingly, long press is unavailable for distinction between the three cases with the above examples. Therefore, an example such as in FIG. 13A can be conceived.

In the event of an operation to simply continuously press an operating key, this is taken as the single device mode, and is taken as an operation as to the corresponding device alone. In the event that continuous press has been performed immediately after one-time single-press, this is taken as an operation in the in-room mode. In the event that continuous press has been performed immediately after two-time single-press, this is taken as an operation in the entire mode.

For example, operation mode distinctions are thus set. Subsequently, a continuous press period TC is taken as a period while an operation is continued, and control is continuously performed. For example, during the period TC, continuous control of volume down, continuous fast forward playback control, or the like, is to be performed. Thus, with regard to an operation with an operation continuous period having a meaning as well, control according to the three cases is available.

Next, description will be made regarding an example to expand the in-room mode. With the first and second embodiments, the in-room mode has been taken as a mode with all of the devices in the room B in which the playback device 1B (remote controller RC2) exists as an object.

This may be expanded so that the user existing in the room B is allowed to further perform device control by specifying another room such as the room A, room C, or the like.

Figure 14A:
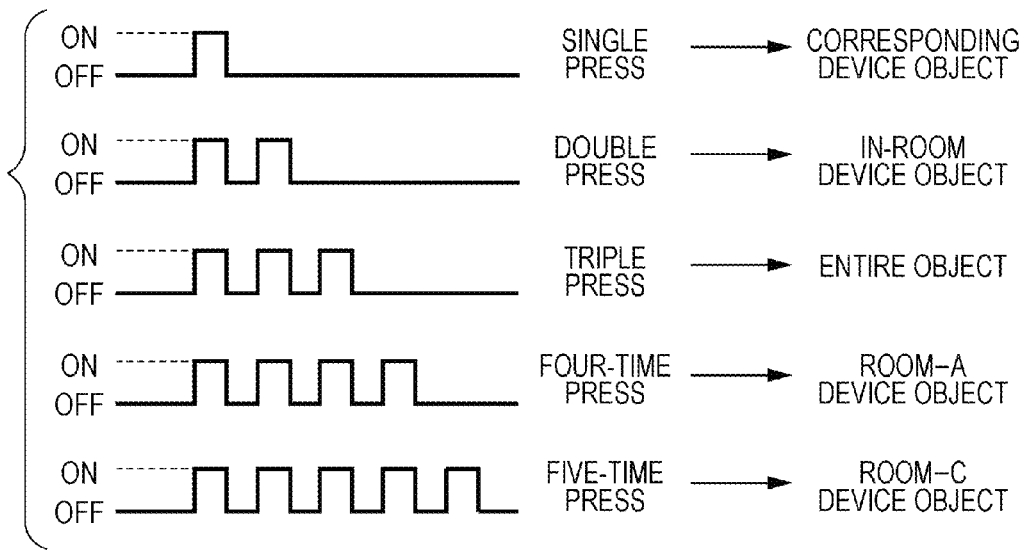
FIGS. 14A and 14B are explanatory diagrams of a modification of the first and second embodiments.

FIG. 14A is an example whereby room specification can be performed by the number of times of operation. Single-press is taken as the single device mode, and is taken as an operation as to the corresponding device alone. Double-press is taken as an operation in the in-room mode with the room thereof as an object. Specifically, in the event of the operations of the remote controller RC2, the device in the room B is taken as an object. Triple-press is taken as an operation in the entire mode. Four-time press is taken as an operation in the in-room mode specifying the room A, i.e., an operation with the playback device 1A and network speaker 2A as an object. Five-time press is taken as an operation in the in-room mode specifying the room C, i.e., an operation with the playback device 1C as an object.

In this way, specification of a room in the in-room mode may be available according to the number of times of operation.

Figure 14B:
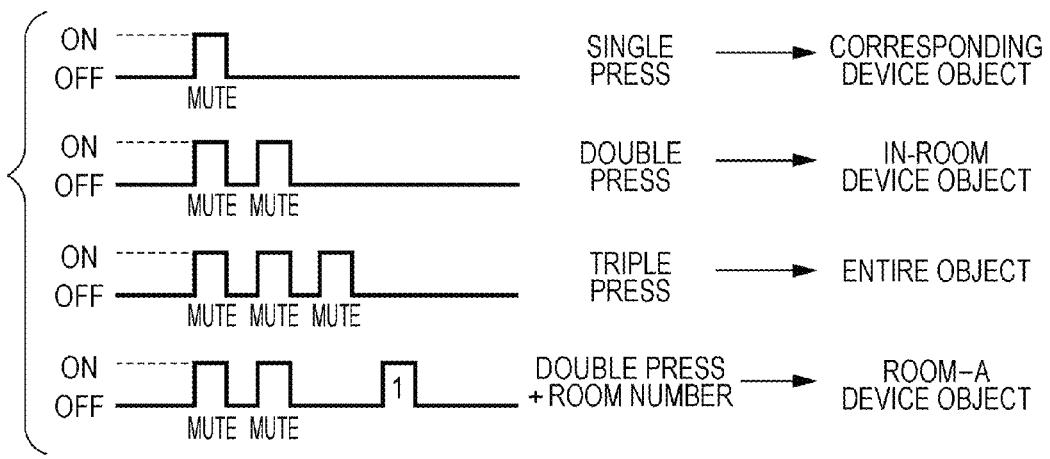

FIG. 14B is an example for specifying a room number by numeric key. For example, numeric keys "1", "2", "3", and "4" are assigned to the rooms A, B, C, and D beforehand.

For example, single-press of the mute key is taken as the single device mode, and is taken as a mute operation as to the corresponding device alone. Double-press of the mute key is taken as a mute operation in the in-room mode with the room thereof as an object. Specifically, in the event of the operations of the remote controller RC2, a device in the room B is taken as an object. Triple-press of the mute key is taken as a mute operation in the entire mode.

In the event that the mute key has been pressed twice, and then a numeric key has been pressed, this is taken as a mute operation in the in-room mode as to the room specified by the numeric key. For example, in the event of "mute key"→"mute key"→"1", this is taken as a mute operation with the playback device 1A and network speaker 2A in the room A as an object.

In this way, an arrangement may be made wherein the three cases are distinguished by the number of times of operation, following which a room is specified by numeric key or the like regarding the in-room mode.

Figure 13A:
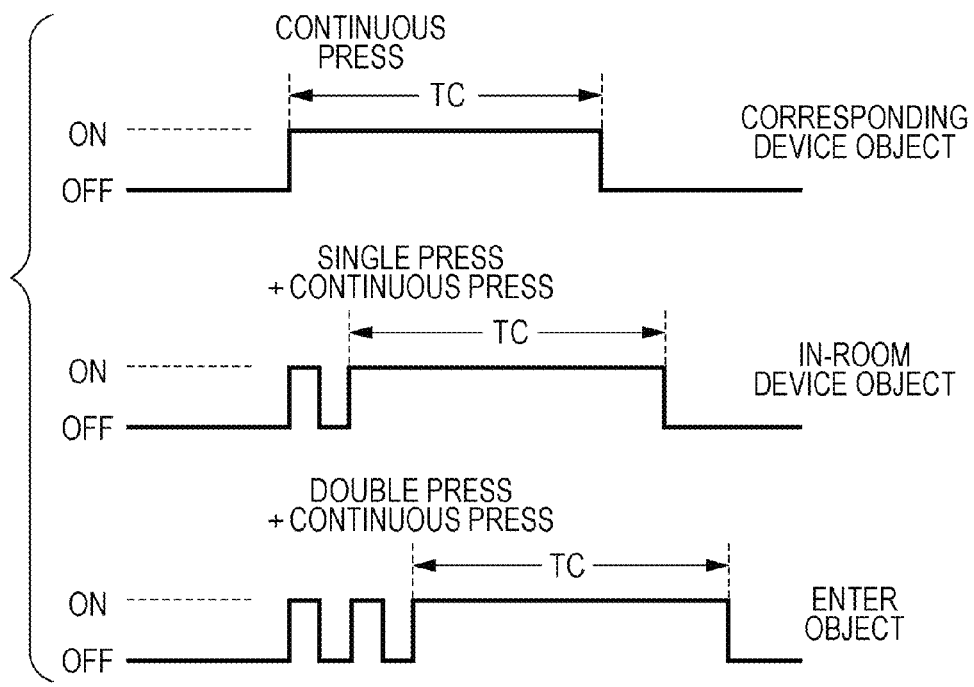
FIGS. 13A and 13B are explanatory diagrams of a modification of the first and second embodiments.
Figure 13B:
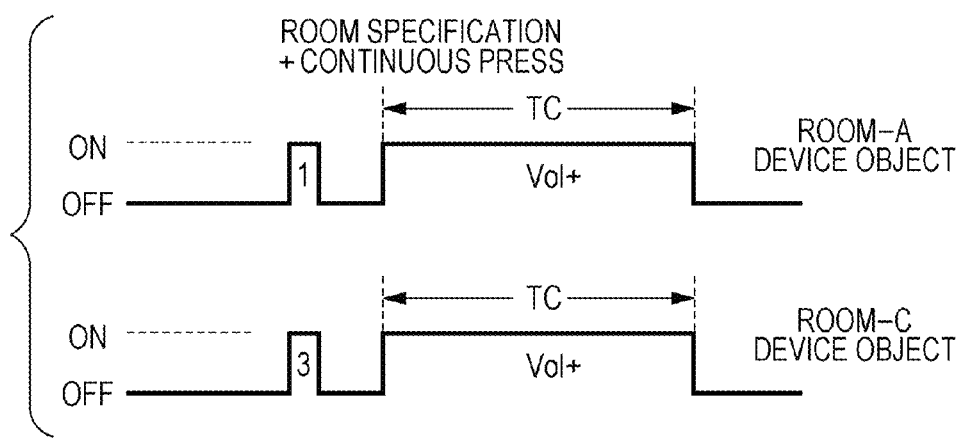

FIG. 13B relates to an operation for performing a continuous operation, and illustrates an example for specifying a room. In the event that immediately after the numeric key "1" has been pressed, for example, the volume up key has continuously been pressed, this is taken as a volume up operation as to the devices in the room A. Subsequently, during the continuous operation period TC, a volume up command is continuously transmitted to the playback device 1A and the network speaker 2A in the room A.

Similarly, in the event that immediately after the numeric key "3" has been pressed, for example, the volume up key has continuously been pressed, this is taken as a volume up operation as to the devices in the room C. Subsequently, during the continuous operation period TC, a volume up command is continuously transmitted to the playback device 1C in the room C.

As described above, the in-room mode is applied by specifying a room, whereby the user can readily perform control of a device in a separate room.

6. Third Embodiment 6-1. Display Example of Remote Controller

The third embodiment will be described. This is an example wherein the control device according to the present embodiment is realized as the remote controller RC1 with display and touch panel functions.

As described above, let us say that the remote controller RC1 is a device corresponding to the playback device 1A in the room A, and has, for example, the configuration illustrated in FIG. 5.

However, the remote controller RC1 may not necessarily correspond to the playback device 1A, but may be what we might call a network remote controller which is a device directly connected to the network 4 whereby an operation command can be transmitted to each device over the network. In this case, the command transmission unit 43 in FIG. 5 is formed as a transmission unit as to the network 4 instead of a transmission unit of infrared ray signals or radio wave signals as to the playback device 1A.

In any case, it is sufficient to have an arrangement wherein a control command output from the remote controller RC1 is ultimately transmitted to a device to be controlled. Accordingly, in the event of an arrangement wherein the remote controller RC1 has no network connection function, and a transmitted command thereof can be received at the playback device 1A alone, the playback device 1A has to perform processing for transferring a command as to another device via the network 4.

Also, in the event that the remote controller RC1 has a direct network connection function, the remote controller RC1 directly has to transmit a control command to each device serving as a control object via the network 4.

Figure 15:
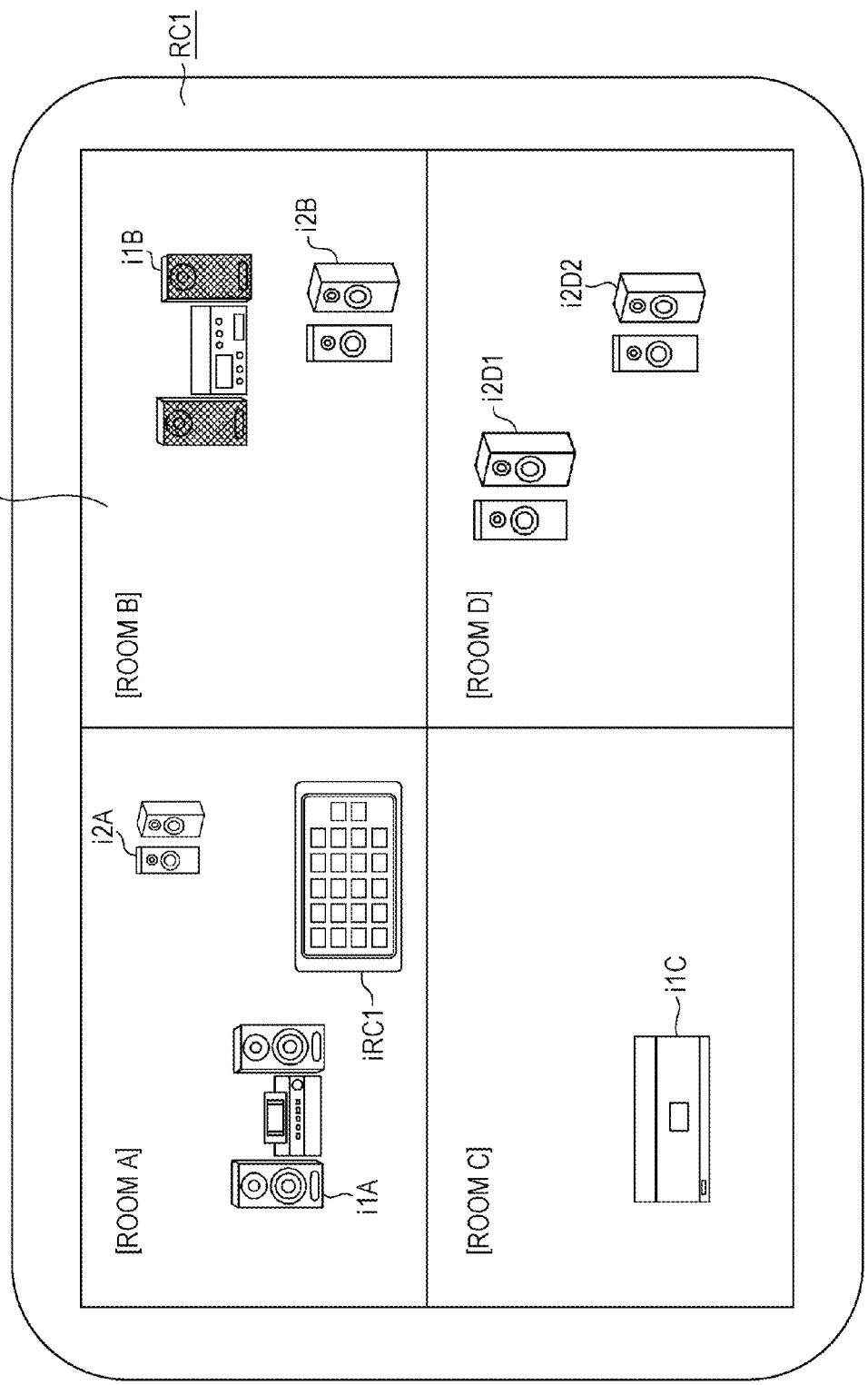
FIG. 15 is an explanatory diagram of a display example of a remote controller according to the third embodiment.

An operation screen such as in FIG. 15 is displayed on the display unit 45 of the remote controller RC1.

With this display example, assignment of four rooms is displayed, where the image of each device installed in the region of each room is displayed. The region corresponding to each room will be referred to as "room corresponding region".

In the event of the system configuration illustrated in FIG. 1, device icons i1A and i2A equivalent to the playback device 1A and network speaker 2A are displayed on the room corresponding region of the room A.

Device icons i1B and i2B equivalent to the playback device 1B and network speaker 2B are displayed on the room corresponding region of the room B. A device icon i1C equivalent to the playback device 1C is displayed on the room corresponding region of the room C. Device icons i2D1 and i2D2 equivalent to the network speakers 2D1 and 2D2 are displayed on the room corresponding region of the room D.

Note that, with this example, a device icon iRC1 of the remote controller RC1 itself is also displayed on the room corresponding region of the room A, but this is not indispensable.

Display of such room corresponding regions and devices can be realized by the user performing registration of the number of rooms, information of devices of each room (maker, type of device, model number, remote control code, etc.), and device layout information as to the remote controller RC1.

As described in FIG. 5, the touch panel sensor 46 is provided to this display unit 45, and the position detection unit 47 detects a touch position in the X-Y coordinates as to the touch panel sensor 46 (the screen region of the display unit 45).

Figure 16:
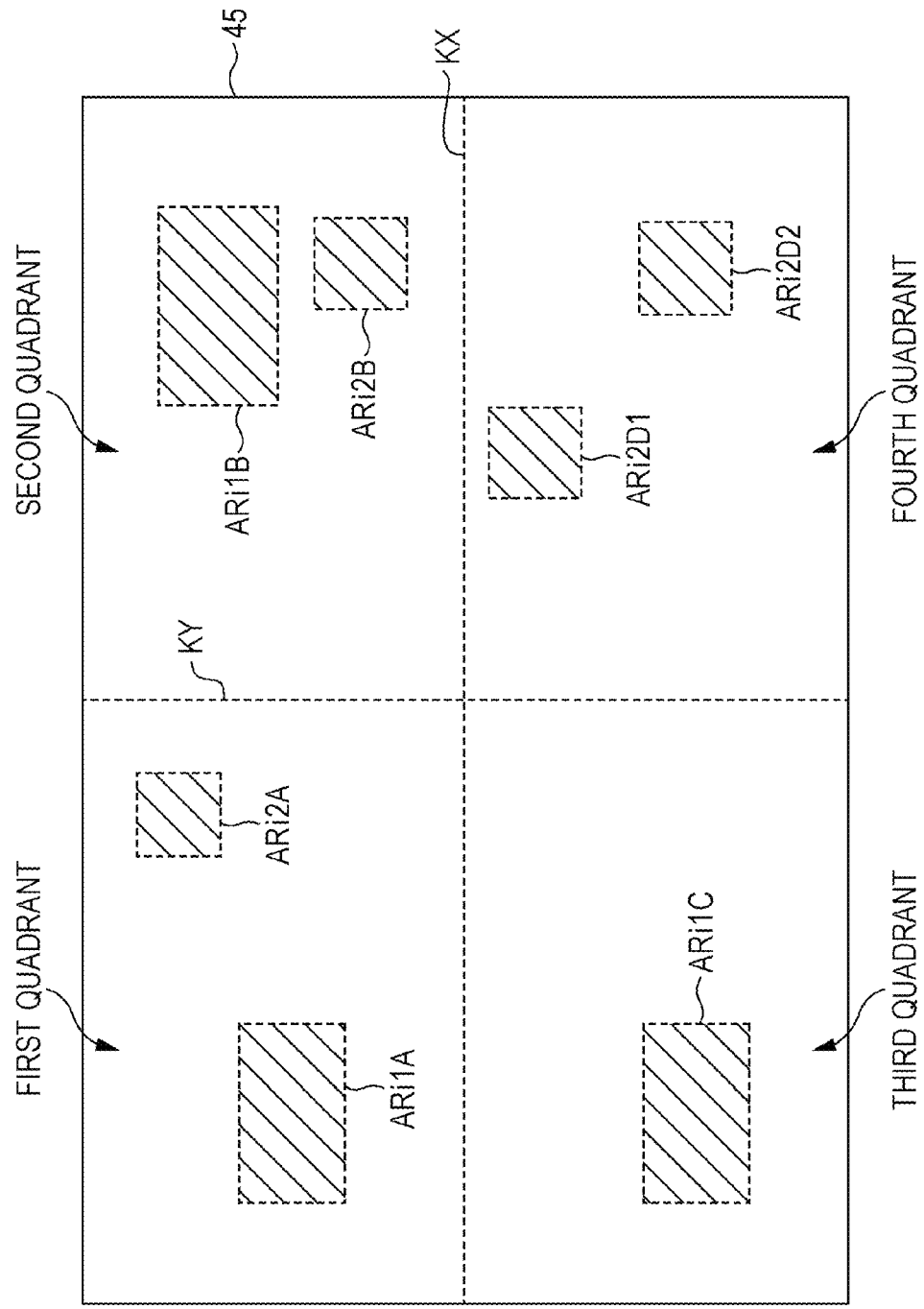
FIG. 16 is an explanatory diagram of the regions of the remote controller according to the third embodiment.

Also, the input detection unit 41c in the control unit 41 of the remote controller RC1 illustrated in FIG. 5 sets the display positions of quadrants and devices as illustrated in FIG. 16 to the X-Y coordinate axis.

First, the touch face (screen) is divided into four regions using reference lines KX and KY in the horizontal direction and vertical direction, which are set to first quadrant through fourth quadrant, respectively. The regions corresponding to the rooms A, B, C, and D are sequentially set to the first quadrant through fourth quadrant.

Note that the display example in FIG. 15 is a case where the network system is configured of each device in the four rooms, and accordingly, the room corresponding regions of the rooms A through D on the display face can be made to match the first quadrant through fourth quadrant in FIG. 16, but this is but an example. The first quadrant through fourth quadrant in FIG. 16 may not match the respective room corresponding regions on the display. For example, if the number of rooms differs from the number of quadrants, these obviously do not match. An example of three rooms will be described later with reference to FIG. 36 and thereafter.

Also, the input detection unit 41c in the control unit 41 recognizes the display region of each device icon. Specifically, the input detection unit 41c recognizes regions ARi1A, ARi2A, ARi1B, ARi2B, ARi1C, ARi2D1, and ARi2D2 on the X-Y coordinates such as in FIG. 16 as the display regions of the device icons i1A, i2A, i1B, i2B, i1C, i2D1, and i2D2 illustrated in FIG. 15. The user can perform the operations of each case using such a remote controller RC1 including an operating unit for performing touch panel operations on the display unit 45.

The control unit 41 (display control unit 41b) of the remote controller RC1 sets the room corresponding regions as shown in FIG. 15 on the touch panel face on the display unit 45, and executes display indicating an electronic device installed in each room. Subsequently, the control unit 41 (input detection unit 41c) further determines the position on the touch panel of a predetermined touch pattern operation serving as predetermined operation input by a touch panel operation as to the display of the display unit 45, and selects the single device mode, in-room mode, or entire mode. Subsequently, the control unit 41 (command readout unit 41a) reads out the command code according to the control mode, and executes transmission of a relevant command from the command transmission unit 43.

With the present third embodiment, the user can perform each operation of the above first, second, and third cases as follows by operations using the remote controller RC1.

First Case: Case where the user of the remote controller RC1 intends to perform some sort of operations with the playback device 1A alone as an object Second Case: Case where the user of the remote controller RC1 intends to perform common operations with all of the devices within an arbitrary room as an object Third Case: Case where the user of the remote controller RC1 intends to perform operations with all of the devices over the network (playback devices 1A, 1B, and 1C, network speakers 2A, 2B, 2D1, and 2D2) as an object The user is enabled to distinguish and execute the operations of each case of these by the operation mode of the remote controller RC1, but with the present third embodiment, the control unit 41 sets the control mode according to operations as follows.

When determining that a predetermined touch pattern operation has been performed across generally the whole face of the touch panel while including at least two or more room corresponding regions on the touch panel, the control unit 41 selects the entire mode.

When determining that a predetermined touch pattern operation has been performed within one room corresponding region on the touch panel, and also across generally the whole face of the room corresponding region, the control unit 41 selects the in-room mode.

When determining that a predetermined touch pattern operation has been performed above a device icon indicating one electronic device on the touch panel, the control unit 41 selects the single device mode.

Hereafter, operation examples will be described as an example of various types of touch pattern operation.

6-2. Operation Example I

Figure 17:
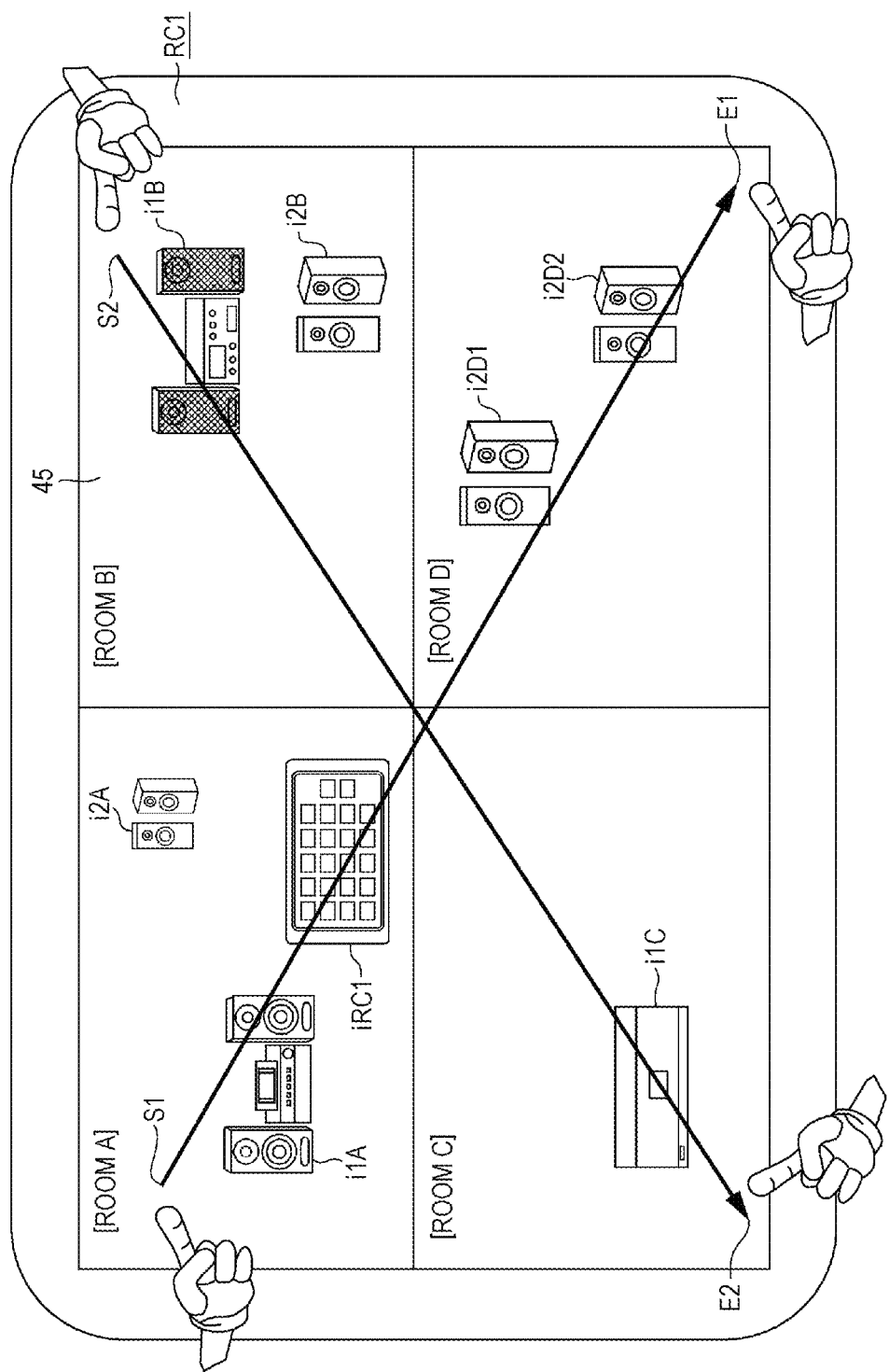
FIG. 17 is an explanatory diagram of the entire operation of an operation example I according to the third embodiment.
Figure 18:
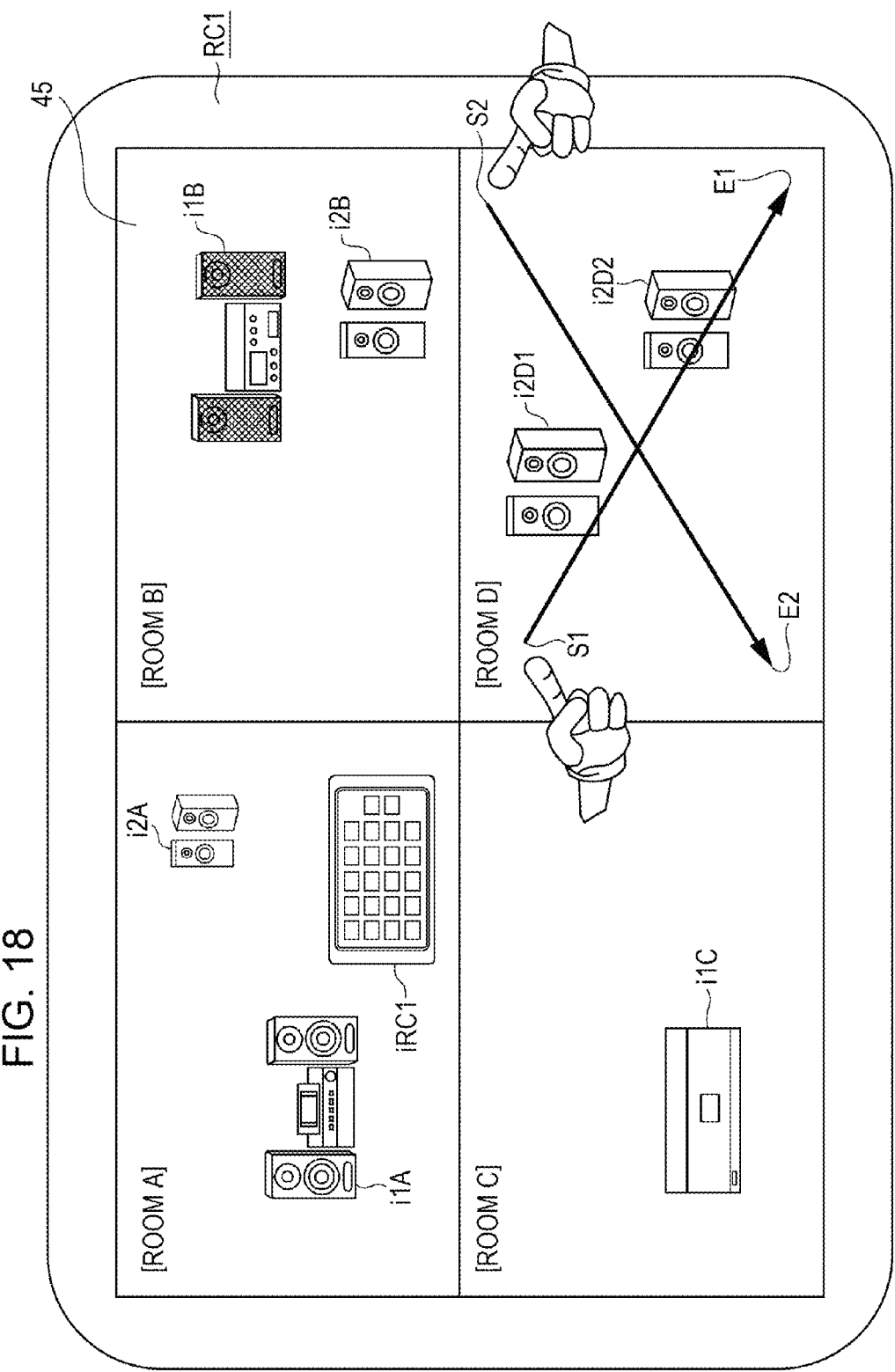
FIG. 18 is an explanatory diagram of an in-room device operation of the operation example I according to the third embodiment.
Figure 19:
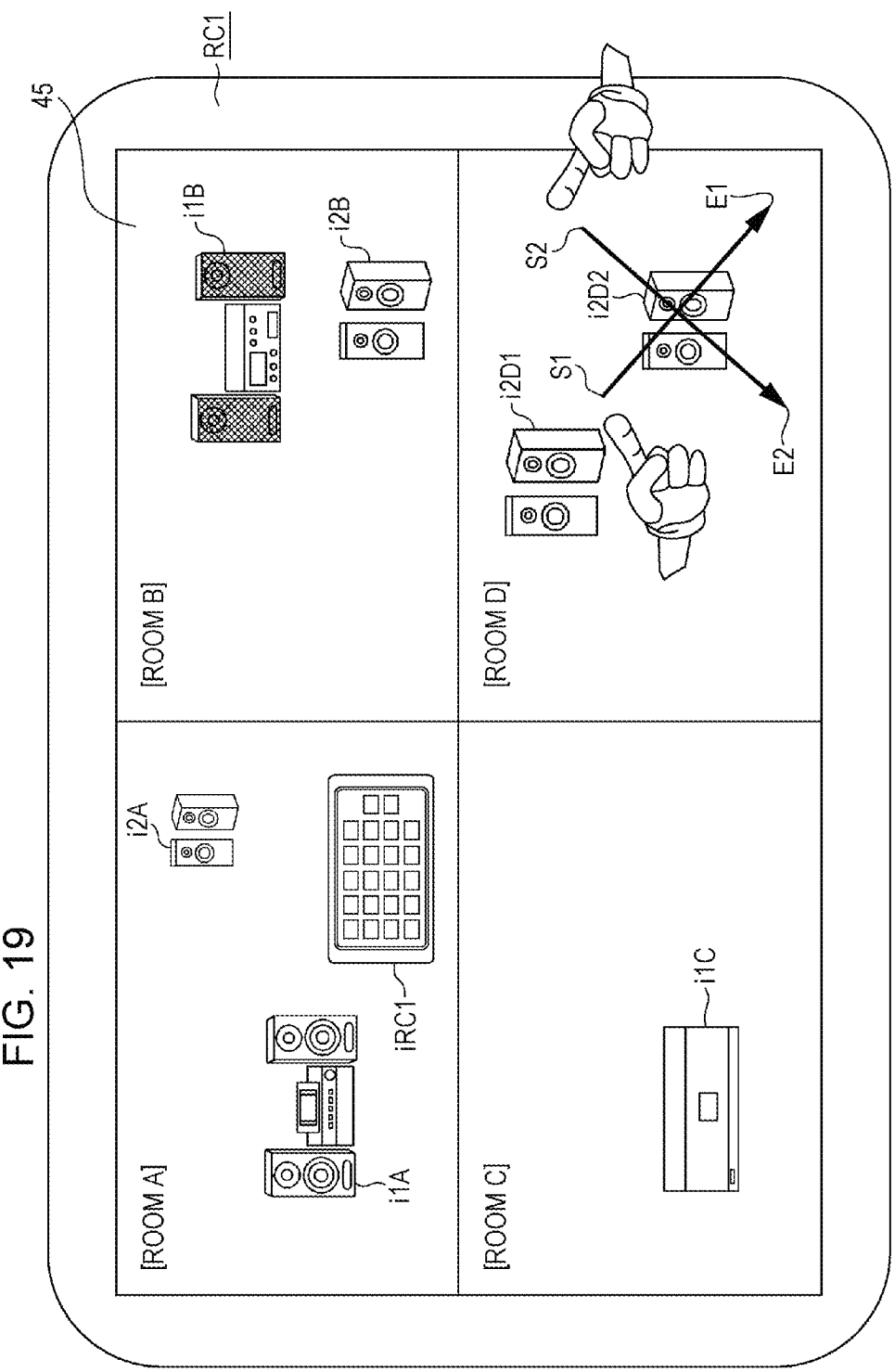
FIG. 19 is an explanatory diagram of a single device operation of the operation example I according to the third embodiment.

Description will be made regarding a case where a predetermined touch pattern is a touch panel operation for drawing a generally x-shaped operation path, as an operation example I. Now, let us say that a generally x-shaped touch pattern operation is a mute operation. Note that let us say that "generally x-shaped" means an operation of a pattern where two line segments having generally equal length cross. FIGS. 17, 18, and 19 illustrate a generally x-shaped touch pattern operation.

Note that, as described above, with the present example, assignment of room corresponding regions match the first through fourth quadrants in the X-Y coordinates. Hereafter, the room corresponding regions of the rooms A, B, C, and D on the display such as in FIG. 15 are represented with "room corresponding region A" through "room corresponding region D" respectively, and hereafter, "room corresponding region A" through "room corresponding region D" can be understood to correspond to "first quadrant" through "fourth quadrant" in X-Y coordinates in FIG. 16.

FIG. 17 illustrates a case where the user has performed an x-shaped touch operation across generally the entire screen by a finger. Specifically, as illustrated with a heavy line, this is a case where the user has performed an operation from a start point S1 to an end point E1, and an operation from a start point S2 to an end point E2, as a touch operation.

The control unit 41 of the remote controller RC1 detects this as contact movement of a touch position from the first quadrant (room corresponding region A) to the fourth quadrant (room corresponding region D), and contact movement of a touch position from the second quadrant (room corresponding region B) to the third quadrant (room corresponding region C) described in FIG. 16, and recognizes this as operations in the entire mode. Now, let us say that mute control as to all of the devices over the network will be performed. Specifically, the remote controller RC1 continuously performs transmission output of a mute command with all of the devices over the network as an object.

Note that, in this case, the control unit 41 has to determine the path of the touch operation regardless of the stroke order. For example, even in the event that the user's contact operation movement from the first quadrant to the fourth quadrant has been detected, and then the user's contact operation movement from the second quadrant to the third quadrant has been detected, or conversely even in the event that the user's contact operation movement from the second quadrant to the third quadrant has been detected, and then the user's contact operation movement from the first quadrant to the fourth quadrant has been detected, the control unit 41 has to perform mute control as the entire mode.

Also, let us say that the user's touch pattern operation in this case does not necessarily have to pass through the origin of the X-Y coordinate axes in a strict manner. For example, contact movement from the room A to the room D serving as room corresponding regions may be movement from the first quadrant to the fourth quadrant passing through the second quadrant, or may be movement from the first quadrant to the fourth quadrant passing through the third quadrant.

FIG. 18 illustrates a case where the user has performed an x-shaped touch operation within one room corresponding region, and also across generally the entire face of the room corresponding region by a finger. Specifically, as illustrated with a heavy line, this is a case where the user has performed an operation from a start point S1 to an end point E1, and an operation from a start point S2 to an end point E2, as a touch operation.

In this case, the control unit 41 of the remote controller RC1 detects this as contact movement of an x-shaped touch position on generally the entire face within the room corresponding region (fourth quadrant) of the room D, and recognizes this as an operation in the in-room mode, and specifically as an operation in the in-room mode with the room D as a control object. Let us then say that mute control will be performed as to all of the devices in the room D. Specifically, the remote controller RC1 continuously performs transmission output of a mute command with the network speakers 2D1 and 2D2 as an object.

Note that, in this case, an arrangement can be conceived wherein a contact operation deviating from the range of the room corresponding region (fourth quadrant in this example) is regarded as invalid processing. Conversely, even if somewhat deviating from the range, if a large fraction of the touch operation path is included in a certain room corresponding region, this operation may be recognized as an operation in the in-room mode as to a device in the room of the room corresponding region.

FIG. 19 illustrates a case where the user has performed an x-shaped touch operation above one device icon i2D2 by a finger. Specifically, as illustrated with a heavy line, this is a case where the user has performed an operation from a start point S1 to an end point E1, and an operation from a start point S2 to an end point E2, as a touch operation.

In this case, the control unit 41 of the remote controller RC1 detects this as contact movement of an x-shaped touch position above the display region ARi2D2 of the device icon i2D2 regarding the network speaker 2D2 on the X-Y coordinates. Subsequently, the control unit 41 recognizes this as an operation in the single device mode, and specifically as an operation in the single device mode with the network speaker 2D2 as a control object. Now, let us say that mute control as to the network speaker 2D2 will be performed. Specifically, the remote controller RC1 performs transmission output of a mute command with the network speaker 2D2 as an object.

Note that, in this case, the control unit 41 determines that the object of the x-shaped operation path is not the entirety of the room D but the network speaker 2D2, for example, depending on whether or not the length of the path from the start point S1 to the end point E1, and the length of the path from the start point S2 to the end point E2 are equal to or greater than a predetermined value.

That is to say, as for a method for distinguishing between detection in the case of FIG. 18 and detection in the case of FIG. 19, determination has to be made regarding the size of the letter x, and whether or not crossing of the letter x is over the device icon.

Figure 20:
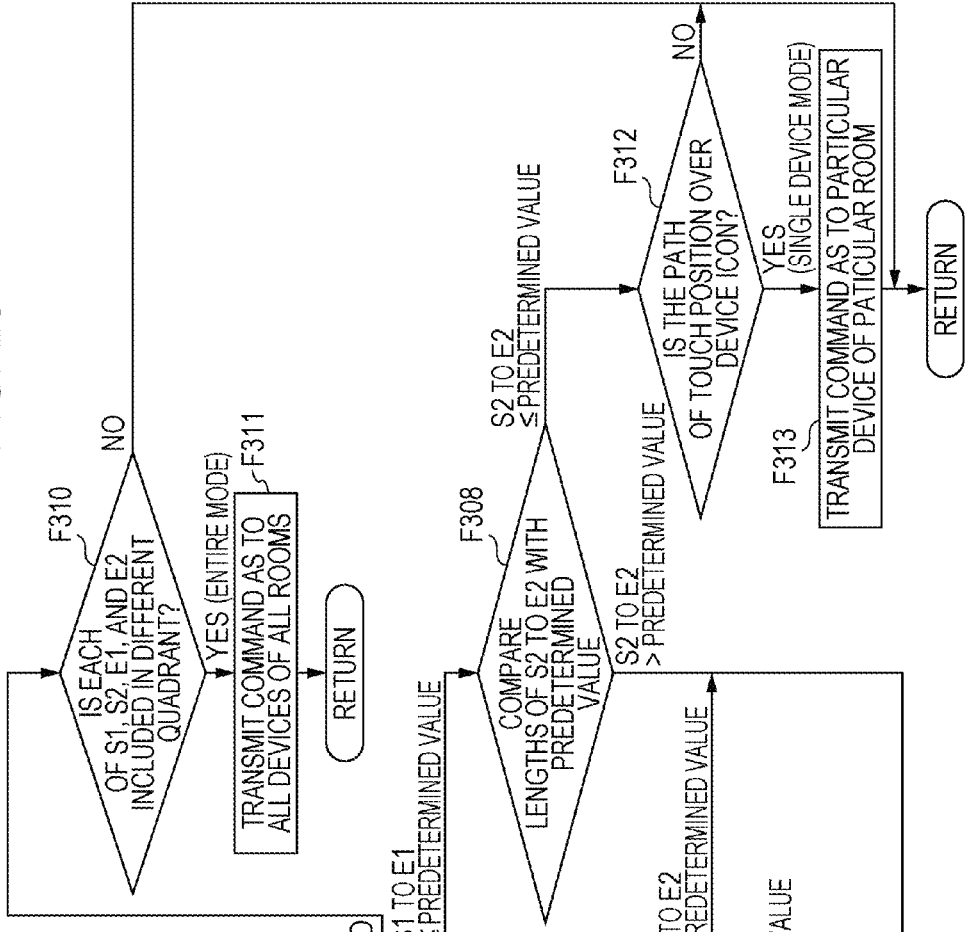
FIG. 20 is a flowchart of the processing of the operation example I according to the third embodiment.

An example of the recognition processing of the control unit 41 (specifically, input detection unit 41c) as to such an x-shaped touch pattern operation will be illustrated in FIG. 20.

In the event that there has been a user touch operation, the control unit 41 stores the start points and end points of the touch operation in steps F301, F302, F303, and F304 based on the information of the contact positions from the position detection unit 47. Specifically, the control unit 41 stores the addresses of the start point S1, end point E1, start point S2, and end point E2, e.g., the coordinate values on the X-Y coordinates.

Next, in step F305, the control unit 41 confirms whether or not all of the start point S1, end point E1, start point S2, and end point E2 are included in the same room corresponding region. In this case, the control unit 41 has to determine whether or not the address of each point is included in the same quadrant.

In the event that a condition is not satisfied that all are included in the same quadrant, the control unit 41 proceeds to step F310, and confirms whether or not all of the start point S1, end point E1, start point S2, and end point E2 are included in a different quadrant. In the event that a touch operation such as in FIG. 17 has been performed, all of the start point S1, end point E1, start point S2, and end point E2 are included in a different quadrant (room corresponding region).

In the event that a condition is satisfied that all are included in the same room corresponding region, the control unit 41 proceeds to step F311, and performs processing as the entire mode. Specifically, the control unit 41 sequentially performs transmission output of a mute command as to all of the devices over the network.

In the event that determination is made in step F310 that all of the start point S1, end point E1, start point S2, and end point E2 are not included in a different quadrant, the control unit 41 regards this as an invalid operation and aborts the processing.

An example of this is a case where the path from the start point S1 to the end point E1 reaches the fourth quadrant from the first quadrant, but the path from the start point S2 to the end point E2 stays within the second quadrant.

Alternatively, an example of this is a case where the path from the start point S1 to the end point E1 is within the first quadrant, the start point S2 is also within the first quadrant, but the end point E2 deviates from the third quadrant.

On the other hand, a case where determination is made in step F305 that all of the start point S1, end point E1, start point S2, and end point E2 are included in the same room corresponding region (same quadrant) is a case where the user has performed a touch operation in one room corresponding region.

Therefore, the control unit 41 proceeds to step F306, and performs determination processing regarding whether the operation is an operation in the in-room mode or an operation in the single device mode.

First, in step F306, the control unit 41 compares the length from the start point S1 to the end point E1 with a predetermined value. This predetermined value is a value serving as reference for determining whether or not the operation is an operation across generally the entire face of the room corresponding region.

In the event that the value of the length from the start point S1 to the end point E1 calculated on the X-Y coordinates is greater than the predetermined value, the control unit 41 proceeds to step F307, and this time compares the length from the start point S2 to the end point E2 with the above predetermined value.

In the event that the value of the length from the start point S2 to the end point E2 calculated on the X-Y coordinates is greater than the predetermined value, the control unit 41 proceeds to step F309, determines this to be the in-room mode, and performs processing. Specifically, the control unit 41 takes all of the devices in the room equivalent to this room corresponding region as a control object, and sequentially performs transmission output of a mute command to all of the devices installed in the room thereof. This case is equivalent to the case in FIG. 18, for example.

In the event that the value of the length from the start point S1 to the end point E1 is less than the predetermined value in step F306, this may be an operation in the single device mode. In this case, the control unit 41 proceeds to step F308, and compares the length from the start point S2 to the end point E2 with the above predetermined value.

In the event that the value of the length from the start point S2 to the end point E2 is also less than the above predetermined value, the control unit 41 determines that this operation is not the operation of the entirety of the room corresponding regions, and proceeds to step F312. Subsequently, the control unit 41 determines whether or not the path of the touch operation thereof is positioned above which of the device icons i1A, i1B, i2A, i2B, i1C, i2D1, and i2D2. Specifically, the control unit 41 compares the path of the x-shaped touch position in the X-Y coordinates with the display regions (ARi1A, ARi2A, ARi1B, ARi2B, ARi1C, ARi2D1, and ARi2D2) on the X-Y coordinates illustrated in FIG. 16.

Also, in the event that the path of the touch operation is positioned above a certain device icon, i.e., above one of the display regions (ARi1A, ARi2A, ARi1B, ARi2B, ARi1C, ARi2D1, and ARi2D2) on the X-Y coordinates, the control unit 41 determines that this operation is an operation in the single device mode. In this case, in step F313 the control unit 41 takes the device equivalent to this device icon as a control object, and transmits a mute command to the device thereof. For example, this case is equivalent to the case in FIG. 19.

Note that a case where determination is made in step F307 that the value of the length from the start point S2 to the end point E2 is less than the predetermined value is a case where the user has not performed an x-shaped touch operation.

Also, a case where determination is made in step F308 that the value of the length from the start point S2 to the end point E2 is greater than the predetermined value is also a case where the user has not performed an x-shaped touch operation. These cases are a case where one stroke of the letter x is longer, and the other stroke is shorter, so an x-shaped touch pattern is not formed.

Also, a case where determination is made in step F312 that the x-shaped path is not positioned above the device icon is a case where the user has performed an x-shaped touch operation on a portion including no device icon on the display face. The control unit 41 regards these cases as an invalid operation, and aborts the processing.

The control unit 41 performs the processing such as in FIG. 20 as described above, whereby a mute command can be transmitted to the device serving as an object by recognizing the x-letter-like touch pattern operation as a mute operation in the first, second, or third case.

Note that, with the determination processing regarding whether the in-room mode or single device mode, in addition to distinction regarding whether or not each of the coordinates of the two start points and the two end points at the time of drawing an x letter as described above are included in the same quadrant, and determination regarding whether or not the length of the path is longer than predetermined length, a superimposed level between the path and two or more device icons may be added to a determination reference.

6-3. Operation Example II

Description will be made regarding a case where a predetermined touch pattern is a touch panel operation for drawing a general checkmark operation path, as an operation II. Let us say that a general checkmark touch pattern operation is also a mute operation here, too.

Figure 21:
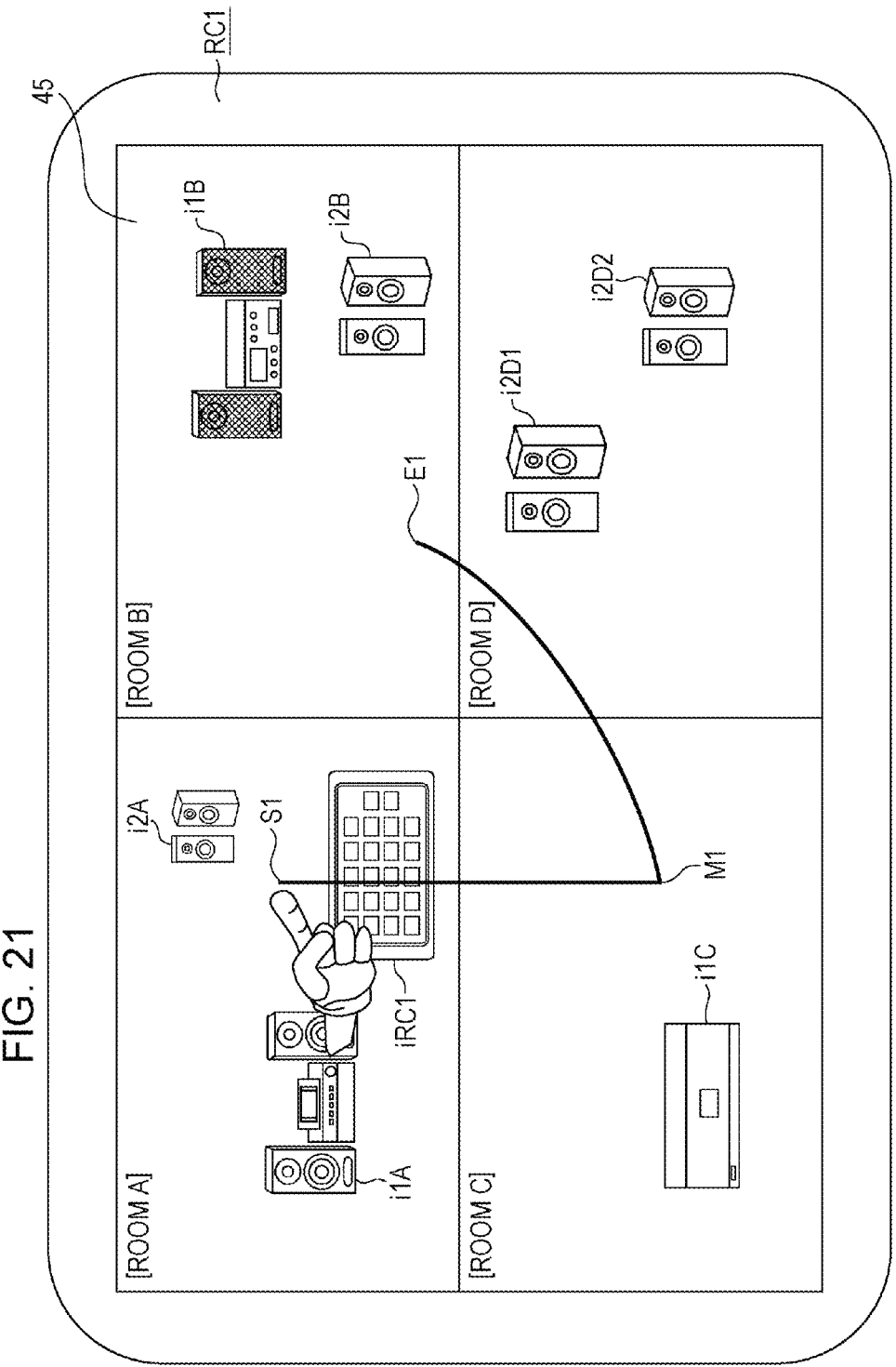
FIG. 21 is an explanatory diagram of the entire operation of an operation example II according to the third embodiment.
Figure 22:
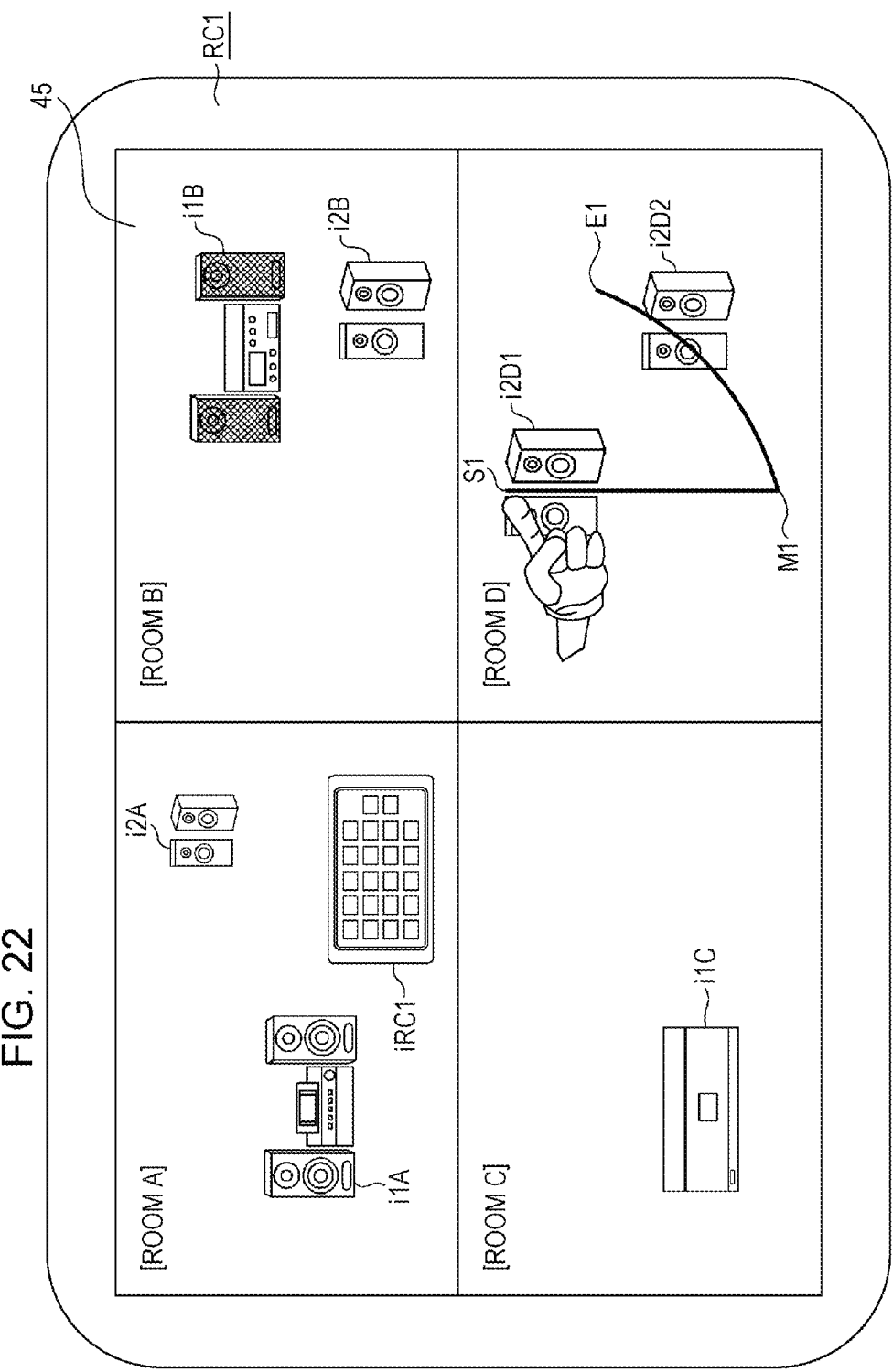
FIG. 22 is an explanatory diagram of an in-room device operation of the operation example II according to the third embodiment.
Figure 23:
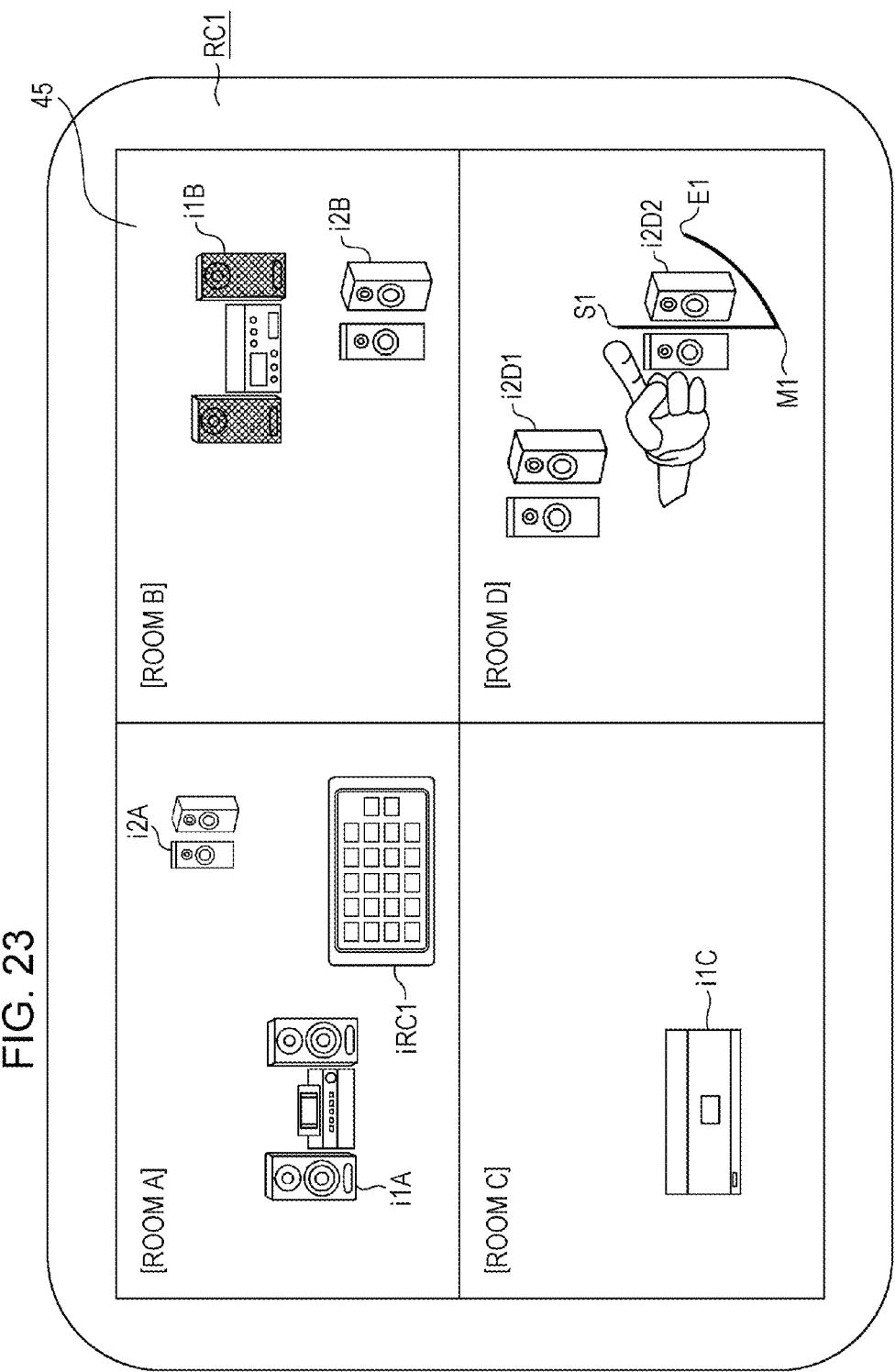
FIG. 23 is an explanatory diagram of a single device operation of the operation example II according to the third embodiment.

FIGS. 21, 22, and 23 illustrate a general checkmark touch pattern operation. FIG. 21 illustrates a case where the user has performed a checkmark touch operation across generally the entire screen by a finger. Specifically, this is a case where the user has performed an operation from a start point S1 to a midpoint M1, and subsequently performed an operation up to an end point E1, as a touch operation.

The control unit 41 of the remote controller RC1 detects this as contact movement of a touch position from the first quadrant (room corresponding region A) to the third quadrant (room corresponding region C), and further contact movement of a touch position to the second quadrant (room corresponding region B), and recognizes this as operations in the entire mode. Subsequently, mute control as to all of the devices over the network is performed. Specifically, the remote controller RC1 continuously performs transmission output of a mute command with all of the devices over the network as an object. Note that, in this case, the stroke order and shape of the checkmark may be ignored.

For example, in the event that the start point S1, midpoint M1, and end point E1 are equivalent to the second quadrant, fourth quadrant, and first quadrant respectively, or in the event of equivalent to the first quadrant, fourth quadrant, and second quadrant respectively, or in the event of equivalent to the second quadrant, third quadrant, and first quadrant respectively, or the like, these may be taken as a suitable touch pattern.

FIG. 22 illustrates a case where the user has performed an operation from the start point S1 to the end point E1 via the midpoint M1 as a checkmark touch operation within one room corresponding region, and also across generally the entire face of the room corresponding region, by a finger.

In this case, the control unit 41 of the remote controller RC1 detects this as contact movement of a checkmark touch position on generally the entire face within the room corresponding region D (fourth quadrant), and recognizes this as an operation in the in-room mode, and specifically as an operation in the in-room mode with the room D as a control object. Now, let us say that mute control as to all of the devices in the room D will be performed. Specifically, the remote controller RC1 continuously performs transmission output of a mute command with the network speakers 2D1 and 2D2 as an object.

Note that, in this case, an arrangement can be conceived that an operation wherein a portion of the checkmark path deviating from one room corresponding region (the fourth quadrant in this example) is regarded as invalid processing. Conversely, even if somewhat deviating from the region, if a large fraction of the touch operation path is included in a certain room corresponding region, this operation may be recognized as an operation in the in-room mode as to a device in the room of the room corresponding region.

FIG. 23 illustrates a case where the user has performed an operation from the start point S1 to the end point E1 via the midpoint M1 as a checkmark touch operation above the one device icon i2D2 by a finger.

In this case, the control unit 41 of the remote controller RC1 detects this as contact movement of the checkmark touch position above the display region ARi2D2 of the device icon i2D2 regarding the network speaker 2D2 on the X-Y coordinates. This is recognized as an operation in the single device mode, and specifically, an operation in the single device mode with the network speaker 2D2 as a control object. Subsequently, mute control as to the network speaker 2D2 is performed. Specifically, the remote controller RC1 continuously performs transmission output of a mute command with the network speaker 2D2 as an object.

Figure 24:
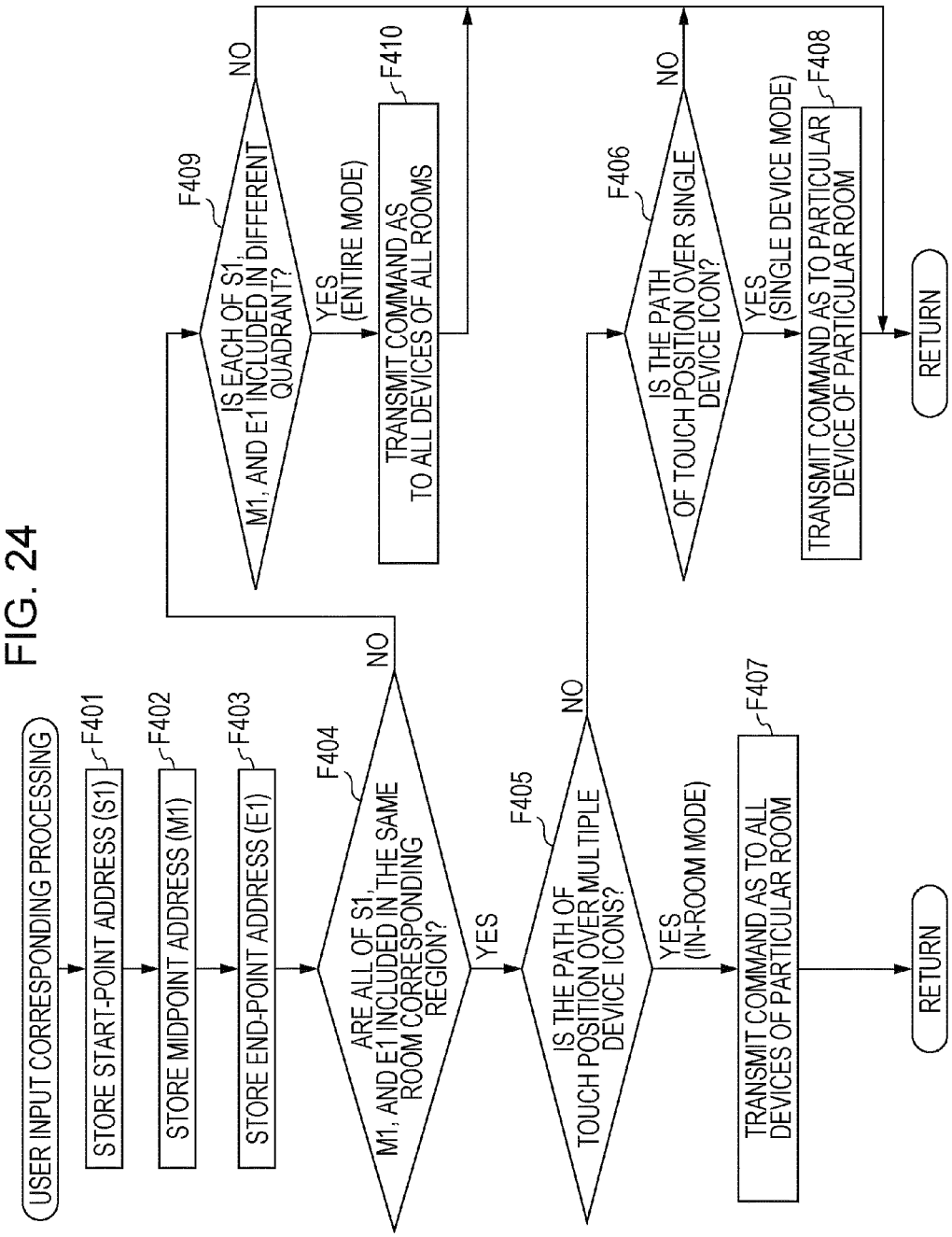
FIG. 24 is a flowchart of the processing of the operation example II according to the third embodiment.

An example of the recognition processing of the control unit 41 (specifically, input detection unit 41c) as to such a checkmark touch pattern operation will be illustrated in FIG. 24.

In the event that there has been the user's touch operation, the control unit 41 stores the start point, midpoint, and end point of the touch operation in steps F401, F402, and F403 based on the information of the contact positions from the position detection unit 47. Specifically, the control unit 41 stores the addresses of the start point S1, midpoint M1, and end point E1 (the coordinate values on the X-Y coordinates).

Next, in step F404, the control unit 41 confirms whether or not all of the start point S1, midpoint M1, and end point E1 are included in the same room corresponding region. Specifically, the control unit 41 has to determine whether or not the address of each point is included in the same quadrant.

In the event that a condition is not satisfied that all are included in the same room corresponding region, the control unit 41 proceeds to step F409, and confirms whether or not all of the start point S1, midpoint M1, and end point E1 are included in a different quadrant. In the event that a touch operation such as in FIG. 21 has been performed, all of the start point S1, midpoint M1, and end point E1 are included in a different quadrant.

In the event that a condition is satisfied that all are included in a different quadrant, the control unit 41 proceeds to step F410, and performs processing as the entire mode. Specifically, the control unit 41 sequentially transmits a mute command as to all of the devices over the network.

In the event that determination is made in step F409 that all of the start point S1, midpoint M1, and end point E1 are not included in a different quadrant, the control unit 41 regards this as an invalid operation and aborts the processing.

An example of this is a case where the path from the start point S1 to the midpoint M1 reaches the fourth quadrant from the first quadrant, but the end point E1 also stays within the fourth quadrant. Alternatively, an example of this is a case where the start point S1 and the end point E1 are within the first quadrant, but the midpoint M1 deviates from the third quadrant.

On the other hand, in the event that determination is made in step F404 that all of the start point S1, midpoint M1, and end point E1 are included in the same room corresponding region (same quadrant), the control unit 41 proceeds to step F405 and thereafter, and performs determination processing regarding whether this is an operation in the in-room mode or an operation in the single device mode.

First, in step F405, determination is made whether or not the checkmark path from the start point S1 to the end point E1 via the midpoint M1 is positioned above two or more device icons. Specifically, the coordinate values serving as the path of the touch position, and the display regions (ARi1A, ARi2A, ARi1B, ARi2B, ARi1C, ARi2D1, and ARi2D2) of the device icons are compared, and confirmation is made whether or not the path is positioned above two or more device icons. Above device icons means a state in which the path traverses device icons, or reaches above device icons.

In the event that the checkmark path is above two or more device icons, the control unit 41 proceeds to step F407, determines this to be the in-room mode, and performs processing. Specifically, the control unit 41 takes all of the devices of a room equivalent to this room corresponding region as a control object, and sequentially transmits a mute command to all of the devices installed in the room thereof. For example, this is equivalent to the case in FIG. 22.

Note that in the event of a room where one device alone exists like the room C, the number of the checkmark loci within the room corresponding region is not greater than one, but in this case, the same command transmission object is specified in either the in-room mode or the single device mode (e.g., playback device 1C), and accordingly, there is no problem in this case.

In the event that determination is made in step F405 that the checkmark path is not above two or more device icons, the control unit 41 proceeds to step F406, and confirms whether or not the checkmark path is above one device icon.

In the event that the checkmark path is above one certain device icon, the control unit 41 determines this to be an operation in the single device mode, in step F408 takes a device equivalent to this device icon as a control object, and transmits a mute command to the device thereof. For example, this case is equivalent to the case in FIG. 23.

Note that a case where determination is made in step F406 that the checkmark path is not above one certain device icon is a case where the user has performed a checkmark touch operation on a portion not serving as a device icon on the display face. The control unit 41 takes this case as an invalid operation, and aborts the processing.

The control unit 41 performs the processing such as in FIG. 24 as described above, whereby a mute command can be transmitted to the device serving as an object by recognizing the checkmark touch pattern operation as a mute operation in the first, second, or third case.

Note that, with the determination processing regarding whether the in-room mode or single device mode, in addition to determination of overlapping between one or more device icons and the path, determination may be made with the size of the checkmark path, the degree of overlapping between the checkmark, or the like.

6-4. Operation Example III

Description will be made regarding a case where a predetermined touch pattern is a touch panel operation for drawing a curved operation path ascending or descending while moving in the horizontal direction, or a vertical linear operation path. Here, let us say that a curved or vertical linear touch pattern operation is a volume up/down operation.

Figure 25:
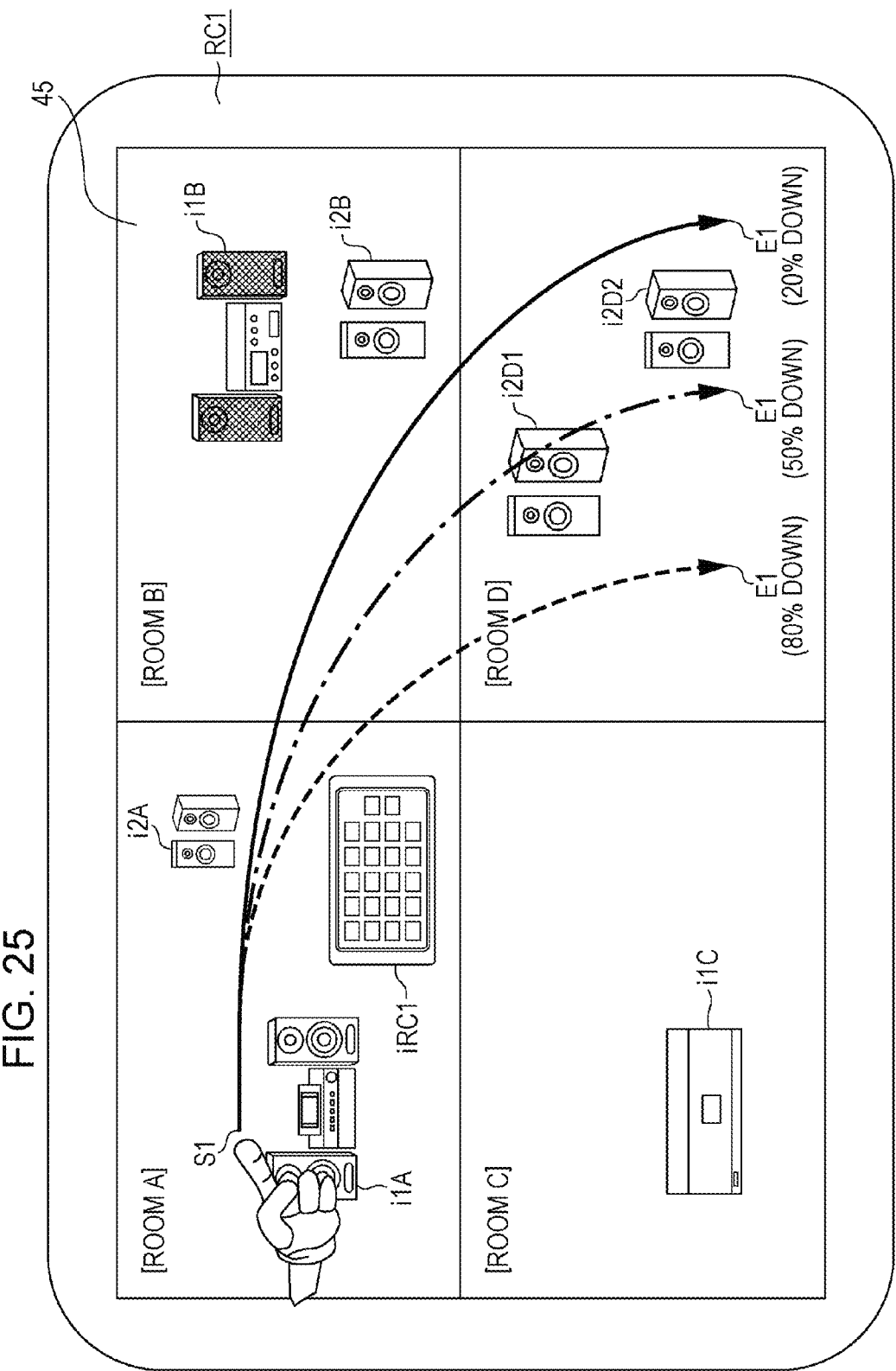
FIG. 25 is an explanatory diagram of the entire operation of an operation example III according to the third embodiment.
Figure 26:
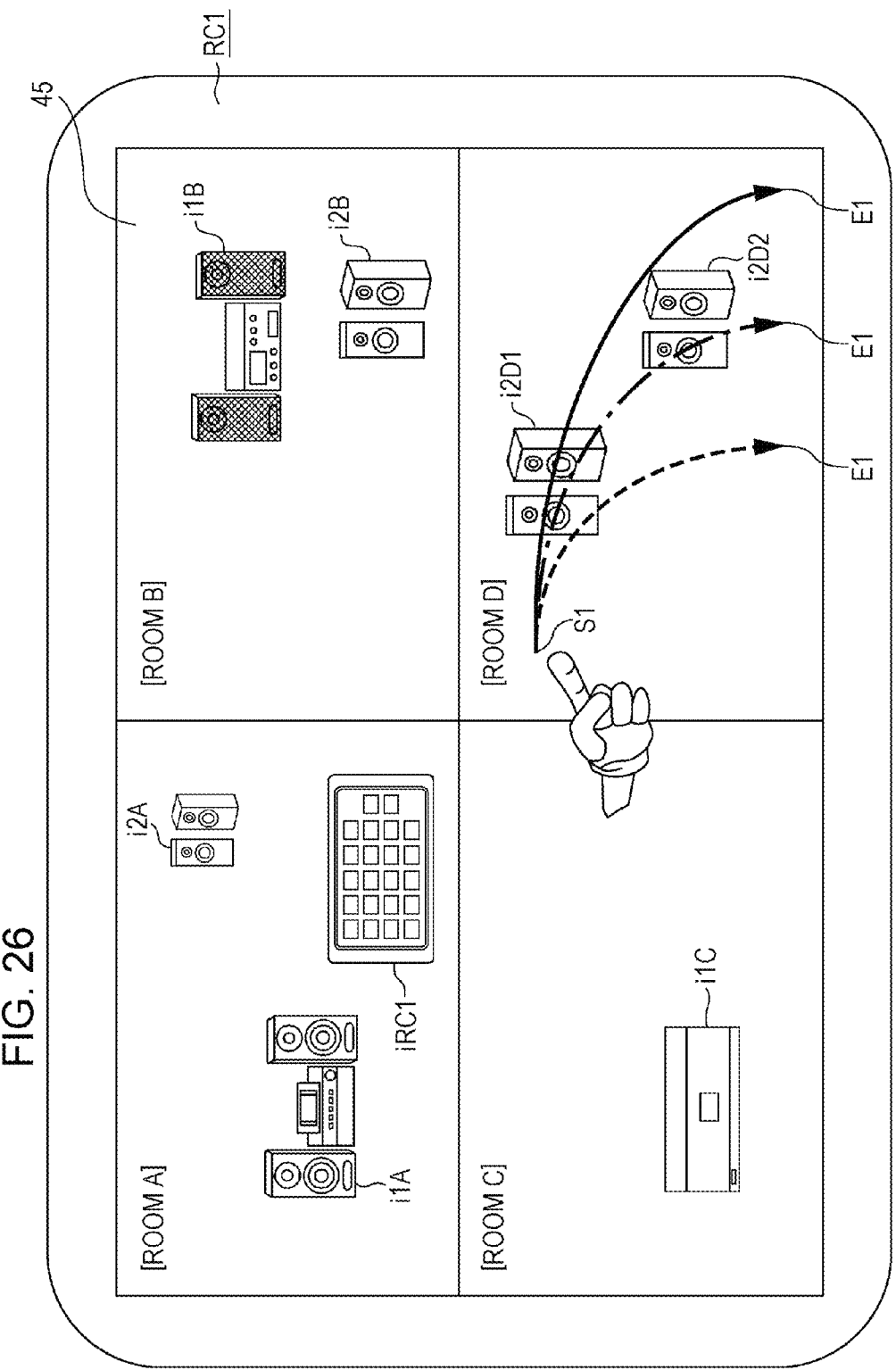
FIG. 26 is an explanatory diagram of an in-room device operation of the operation example III according to the third embodiment.
Figure 27:
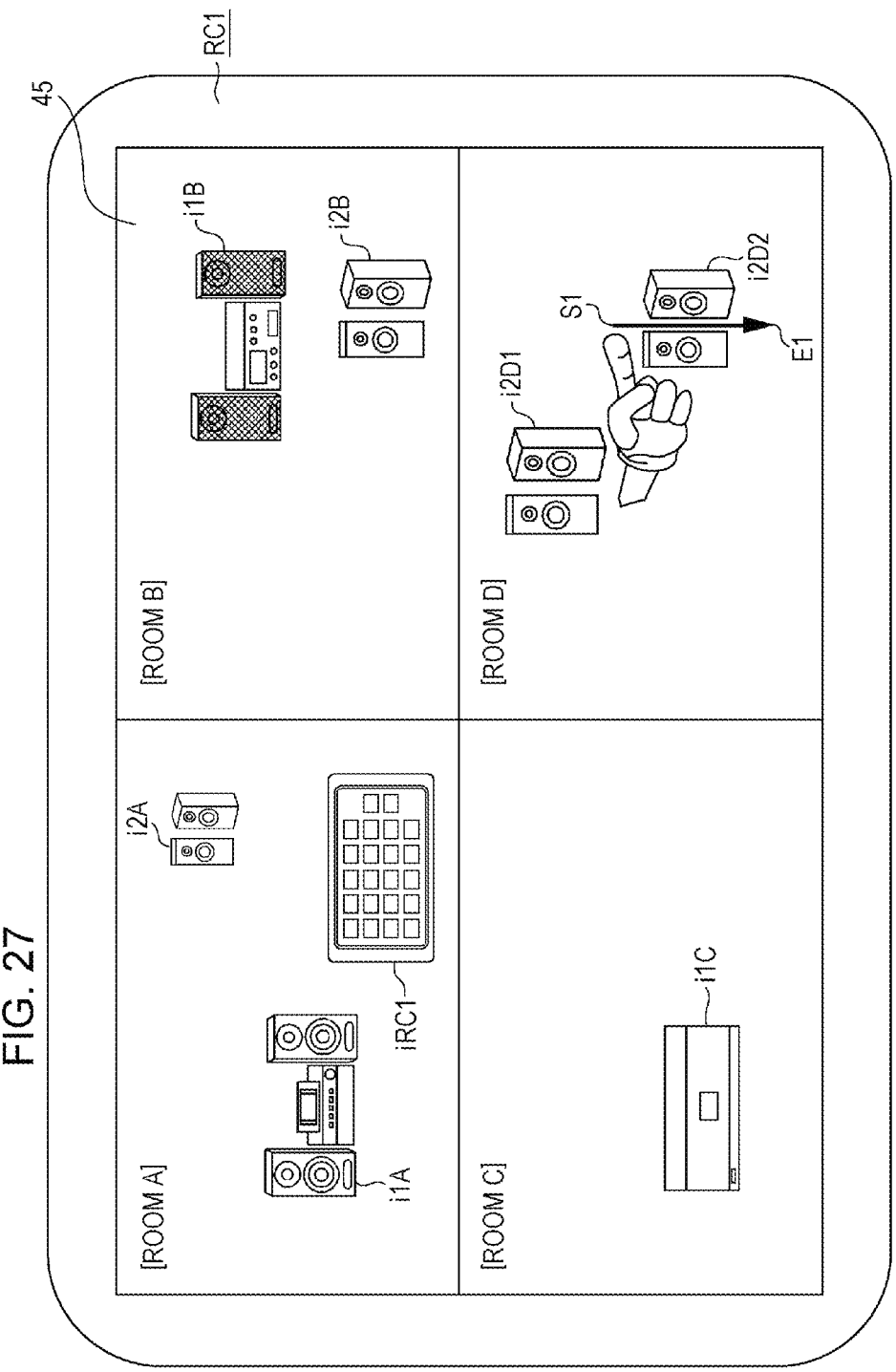
FIG. 27 is an explanatory diagram of a single device operation of the operation example III according to the third embodiment.

FIGS. 25, 26, and 27 illustrate a volume down touch pattern operation. FIG. 25 illustrates a case where the user has performed a curved operation descending while moving in the horizontal direction (hereafter, referred to as "descending curved operation") across generally the entire screen by a finger. The user draws a descending curve from a start point S1 to an end point E1 as a touch operation, but the curvature thereof is a user's arbitration such as a solid line, a dashed-dotted line, or a dashed line.

The control unit 41 of the remote controller RC1 recognizes this descending curved operation as an operation in the entire mode. Subsequently, the control unit 41 transmits a volume down control command to all of the devices over the network. Particularly, the curvature of a descending curve will be decreasing control amount. Specifically, the control unit 41 transmits a command for specifying a volume down level according to the curvature.

For example, as shown by the solid line in the drawing, when the descending curve is moderate, the control amount of volume down is set to 20%, and as shown by dashed-dotted line, at the time of an intermediate curvature, set to 50%, and as shown by dashed line, at the time of a steep descending curve, set to 80%. Note that the "%" as used here may be conceived as a volume decreasing rate with the current level of each device as a reference.

FIG. 26 is a case where the user has performed a descending curved operation from a start point S1 to an end point E1 within one room corresponding region and also across generally the entire face of the room corresponding region, by a finger.

In this case, the control unit 41 of the remote controller RC1 detects this as contact movement of a descending curved touch position on generally the entire face within the room corresponding region D (fourth quadrant), and recognizes this as an operation in the in-room mode, and specifically as an operation in the in-room mode with the room D as a control object. Subsequently, the control unit 41 transmits a volume down control command to all of the devices in the room D. In this case as well, the control unit 41 transmits a command for specifying a volume decreasing level according to the curvature of the user's descending curved operation such as a solid line, a dashed-dotted line, and a dashed line.

FIG. 27 is a case where the user has performed a linear touch operation (hereafter, referred to as "descending linear operation") from upward (start point S1) to downward (end point E1) on one device icon i2D2, by a finger.

In this case, the control unit 41 of the remote controller RC1 detects this as contact movement of a descending linear touch position above the display region ARi2D2 of the device icon i2D2 regarding the network speaker 2D2 on the X-Y coordinates. Subsequently, the control unit 41 recognizes this as an operation in the single device mode, and specifically an operation in the single device mode with the network speaker 2D2 as a control object. Subsequently, the control unit 41 transmits a volume down command as to the network speaker 2D2. In this case, the control unit 41 transmits a command for specifying a volume decreasing level according to the length of the descending line assuming that the length of the descending line corresponds to volume control amount.

Figure 28:
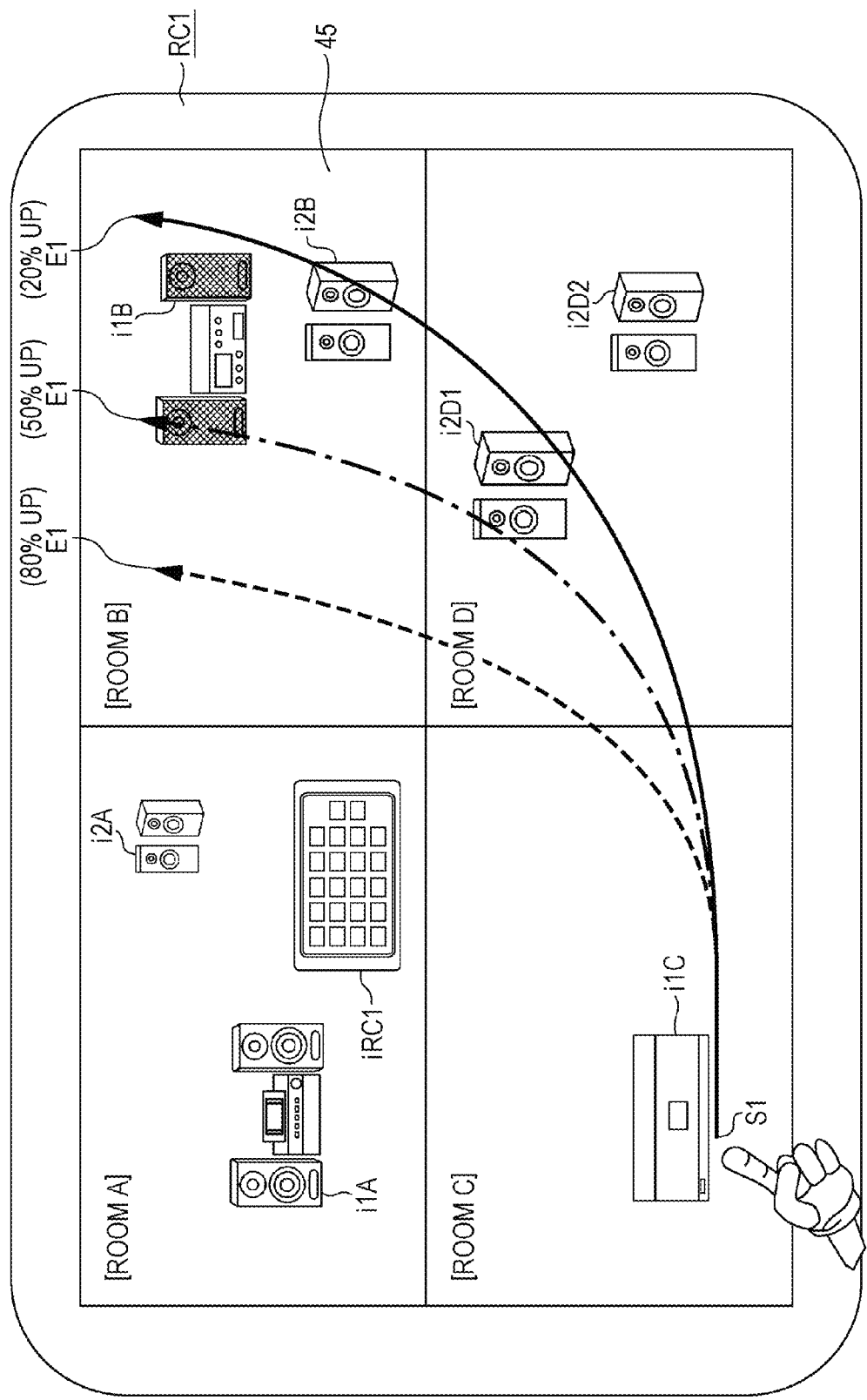
FIG. 28 is an explanatory diagram of the entire operation of the operation example III according to the third embodiment.
Figure 29:
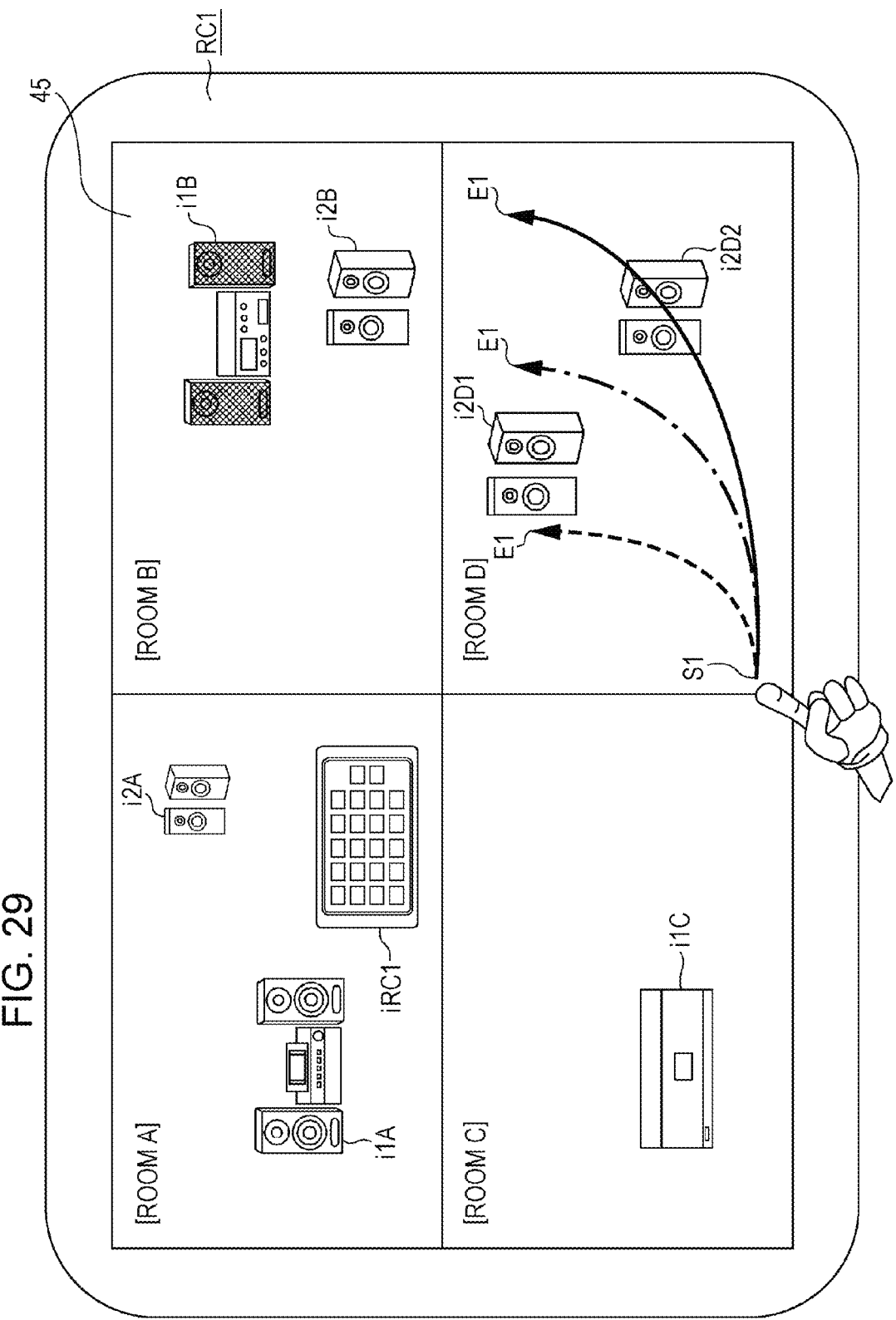
FIG. 29 is an explanatory diagram of an in-room device operation of the operation example III according to the third embodiment.
Figure 30:
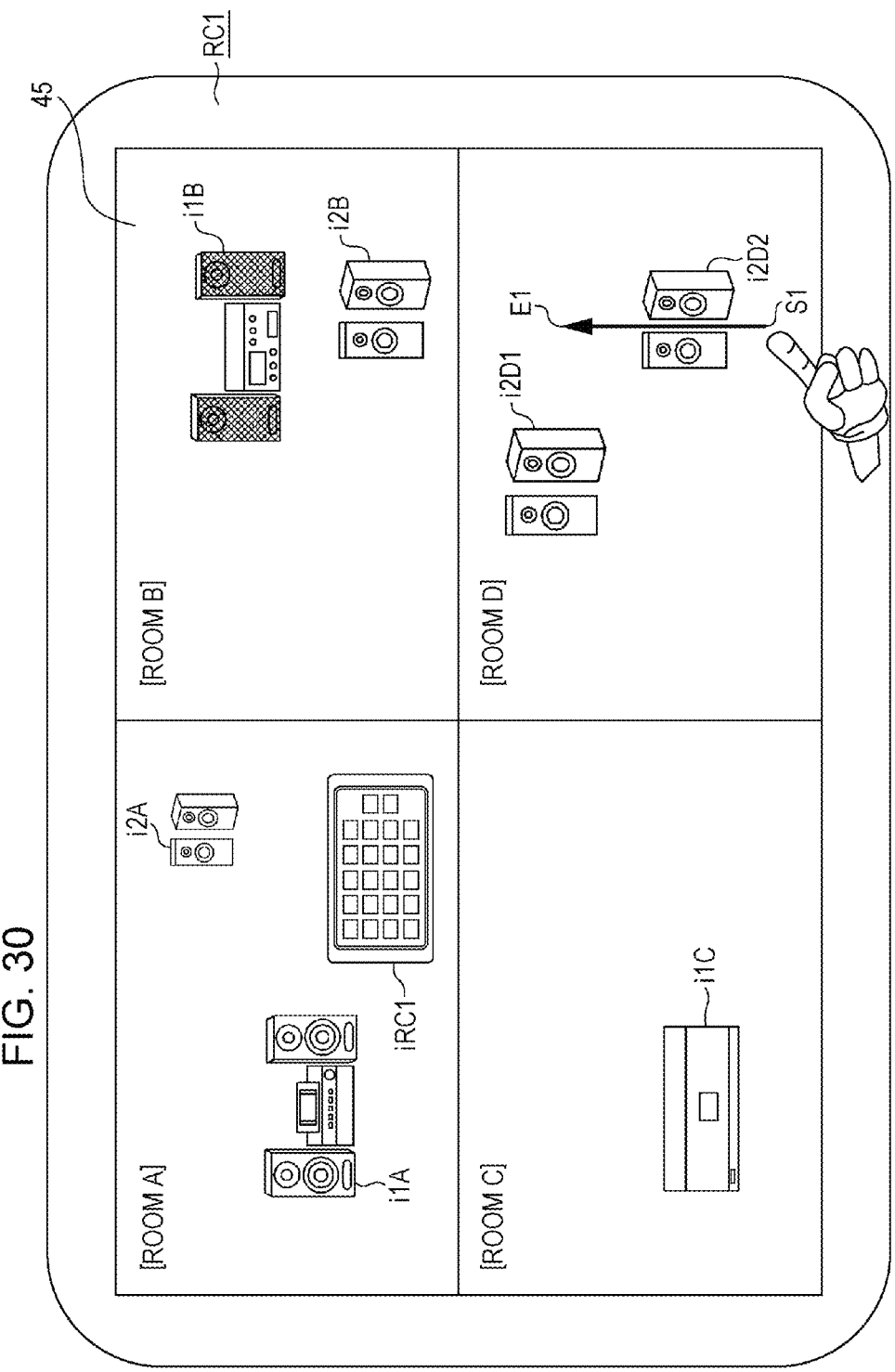
FIG. 30 is an explanatory diagram of a single device operation of the operation example III according to the third embodiment.

FIGS. 28, 29, and 30 illustrate a volume up touch pattern operation. FIG. 28 illustrates a case where the user has performed a curved operation ascending while moving in the horizontal direction (hereafter, referred to as "ascending curved operation") across generally the entire screen by a finger. The user draws an ascending curve from a start point S1 to an end point E1 as a touch operation, but the curvature thereof is a user's arbitration such as a solid line, a dashed-dotted line, or a dashed line.

The control unit 41 of the remote controller RC1 recognizes this ascending curved operation as an operation in the entire mode. Subsequently, the control unit 41 transmits a volume up control command to all of the devices over the network. Particularly, the curvature of an ascending curve will be increasing control amount. Specifically, the control unit 41 transmits a command for specifying a volume up level according to the curvature.

For example, as shown by solid line in the drawing, when the ascending curve is moderate, the control amount of volume up is set to 20%, and as shown by dashed-dotted line, at the time of an intermediate curvature, set to 50%, and as shown by dashed line, at the time of a steep ascending curve, set to 80%. Note that the "%" as used here may be conceived as a volume increasing rate with the current volume level of each device as a reference.

FIG. 29 is a case where the user has performed an ascending curved operation from a start point S1 to an end point E1 within one room corresponding region and also across generally the entire face of the room corresponding region, by a finger.

In this case, the control unit 41 of the remote controller RC1 detects this as contact movement of an ascending curved touch position on generally the entire face within the room corresponding region D (fourth quadrant), and recognizes this as an operation in the in-room mode, and specifically as an operation in the in-room mode with the room D as a control object. Subsequently, the control unit 41 transmits a volume up control command to all of the devices in the room D. In this case as well, the control unit 41 transmits a command for specifying a volume increasing level according to the curvature of the user's ascending curved operation such as a solid line, a dashed-dotted line, and a dashed line.

FIG. 30 is a case where the user has performed a linear touch operation (hereafter, referred to as "ascending linear operation") from downward (start point S1) to upward (end point E1) on one device icon i2D2, by a finger.

In this case, the control unit 41 of the remote controller RC1 detects this as contact movement of a ascending linear touch position above the display region ARi2D2 of the device icon i2D2 regarding the network speaker 2D2 on the X-Y coordinates. Subsequently, the control unit 41 recognizes this as an operation in the single device mode, and specifically an operation in the single device mode with the network speaker 2D2 as a control object. The control unit 41 transmits a volume up command as to the network speaker 2D2. In this case, the control unit 41 transmits a command for specifying a volume increasing level according to the length of the ascending line assuming that the length of the ascending line corresponds to volume control amount.

Figure 31:
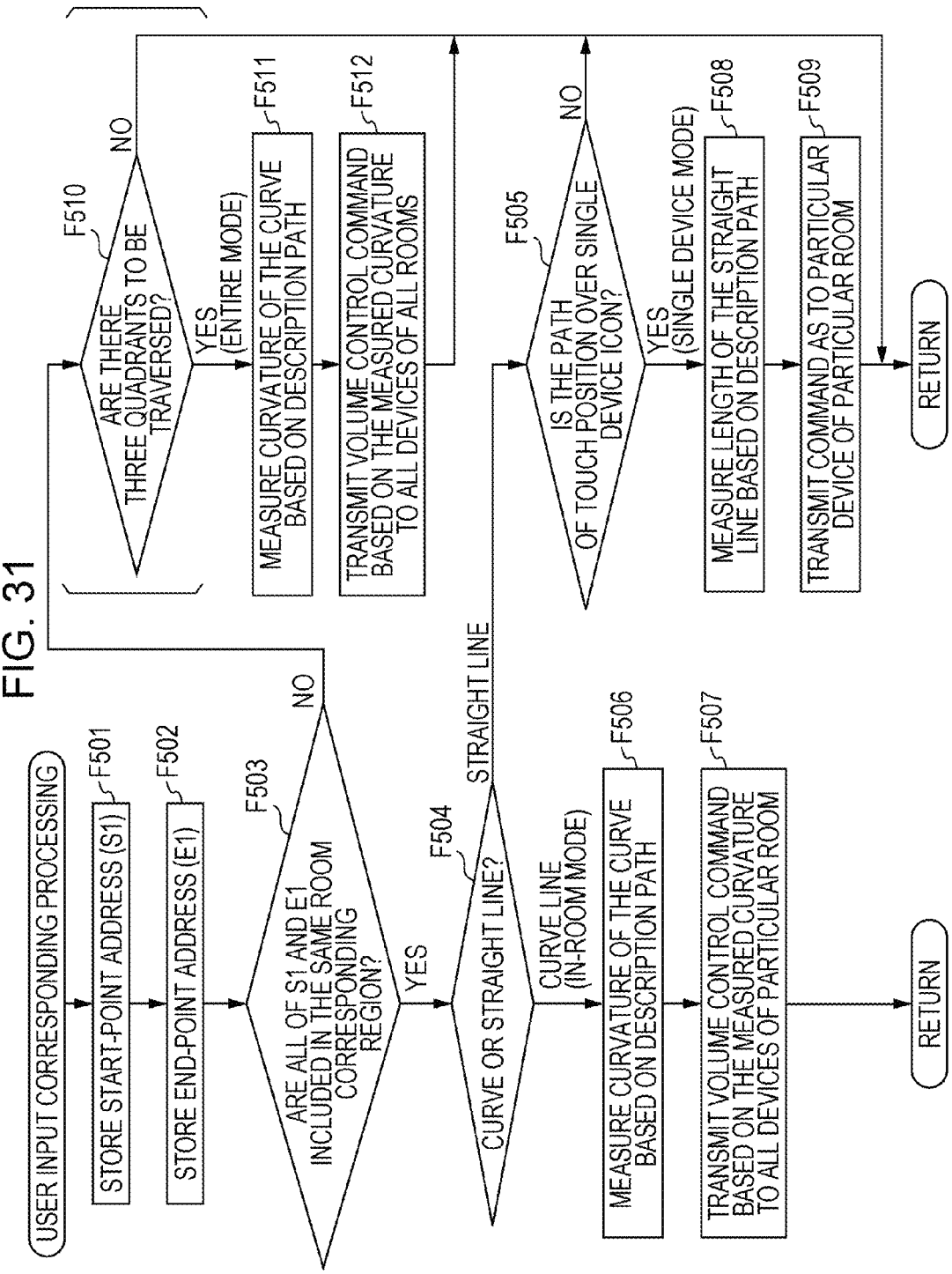
FIG. 31 is a flowchart of the processing of the operation example III according to the third embodiment.

An example of the recognition processing of the control unit 41 (specifically, input detection unit 41*c*) as to a touch pattern operation, such as the above descending curved operation, descending linear operation, and ascending curved operation, and ascending linear operation, will be illustrated in FIG. 31.

In the event that there has been the user's touch operation, the control unit 41 stores the start point and end point of the touch operation in steps F501, and F502 based on the information of the contact positions from the position detection unit 47. Specifically, the control unit 41 stores the addresses of the start point S1, and end point E1 (the coordinate values on the X-Y coordinates).

Next, in step F503, the control unit 41 confirms whether or not the start point S1 and end point E1 are included in the same room corresponding region. Specifically, the control unit 41 has to determine whether or not the address of each point is included in the same quadrant.

In the event that a condition is not satisfied that the start point S1 and end point E1 are included in the same room corresponding region, this may be an operation in the entire mode. In this case, the control unit 41 proceeds to step F510, and confirms whether or not there are three quadrants where the path from the start point S1 to the end point E1 traverses.

This is determination regarding whether or not a pattern operation serving as a descending curve or ascending curve has been performed. For example, in the event of FIG. 25, the operation path traverses the first, second, and fourth quadrants. Also, in the event of FIG. 28, the operation path traverses the third, fourth, and second quadrants. In these cases, the loci pass through the three quadrants, and accordingly, determination is made that a pattern operation serving as a descending curve or ascending curve has been performed across generally the entire screen.

In this case, the control unit 41 proceeds to step F511. On the other hand, in the event that the path does not reach three quadrants, determination is made that this is not a predetermined pattern operation serving as a descending curve or ascending curve, and regards this as invalid processing.

Note that the processing in step F510 may be omitted. For example, in the event that at least the start point S1 and end point E1 exit in a different room corresponding region, determination may be made that a pattern operation serving as a descending curve or ascending curve across the entire screen has been performed. In this case, the control unit 41 may proceed from step F503 to step F511.

In step F511, the control unit 41 measures, from the path on the X-Y coordinates serving as a descending curve or ascending curve, the curvature thereof. The curvature as used here may be obtained, for example, as the maximum differential value or mean differential value of a curve on the X-Y coordinates, but more simply, for example, the inclination of a line connecting each coordinate point between a start point S1 and an end point E1 may be used as a curvature.

Upon obtaining the curvature, the control unit 41 proceeds to step F512, regards this as the entire mode, and performs processing. Specifically, the control unit 41 transmits a volume down command or volume up command according to the curvature as to all of the devices over the network.

In the event that determination is made in step F503 that the start point S1 and end point E1 are included in the same room corresponding region (same quadrant), the control unit 41 proceeds to step F504 and thereafter, and performs determination processing regarding whether an operation in the in-room mode or an operation in the single device mode.

First, in step F504, determination is made whether or not the operation path from the start point S1 to the end point E1 is a curve or straight line.

If a curve, the control unit 41 proceeds to step F506, and regards this as the in-room mode, and performs processing. First, in step F506, the control unit 41 measures, from the path on the X-Y coordinates serving as a descending curve or ascending curve, the curvature thereof. Upon obtaining the curvature, the control unit 41 proceeds to step F507, takes all of the devices of the room equivalent to this room corresponding region as a control object, and transmits a volume down command or volume up command including volume control amount according to the curvature to all of the devices installed in the room thereof.

In the event that determination is made that the operation path from the start point S1 to the end point E1 is a straight line, the control unit 41 proceeds to step F505, and confirms whether or not the path of the descending straight line or ascending straight line is above one device icon.

In the event that the path is above one device icon, the control unit 41 determines this to be an operation in the single device mode. In this case, the control unit 41 measures the length of the path of the descending straight line or ascending straight line in step F508. Subsequently, in step F509, the control unit 41 takes the device equivalent to this device icon as a control object, and transmits a volume down command or volume up command including volume control amount according to the length of the path of the descending straight line or ascending straight line to the device thereof.

Note that a case where determination is made in step F505 that the straight line path is not above one certain device icon is a case where the user has performed a touch operation above a portion not serving as a device icon on the display face. In this case, the control unit 41 regards this as an invalid operation, and aborts the processing.

The control unit 41 performs the processing such as in FIG. 31 as described above, whereby a mute command can be transmitted to the device serving as an object by recognizing a touch pattern operation serving as the descending curved operation, descending linear operation, ascending curved operation, or ascending linear operation as a volume up/down operation in the first, second, or third case.

Note that, with the above example, a linear operation has been performed in the event of the single device mode, but in the event of the single device mode as well, the descending curved operation or ascending curved operation may be performed above a device icon. In this case, the determination processing between the in-room mode and the single device mode may be performed according to determination of overlapping of the path as to one or more device icons, the length of the curved path, or the like.

Similarly, all of the entire mode, in-room mode, and single device mode may be performed with a descending linear operation and an ascending linear operation.

Also, with regard to how to determine volume control amount in the event of the descending curved operation or ascending curved operation, volume control amount may be determined by measuring the length of the curve and using the measured length instead of the curvature, or volume control amount may be determined in light of both the measured curvature and line length.

6-5. Operation Example IV

Description will be made regarding a case where a predetermined touch pattern is a touch panel operation for drawing a generally circular operation path.

Here, let us say that a generally circular touch pattern operation is a power on operation. Note that the generally circular shape does not mean an accurate circle but a pattern where the user draws with the intention of drawing a circumferential shape approximate to a circle, such as a circle, ellipse, round in a handwriting style, polygonal shape approximate to a circle, or the like.

Figure 32:
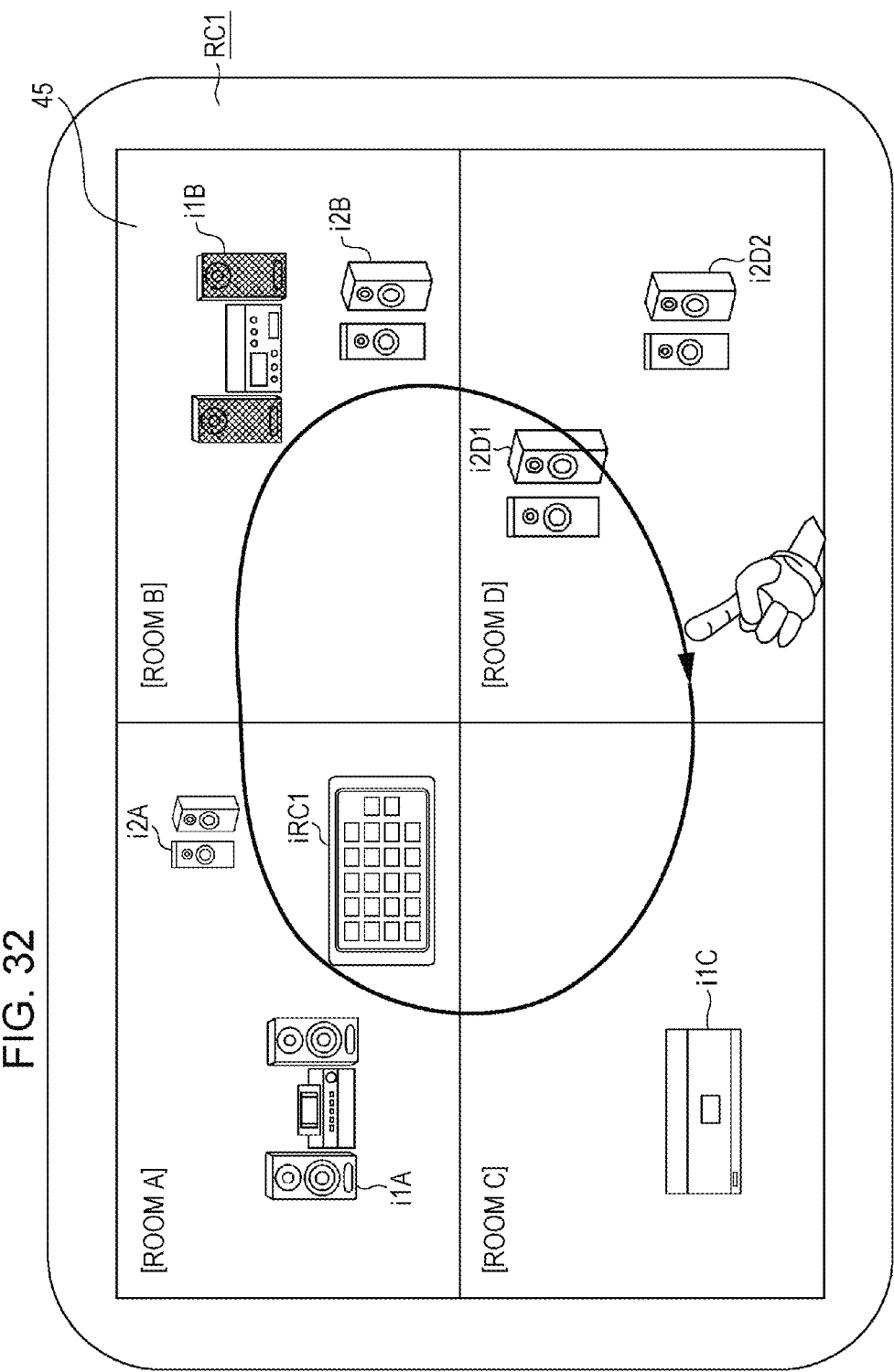
FIG. 32 is an explanatory diagram of the entire operation of an operation example IV according to the third embodiment.
Figure 33:
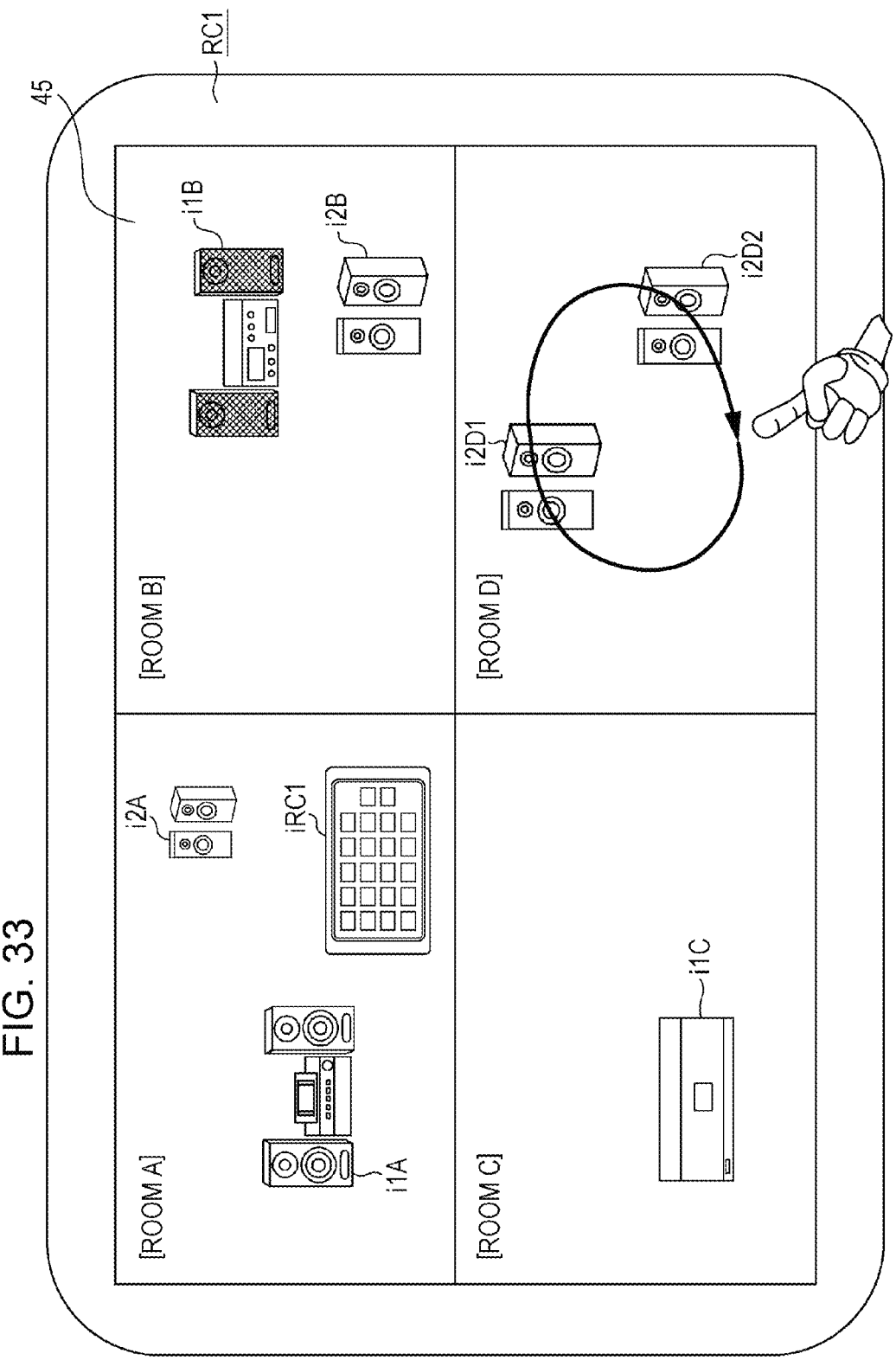
FIG. 33 is an explanatory diagram of an in-room device operation of the operation example IV according to the third embodiment.
Figure 34:
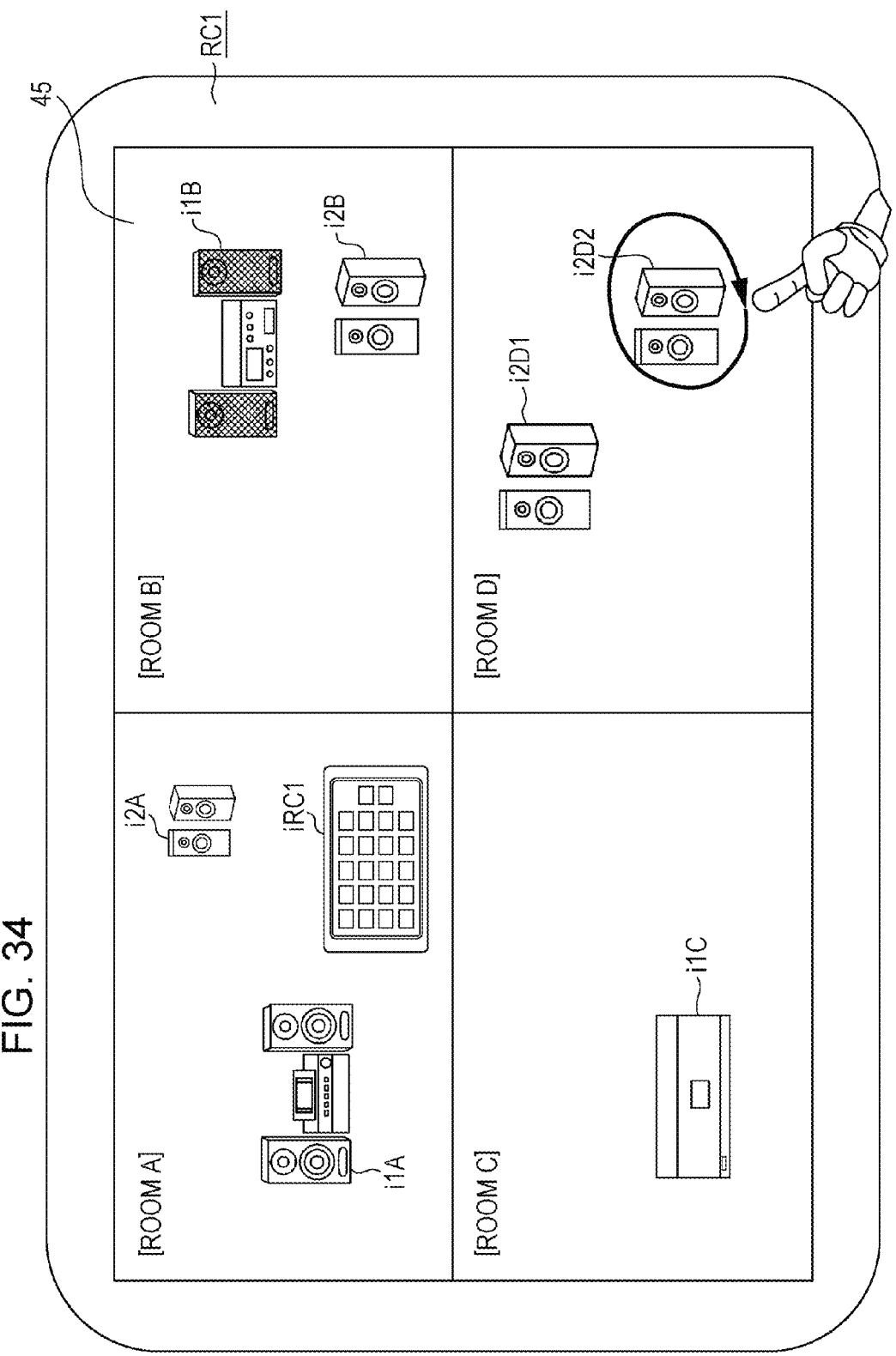
FIG. 34 is an explanatory diagram of a single device operation of the operation example IV according to the third embodiment.

FIGS. 32, 33, and 34 illustrate a generally circular touch pattern operation. FIG. 32 illustrates a case where the user has performed a generally circular touch operation across generally the entire screen by a finger.

The control unit 41 of the remote controller RC1 detects this as contact movement of a circular touch position across each of the room corresponding regions A, B, C, and D, and recognizes this as an operation in the entire mode. Subsequently, power-on control as to all of the devices over the network is performed. Specifically, the remote controller RC1 continuously performs transmission output of a power-on command with all of the devices over the network as an object.

FIG. 33 illustrates a case where the user has performed a generally circular touch operation within one room corresponding region and also across generally the entire screen by a finger.

In this case, the control unit 41 of the remote controller RC1 detects this as contact movement of a circular touch position on generally the entire face within the room corresponding region D (fourth quadrant), and recognizes this as an operation in the in-room mode, and specifically as an operation in the in-room mode with the room D as a control object, and subsequently transmits a power-on command as to all of the devices in the room D.

FIG. 34 illustrates a case where the user has performed a circular touch operation above one device icon i2D2 by a finger. In this case, the control unit 41 of the remote controller RC1 detects this as contact movement of a circular touch position above the display region ARi2D2 of the device icon i2D2 regarding the network speaker 2D2 on the X-Y coordinates, and subsequently recognizes this as an operation in the single device mode, and specifically as an operation in the single device mode with the network speaker 2D2 as a control object, and subsequently transmits a power-on command with the network speaker 2D2 as an object.

Figure 35:
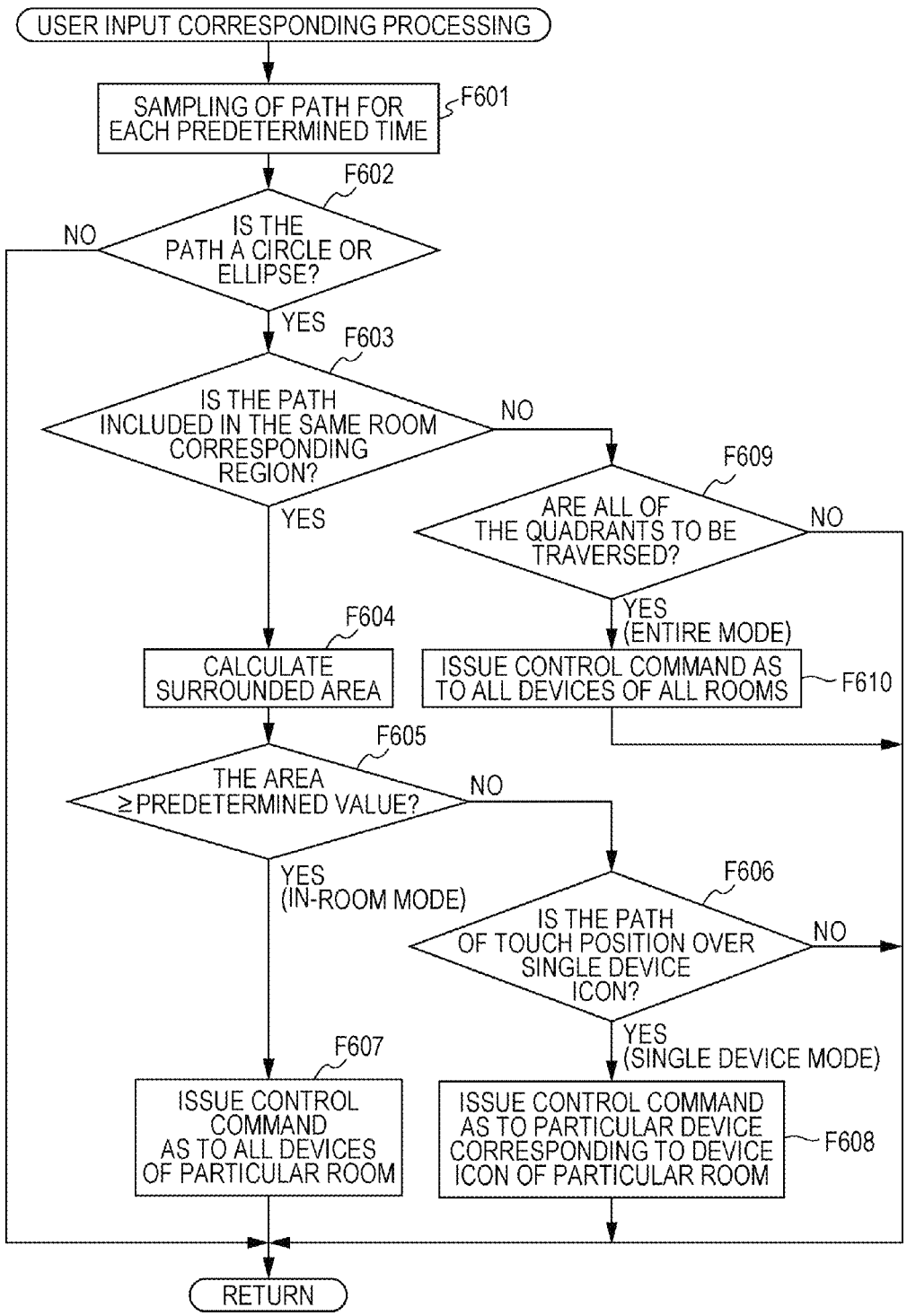
FIG. 35 is a flowchart of the processing of the operation example IV according to the third embodiment.

An example of the recognition processing of the control unit 41 (specifically, input detection unit 41c) as to such a generally circular touch pattern operation will be illustrated in FIG. 35.

In the event that the user's touch operation has been started, in step F601 the control unit 41 samples a coordinate value serving as the information of a contact position from the position detection unit 47 for each predetermined time. The control unit 41 performs this until the user's consecutive touch operations are completed, thereby recognizing the coordinate values of the operation path.

Next, in step F602, the control unit 41 determines the shape of the path, and in the event of determining that the shape of the path is a shape other than the above generally circular shape such as a circle, ellipse, or the like (a shape approximate to these), regards this as an invalid operation. In the event of determining as a generally circular shape, the control unit 41 proceeds to step F603.

In step F603, the control unit 41 confirms whether or not the operation path is included in one room corresponding region.

If a condition is not satisfied that the operation path in included in one room corresponding region, the control unit 41 proceeds to step F609, and determines whether or not the operation path intersects with all of the quadrants.

In the event that the operation path intersects with all of the quadrants, the control unit 41 proceeds to step F610, takes this as the entire mode, performs processing, and specifically transmits a power-on command as to all of the devices over the network.

Note that in the event that determination is made in step F609 that the operation path does not intersect with all of the quadrants, the control unit 41 regards this as an invalid operation, and aborts the processing. An example of this is a case where a circle has been drawn across the first and third quadrants.

On the other hand, in the event that determination is made in step F603 that the operation path is included in one room corresponding region, the control unit 41 proceeds to step F604 and thereafter, and performs determination processing regarding whether this is an operation in the in-room mode or an operation in the single device mode.

First, in step F604, the control unit 41 calculates the area of a range surrounded with the generally circular operation path, and subsequently in step F605 compares the calculated area with a predetermined value. The predetermined value as used here is the threshold of the area for determining whether or not the circular path has been drawn on generally the entirety of the room corresponding region.

In the event that the area is equal to or greater than the predetermined value, the control unit 41 proceeds from step F605 to step F607, determines as the in-room mode, performs processing, and specifically transmits a power-on command to all of the devices installed in the room thereof in order. An example of this is equivalent to the case in FIG. 33.

In the event that determination is made in step F605 that the area is less than the predetermined value, the control unit 41 proceeds to step F606, and confirms whether or not the generally circular path is above one device icon.

In the event that the generally circular path is above one certain device icon, the control unit 41 determines this to be an operation in the single device mode, and in step F608 takes the device equivalent to this device icon as a control object, and transmits a power-on command as to the device thereof. An example of this is equivalent to the case in FIG. 34.

Note that a case where determination is made in step F606 that the generally circular path is not above one certain device icon is a case where the user has performed a checkmark touch operation on a portion not serving as a device icon on the display face. The control unit 41 regards this case as an invalid operation, and aborts the processing.

The control unit 41 performs the processing such as in FIG. 35 as described above, whereby a power-on command can be transmitted to the device serving as an object by recognizing the generally circular touch pattern operation as a power-on operation in the first, second, or third case.

Note that, with the determination processing regarding whether the in-room mode or single device mode, in addition to determination according to the area, determination may be made by whether or not the circular path intersects with one or more device icons.

6-6. Application Examples with Different Number of Rooms

As described above, with description of the above operation examples I through IV, description has been made with reference to a case where there are four rooms, and the room corresponding regions in the display unit 45 match the first through fourth quadrants of the X-Y coordinates. However, depending on the number of rooms, or depending on the setting of a display layout even with four rooms, the room corresponding regions on the display may not match the first quadrant through the fourth quadrant.

Hereafter, description will be made regarding a case where the room corresponding regions in the display unit 45 do not match the first through fourth quadrants of the X-Y coordinates with reference to a case where the number of rooms is three.

Figure 36:
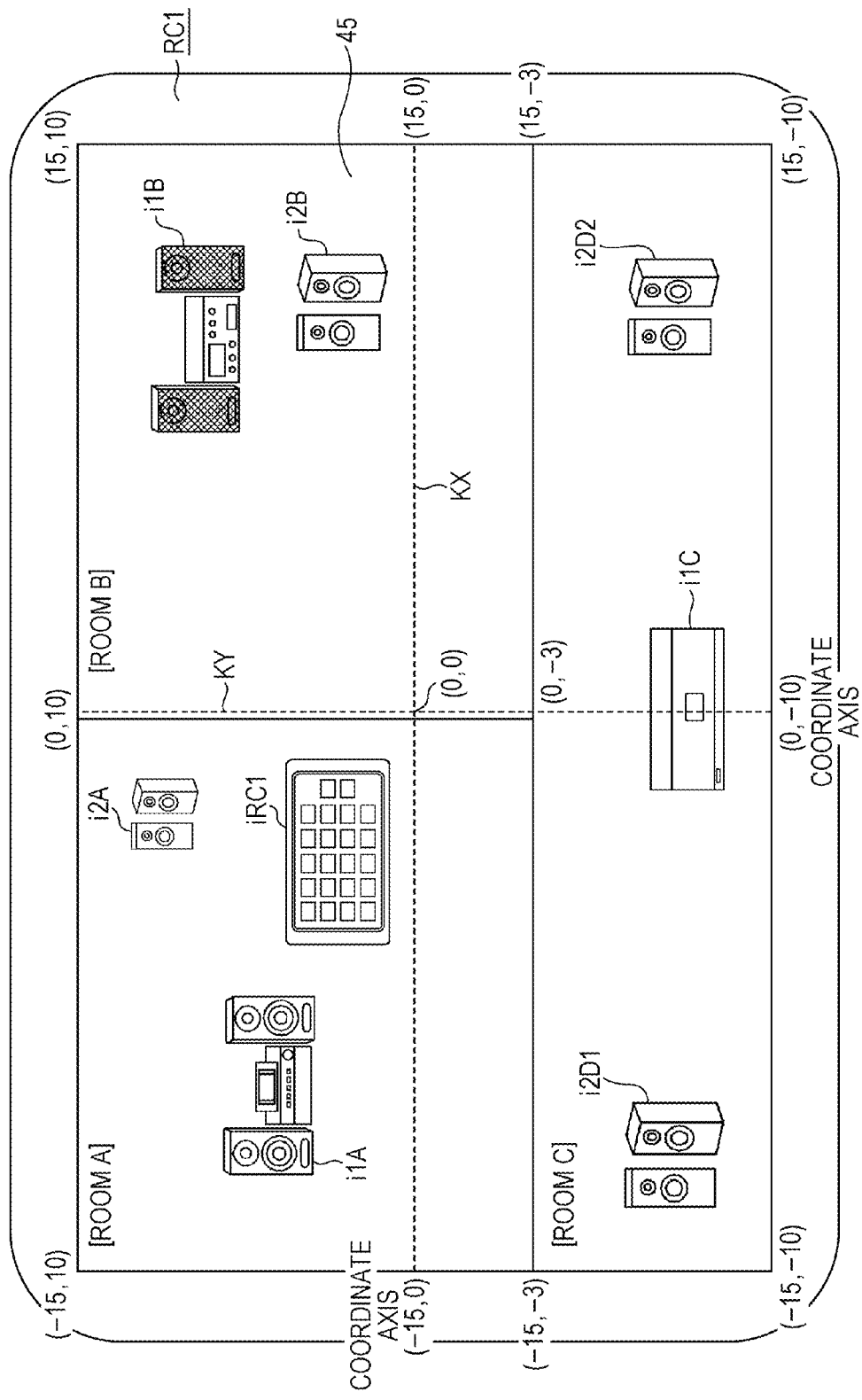
FIG. 36 is an explanatory diagram in the event that the number of rooms differs, according to the third embodiment.

FIG. 36 illustrates an example where, with the display unit 45 of the remote controller RC1, room corresponding regions A, B, and C corresponding to three rooms A, B, and C are displayed. In this drawing, the X-Y coordinate axes (reference lines KX and KY) of the touch panel face are indicated with a dashed line, but it goes without saying that the first quadrant through the fourth quadrant stipulated by the X-Y coordinates do not match the room corresponding regions A, B, and C.

In such a case, the control unit 41 has to have recognized the edge point coordinates of each of the room corresponding regions A, B, and C with the origin coordinates (0, 0) of the reference lines KX and KY.

For example, in the case of FIG. 36, the room corresponding region A will be a range surrounded with coordinate points (−15, 10) (0, 10) (−15, −3) (0, −3). The room corresponding region B will be a range surrounded with coordinate points (0, 10) (15, 10) (0, −3) (15, −3). The room corresponding region C will be a range surrounded with coordinate points (−15, −3) (15, −3) (−15, −10) (15, −10).

The control unit 41 can determine, in the event that the user's touch operation position has been detected on the X-Y coordinates, which region of the room corresponding regions A, B, and C this position is included in, by recognizing the room corresponding regions A, B, and C in this way.

Figure 37:
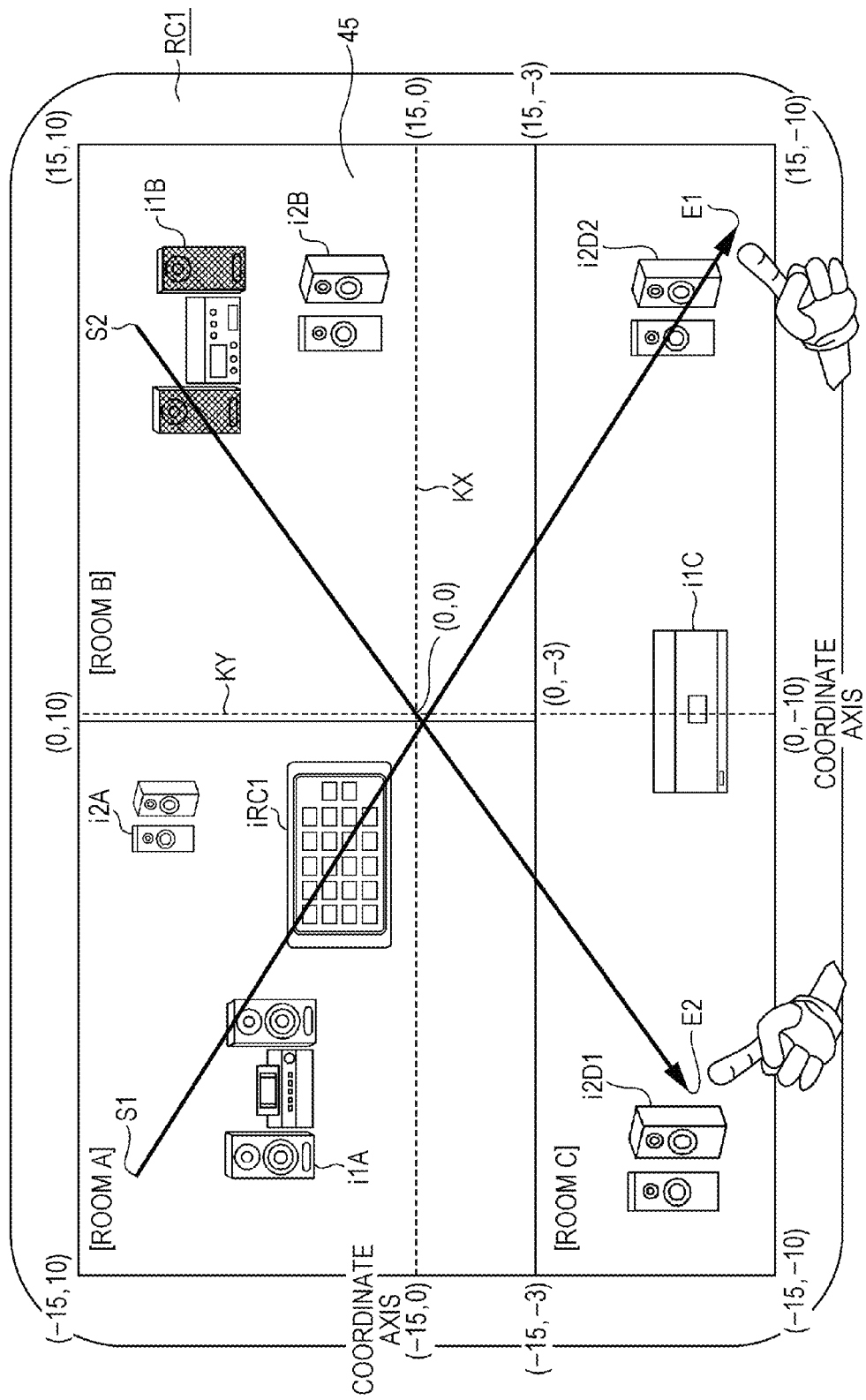
FIG. 37 is an explanatory diagram of the entire operation in the event that the number of rooms differs, according to the third embodiment.

Description will be made regarding an example when a generally x-shaped touch pattern operation is performed in the case of the three rooms. FIG. 37 illustrates a case where the user has performed an x-shaped touch operation across generally the entire screen by a finger. This is a case where the operation has to be recognized as an operation in the entire mode.

Figure 38:
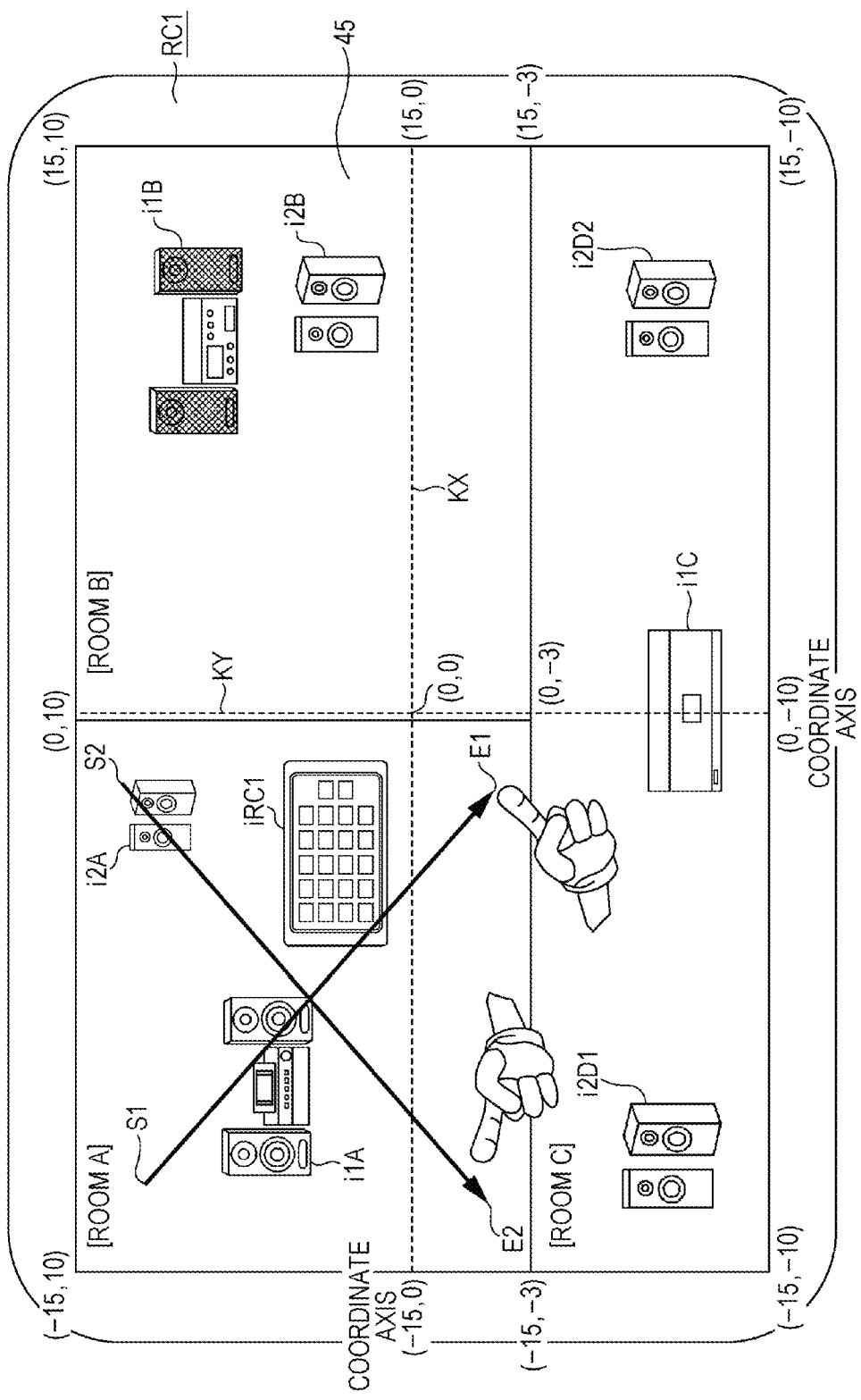
FIG. 38 is an explanatory diagram of an in-room device operation in the event that the number of rooms differs, according to the third embodiment.

FIG. 38 illustrates a case where the user has performed an x-shaped touch operation within the room corresponding region A and also across generally the entire face of the room corresponding region A. This is a case where the operation has to be recognized as an operation in the in-room mode with the room A as an object.

Figure 39:
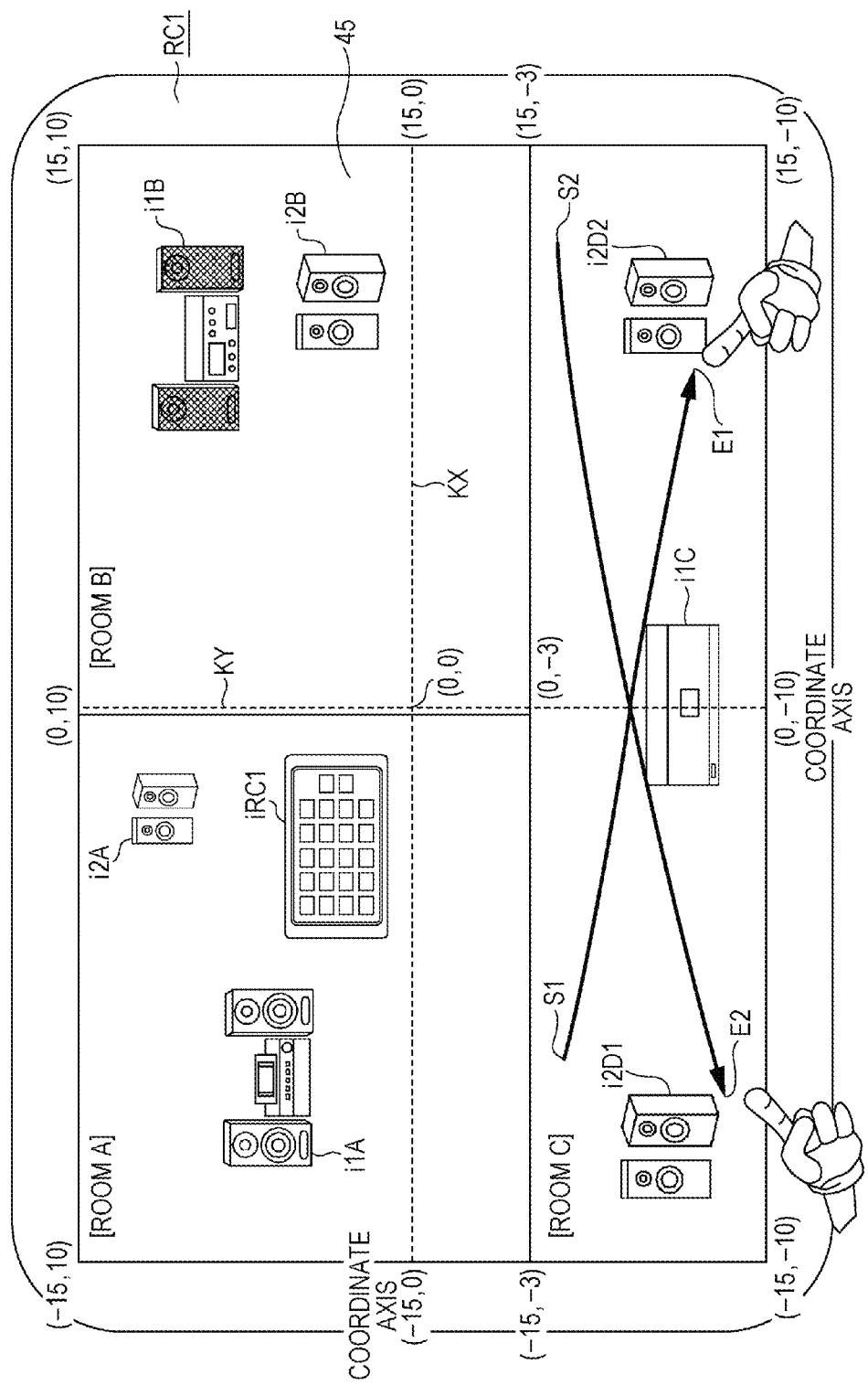
FIG. 39 is an explanatory diagram of an in-room device operation in the event that the number of rooms differs, according to the third embodiment.

FIG. 39 illustrates a case where the user has performed an x-shaped touch operation within the room corresponding region C and also across generally the entire face of the room corresponding region C. This is a case where the operation has to be recognized as an operation in the in-room mode with the room C as an object.

FIG. 40 illustrates a case where the user has performed an x-shaped touch operation above the device icon i2D1. This is a case where the operation has to be recognized as an operation in the single device mode with the network speaker 2D1 as an object.

In the event of applying the processing in FIG. 20 to perform such recognition, the processing is executed as follows. As described above, in step F305 in FIG. 20, the control unit 41 confirms whether or not the start point S1, end point E1, start point S2, and end point E2 are all included in the same "room corresponding region". With the confirmation processing in this case, determination is made by comparing the range of each of the room corresponding regions A, B, and C recognized with coordinate values as described above with the start point S1, end point E1, start point S2, and end point E2.

In the cases of FIGS. 38 and 39, the start point S1, end point E1, start point S2, and end point E2 are not included in the same quadrant, but in the event of recognizing the range of each of the room corresponding regions A, B, and C do not match the quadrants as described above, the start point S1, end point E1, start point S2, and end point E2 are determined to be included in the same room corresponding region, and the control unit 41 proceeds to step F306 and thereafter.

Also, in step F310, the control unit 41 confirms whether or not the start point S1, end point E1, start point S2, and end point E2 are all included in a different quadrant. In the case of FIG. 37, the end points E1 and E2 are included in the same room corresponding region C, but differ in that the corresponding quadrants are the third quadrant and fourth quadrant. Accordingly, in the case of FIG. 37 as well, the control unit 41 proceeds to step F311.

In this way, even when the room corresponding regions do not match the quadrants, the above processing can be applied. This is also true for each process in FIGS. 24, 31, and 35.

That is to say, as for determination whether the in-room mode or the single device mode, a room corresponding region is taken as a reference, and as for determination of the entire mode, a gradient is taken as a reference, whereby various display layouts can be handled.

6-7. Advantages and Modification of Third Embodiment

With the third embodiment thus described, in the same way as with the first and second embodiments, the user can readily perform an operation according to the first, second, or third case using the remote controller RC2 without imposing a burden on devices on the system.

Moreover, room corresponding regions and device icons are displayed on the display unit 45, and a predetermined touch pattern operation is performed as thereto, and accordingly, such operation is an extremely intuitive operation, and the user's operability dramatically improves.

According to Operation example I, an intuitive operation such as muting or the like is available using a generally x-shaped operation. According to Operation example II, an intuitive operation such as muting or the like is available using a general checkmark operation. According to Operation example III, volume up/down and control amount can be operated in an intuitive manner. According to Operation example IV, an intuitive operation such as power-on or the like is available using a generally circular operation.

Also, as for the in-room mode, an operation can be performed by specifying a room, and further, the user can operate while recognizing a room and a device which are objects to be operated, which yields excellent operability. For example, the user can perform intuitive operation control while viewing a device installed not in a room where the user exists but in an arbitrary room using a device icon thereof.

According to these, the control device (remote controller RC1) serving as an operating unit with dramatically excellent operability can be provided to a user as an in-home network.

Hereafter, a modification of the third embodiment will be described.

First, the settings of the operation content of a predetermined touch pattern operation can be variously conceived. A generally x-shaped touch pattern operation has been described with a mute operation as an example, which is suitable as a power-off operation, playback stop operation, and playback pause operation. Also, this may be adapted for a power-on operation or playback start operation.

A general checkmark touch pattern operation has also been described with a mute operation as an example, which is suitable as a power-on operation, playback start operation, power-off operation, playback stop operation, and playback pause operation.

A descending curved operation, descending linear operation, ascending curved operation, and ascending linear operation can be applied to a search operation other than a volume up/down operation. A generally circular touch pattern operation is suitable for a mute operation, playback start operation, power-off operation, playback stop operation, and playback pause operation other than a power-off operation. Further, each touch pattern operation can be used as a setting operation in the event of each of the entire, in-room, and single device mode.

For example, at the time of a general checkmark entire mode operation, the screen proceeds to the setting screen of the entire system, whereby various setting operations can be performed, and at the time of an in-room mode operation, the screen proceeds to the setting screen of a device within the specified room, whereby a setting operation can be performed, and at the time of a single device mode operation, the screen proceeds to the setting screen of the specified device, whereby a setting operation can be performed.

Also, as for the in-room mode, an arrangement has been made wherein one certain room is specified, and all of the devices in the room can be controlled, but this may be expanded so that one-time control can be performed with two or more rooms as an object. For example, in the event that an x-shaped operation has been performed across the two room corresponding regions A and C, power-off control is performed as to all of the devices in the rooms A and C.

Also, with description in FIG. 5, description has been made wherein the control unit 41 (display control unit 41*b*) can display the path of a touch pattern operation on the display unit 45. An arrangement may be made wherein in the event that the user has performed an x-shaped, checkmark, descending curve, descending line, ascending curve, ascending line, or circular touch pattern operation, the operation path thereof is temporarily displayed on the display screen. Thus, the user can accurately perform an operation while recognizing an operation pattern.

Also, as for touch pattern operations, various patterns may be conceived, such as a generally triangular, generally rectangular, slanting linear, and so forth, other than the above examples.

7. Modification and Application to other Devices

With the above embodiments, application examples of the present invention in the music content distribution system has been described, but the present invention can also be applied to other systems. For example, as for an in-home network, a device similar to the embodiments is assumed as a control device of a system for performing distribution and synchronous playback of video contents, text, game data, and so forth.

Also, the present invention can be applied to control of an electronic device connected to a network other than the content distribution system. For example, the present invention can also be applied to a control device such as a television receiver, monitor display, information device, or the like.

Moreover, the present invention can also be applied to a system of various electronic devices along with a room. For example, in the event that a lighting apparatus of each room within a household is connected to a network, control of each lighting apparatus is available as the entire mode, in-room mode, or single device mode. For example, the present invention is suitable for lighting on/off and lighting control.

FIG. 9 illustrates an example wherein "lighting-on" "lighting-off" keys are provided to the remote controller RC1. According to the number of times of operation and operation time of these keys, control of a lighting apparatus can also be performed in each of the entire mode, in-room mode, and single device mode. Also, in the event of using the remote controller RC1 with display and touch panel functions, the icon of a lighting apparatus and room correspond region of each room are displayed on the display unit 45. The user performs a touch pattern operation as described above as thereto, whereby control of lighting apparatuses in each of the entire mode, in-room mode, and single device mode can also be performed.

Also, particularly, the present invention is suitable for lighting amount control by using the operation example described in FIGS. 13A and 13B, or the above operation example according to a descending curved operation, descending linear operation, ascending curved operation, or ascending linear operation.

Similarly, the present invention can also be applied to automatic control of a window, curtain, and shutter, ascending/descending of a screen, control of air conditioner, and so forth.

8. Program

A program according to an embodiment of the present invention is a program causing a control device to execute the steps of: selectively setting the single device mode in which operation control corresponding to operation input is performed as to a particular single electronic device serving as a control object, the in-room mode in which operation control corresponding to operation input is performed in common as to electronic devices installed in the same room, and the entire mode in which operation control corresponding to operation input is performed in common as to electronic devices connected to the communication network, as an operation control mode corresponding to predetermined operation input, and to generate a control command; and transmitting a control command generated according to the set control mode.

An example of this is a program causing the microcomputer of the control device to execute the processing in FIGS. 7, 10, 20, 24, 31, 35, and so forth. The control device and control method whereby the above advantages are obtained can be realized by such a program.

The program according to the present embodiment may be recorded in an HDD serving as a recording medium housed in a device such as a personal computer, an imaging apparatus, or the like, ROM within a microcomputer including a CPU, or the like, beforehand. Alternatively, the program according to the present embodiment may be temporarily or permanently stored (recorded) in a removable recording medium such as a flexible disk, CD-ROM (Compact Disc Read Only Memory), MO (Magneto-optical) disk, DVD (Digital Versatile Disc), Blu-ray Disc (registered trademark), a magnetic disk, semiconductor memory, a memory card, or the like. Such a removable recording medium may be provided as so-called package software.

Also, the program according to the present embodiment may be downloaded from a download site via a network such as a LAN (Local Area Network), the Internet, or the like other than that the program is installed into a personal computer or the like from the removable recording medium.

The present application contains subject matter related to that disclosed in Japanese Priority Patent Application JP 2010-126634 filed in the Japan Patent Office on Jun. 2, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A control device, said control device comprising:
a display unit; and
one or more microcomputers operable to:
display, on said display unit, an operation screen indicating a plurality of room regions corresponding to each of a plurality of rooms, and one or more icons corresponding to each of one or more electronic devices installed in each of said plurality of rooms;
selectively set an operation control mode of said control device based on a predetermined operation performed by an operating unit associated with said one or more electronic devices installed in each of said plurality of rooms, wherein said operation control mode of said control device is set based on a number of times a predetermined operation key of said operating unit is pressed and time duration for which said predetermined operation key of said operating unit is continuously pressed and wherein said operation control mode comprises one of:
a first operation control mode in which operation control of a particular single electronic device is performed according to a predetermined operation input, wherein said operation input is determined based on said number of times said predetermined operation key is pressed and said time duration for which said predetermined operation key is continuously pressed,
a second operation control mode in which operation control common to each of said one or more electronic devices installed in a particular room of said plurality of rooms is performed according to said predetermined operation input, and
a third operation control mode in which operation control common to all of said one or more electronic devices connected to a communication network is performed according to said predetermined operation input,
wherein said third operation control mode is selected when said predetermined operation input is performed across two or more room regions of said plurality of room regions of said operation screen displaying said plurality of room regions without requiring an additional operation input from a user; and
transmit a control command to said one or more electronic devices according to said control mode set by said one or more microcomputers.

2. The control device according to claim 1, wherein said operating unit comprises a remote controller.

3. The control device according to claim 1, wherein
said second operation control mode comprises performing the operation control common to each of said one or more electronic devices installed in a room where said control device exists, and
said one or more microcomputers are operable to generate said control command corresponding to each of said one or more electronic devices which exist in said room.

4. The control device according to claim 1, wherein said second control mode comprises performing operation control common to each of said one or more electronic devices installed in a room specified by said predetermined operation input, and
said one or more microcomputers are operable to generate said control command corresponding to each of said one or more electronic devices which exist in said specified room.

5. The control device according to claim 1, wherein said one or more microcomputers are operable to:
select said first, second, or third operation control mode according to a pattern of a predetermined operation performed by the user on the display unit without requiring said additional operation input from the user, wherein said predetermined operation input is determined based on said predetermined operation.

6. The control device according to claim 1, wherein said one or more microcomputers are operable to:
select said second operation control mode when said predetermined operation is performed across whole face of one of said plurality of room regions without requiring the additional operation input from the user; and select said first operation control mode when said predetermined operation is performed on one of said one or more icons indicating said one or more electronic devices on said operation screen without requiring the additional operation input from the user.

7. The control device according to claim 6, wherein in response to the selection of said second operation control mode, said one or more microcomputers are operable to generate said control command according to said predetermined operation, wherein said generated control command corresponds to one or more electronic devices installed in a room corresponding to said one of said plurality of room regions where said predetermined operation is performed.

8. The control device according to claim 1, wherein said predetermined operation is a touch operation for drawing an x-shaped operation path.

9. The control device according to claim 1, wherein said predetermined operation is a touch operation for drawing a checkmark operation path.

10. The control device according to claim 1, wherein said predetermined operation is a touch operation for drawing an ascending/descending curved operation path or a vertically linear operation path while moving in a horizontal direction.

11. The control device according to claim 1, wherein said predetermined operation is a touch operation for drawing a circular operation path.

12. The control device according to claim 1, wherein said predetermined operation input is one of: a power-on operation, a power-off operation, a volume operation, and a mute operation.

13. The control device according to claim 1, wherein said particular room is specified by said predetermined operation input based on one or more of: a numeric key pressed following said pressing of said predetermined operation key, and time duration for which said predetermined operation key is continuously pressed.

14. A control method, said method comprising:
displaying an operation screen indicating a plurality of room regions corresponding to each of a plurality of rooms, and one or more icons corresponding to each of one or more electronic devices installed in each of said plurality of rooms;
selectively setting an operation control mode of a control device based on a predetermined operation performed by an operating unit associated with said one or more electronic devices installed in each of said plurality of rooms, wherein said operation control mode of said control device is selectively set based on a number of times a predetermined operation key of said operating unit is pressed and time duration for which said predetermined operation key of said operating unit is continuously pressed, and wherein said operation control mode comprises one of:
a first operation control mode in which operation control of a particular single electronic device is performed according to a predetermined operation input, wherein said operation input is determined based on said number of times said predetermined operation key is pressed and said time duration for which said predetermined operation key is continuously pressed,
a second operation control mode in which operation control common to a first plurality of electronic devices of said one or more electronic devices installed in a same room of said plurality of rooms is performed according to said predetermined operation input, and
a third operation control mode in which operation control common to a second plurality of electronic devices connected to a communication network is performed according to said predetermined operation input,
wherein said third operation control mode is selected when said predetermined operation is performed across two or more room regions of said plurality of room regions of said operation screen displaying said plurality of room regions without requiring an additional operation input from a user; and
transmitting a control command to said one or more electronic devices according to said set operation control mode.

15. The control method according to claim 14, further comprising:
selecting said second operation control mode when said predetermined operation is performed across whole face of one of said plurality of room regions without requiring the additional operation input from the user; and
selecting said first operation control mode when said predetermined operation is performed on one of said one or more icons indicating said one or more electronic devices on said operation screen without requiring the additional operation input from the user.

16. The control method according to claim 15, further comprising:
in response to selection of said second operation control mode, generating said control command according to said predetermined operation, wherein a control operation of one or more electronic devices, installed in a room corresponding to said one of said plurality of room regions, is performed based on said generated control command.

17. The control method according to claim 15, further comprising:
in response to selection of said third operation control mode, generating said control command according to said predetermined operation, wherein a control operation of said one or more electronic devices installed in said plurality of rooms corresponding to said plurality of room regions is performed based on said generated control command.

18. The control method according to claim 14, further comprising:
setting said operation control mode of said control device based on a shape of a path traversed by said operation, performed by said user, on said operation screen of said operating unit.

19. A non-transitory computer-readable storage medium having stored thereon, a computer program having at least one code section for controlling a control device, the at least one code section being executable by one or more microcomputers for causing the one or more microcomputers to:
display an operation screen indicating a plurality of room regions corresponding to each of a plurality of rooms, and one or more icons corresponding to each of one or more electronic devices installed in each of said plurality of rooms;
selectively set an operation control mode of said control device based on a predetermined operation performed by an operating unit associated with said one or more electronic devices installed in each of said plurality of rooms, wherein said operation control mode of said control device is selectively set based on a number of times a predetermined operation key of said operating unit is pressed and time duration for which said predetermined operation key of said operating unit is continuously pressed, and wherein said operation control mode comprises one of:

a first operation control mode in which operation control of a particular single electronic device is performed according to a predetermined operation input, wherein said operation input is determined based on said number of times said predetermined operation key is pressed and said time duration for which said predetermined operation key is continuously pressed, a second operation control mode in which operation control common to a first plurality of electronic devices of said one or more electronic devices installed in a same room of said plurality of rooms is performed according to said predetermined operation input, and a third operation control mode in which operation control common to a second plurality of electronic devices connected to a communication network is performed according to said predetermined operation input;

wherein said third operation control mode is selected when said predetermined operation is performed across two or more room regions of said plurality of room regions of said operation screen displaying said plurality of room regions without requiring an additional operation input from a user; and transmit a control command to said one or more electronic devices according to said operation control mode set by said one or more microcomputers.

* * * * *